(12) United States Patent
Straub et al.

(10) Patent No.: US 9,851,953 B2
(45) Date of Patent: Dec. 26, 2017

(54) CLOUD BASED EDITOR FOR GENERATION OF INTERPRETED ARTIFACTS FOR MOBILE RUNTIME

(71) Applicant: Oracle International Corporation, Redwood Shores, CA (US)

(72) Inventors: Christian David Straub, Palo Alto, CA (US); Michael William McGrath, San Ramon, CA (US); Daniel Nyoung Kim, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/188,120

(22) Filed: Jun. 21, 2016

(65) Prior Publication Data
US 2016/0378439 A1 Dec. 29, 2016

Related U.S. Application Data

(60) Provisional application No. 62/186,080, filed on Jun. 29, 2015, provisional application No. 62/203,065, filed on Aug. 10, 2015, provisional application No. 62/205,270, filed on Aug. 14, 2015.

(51) Int. Cl.
*G06F 9/44* (2006.01)
*G06F 9/445* (2006.01)
(52) U.S. Cl.
CPC .......... *G06F 8/34* (2013.01); *G06F 8/20* (2013.01); *G06F 8/61* (2013.01)
(58) Field of Classification Search
CPC ....................................... G06F 8/34

USPC ............ 717/100, 101–109, 120–12
See application file for complete search history.

(56) References Cited

U.S. PATENT DOCUMENTS

| 6,990,653 | B1* | 1/2006 | Burd ................ G06F 17/30893 707/E17.117 |
| 7,395,355 | B2 | 7/2008 | Afergan et al. |
| 7,428,725 | B2* | 9/2008 | Niyogi ............. G06F 17/30905 707/E17.121 |
| 7,430,732 | B2* | 9/2008 | Cwalina .................... G06F 8/20 717/107 |
| 7,546,576 | B2* | 6/2009 | Egli ....................... H04L 29/06 715/239 |

(Continued)

OTHER PUBLICATIONS

Giray et al, "Systematic Approach for Mapping Software Development Methods to the Essence Framework", ACM, pp. 26-32, 2016.*

(Continued)

*Primary Examiner* — Anil Khatri
(74) *Attorney, Agent, or Firm* — Miles & Stockbridge P.C.

(57) ABSTRACT

One embodiment is a system that accesses an application development user interface ("UI") through a browser. The application development UI is hosted by a web-based application development server in a cloud system that provides an application development framework ("ADF"). The system develops the application through the application development UI. The application is developed with the ADF and is configured to be downloaded from a download location in the cloud system. The application is configured to be downloaded on a device as a native application.

20 Claims, 31 Drawing Sheets

(56) References Cited

U.S. PATENT DOCUMENTS

| | | | |
|---|---|---|---|
| 7,577,934 B2* | 8/2009 | Anonsen | G06F 8/20 717/101 |
| 7,610,575 B2* | 10/2009 | Sproule | G06Q 10/063 705/348 |
| 7,757,177 B1* | 7/2010 | Bohm | G06F 17/243 715/221 |
| 7,779,383 B2* | 8/2010 | Bornhoevd | G06F 8/10 717/104 |
| 8,219,970 B2* | 7/2012 | Neil | G06F 9/547 717/107 |
| 8,364,968 B2* | 1/2013 | Corcoran | G06F 21/34 713/182 |
| 8,813,028 B2* | 8/2014 | Farooqi | G06F 8/34 717/107 |
| 8,949,776 B2* | 2/2015 | Feber | G06F 8/38 717/105 |
| 8,972,929 B2* | 3/2015 | Fahmy | G06F 9/4443 717/106 |
| 8,977,693 B2* | 3/2015 | Gidugu | G06F 8/36 709/206 |
| 8,984,581 B2* | 3/2015 | Luna | G06F 21/554 726/1 |
| 9,158,518 B2* | 10/2015 | Brown | G06F 8/47 |
| 9,258,668 B2 | 2/2016 | Mall | |
| 9,258,669 B2 | 2/2016 | Nyisztor | |
| 9,292,502 B2* | 3/2016 | Karlsen | G06F 9/54 |
| 9,772,822 B2* | 9/2017 | Narayanan | G06F 8/20 |
| 2004/0010621 A1 | 1/2004 | Afergan et al. | |
| 2007/0016804 A1 | 1/2007 | Kemshall | |
| 2010/0017812 A1 | 1/2010 | Nigam | |
| 2012/0090021 A1 | 4/2012 | Luh et al. | |
| 2012/0252405 A1 | 10/2012 | Lortz et al. | |
| 2013/0254262 A1 | 9/2013 | Udall | |
| 2013/0262626 A1 | 10/2013 | Bozek et al. | |
| 2014/0007205 A1 | 1/2014 | Oikonomou | |
| 2014/0109072 A1 | 4/2014 | Lang | |
| 2014/0109078 A1 | 4/2014 | Lang et al. | |
| 2014/0304507 A1 | 10/2014 | Coppola et al. | |
| 2015/0039732 A1 | 2/2015 | Mall | |
| 2015/0040201 A1 | 2/2015 | Nyisztor | |
| 2015/0319252 A1 | 11/2015 | Momchilov | |
| 2016/0048848 A1 | 2/2016 | Diggs | |
| 2016/0203087 A1 | 7/2016 | Nam et al. | |

OTHER PUBLICATIONS

Hudli et al, "An Evaluation Framework for Selection of Mobile App Development Platform", ACM, pp. 13-16, 2015.*

Cascaval et al, "ZOOMM: A Parallel Web Browser Engine for Multicore Mobile Devices" ACM, pp. 271-280, 2013.*

Cheng, "Virtual Browser for Enabling Multi-device Web Applications", ACM, pp. 1-6, 2012.*

Zucker et al, "Implementing Device UI in Standards-based Markup", ACM, 173-176, 2006.*

Choi et al, "Designing a High-Performance Mobile Cloud Web Browser", ACM, pp. 735-736, 2014.*

Christian David Straub, U.S. Appl. No. 15/054,755, filed Feb. 26, 2016.

Christian David Straub, U.S. Appl. No. 15/015,200, filed Feb. 4, 2016.

Christian David Straub, U.S. Appl. No. 15/002,803, filed Jan. 21, 2016.

Christian David Straub, U.S. Appl. No. 14/979,828, filed Dec. 28, 2015.

Christian David Straub, U.S. Appl. No. 14/970,629, filed Dec. 16, 2015.

Christian David Straub, U.S. Appl. No. 14/865,904, filed Sep. 25, 2015.

Christian David Straub, U.S. Appl. No. 14/948,466, filed Nov. 23, 2015.

* cited by examiner

CLOUD BASED EDITOR FOR GENERATION OF INTERPRETED ARTIFACTS FOR MOBILE RUNTIME

CROSS-REFERENCE TO RELATED APPLICATIONS

This application claims priority of U.S. Provisional App. No. 62/186,080, filed Jun. 29, 2015, entitled "CLOUD BASED EDITOR FOR GENERATION OF INTERPRETED ARTIFACTS FOR MOBILE RUNTIME," the disclosure of which is hereby incorporated by reference.

This application claims priority of U.S. Provisional App. No. 62/203,065, filed Aug. 10, 2015, entitled "TRANSACTIONAL AUTOSAVE WITH LOCAL AND REMOTE LIFECYCLES," the disclosure of which is hereby incorporated by reference.

This application claims priority of U.S. Provisional App. No. 62/205,270, filed Aug. 14, 2015, entitled "DISCOVERY OF FEDERATED LOGINS," the disclosure of which is hereby incorporated by reference.

FIELD

One embodiment is directed generally to an application development system, and in particular, to a mobile application development system.

BACKGROUND INFORMATION

Generally, ubiquitous mobile services and wireless connections drive the demand for mobile device applications (commonly referred to as "apps") for various personal and business needs. Such demand in turn leads to the desirability of mobile application development platforms/means that simplify and expedite mobile application development and modification, while also allowing for sophisticated application features and ensuring that business security is not compromised.

SUMMARY

One embodiment is a system that creates an application. The system accesses an application development user interface ("UI") through a browser. The application development UI is hosted by a web-based application development server in a cloud system that provides an application development framework ("ADF"). The system develops the application through the application development UI. The application is developed with the ADF and is configured to be downloaded from a download location in the cloud system. The application is configured to be downloaded on a device as a native application.

DETAILED DESCRIPTION OF THE INVENTION

An application refers to a software program which on execution performs specific desired tasks. In general, several applications are executed in a runtime environment containing one or more operating systems ("OSs"), virtual machines (e.g., supporting Java™ programming language), device drivers, etc.

Developers often use Application Development Frameworks ("ADFs") (which are by themselves applications) for implementing/developing desired applications. An ADF provides a set of pre-defined code/data modules that can be directly/indirectly used in the development of an application. An ADF may also provide tools such as an Integrated Development Environment ("IDE"), code generators, debuggers, etc., which facilitate a developer in coding/implementing the desired logic of the application in a faster/simpler manner.

In general, an ADF simplifies application development by providing reusable components which can be used by application developers to define user interfaces ("UIs") and application logic by, for example, selecting components to perform desired tasks and defining the appearance, behavior, and interactions of the selected components. Some ADFs, such as "Oracle ADF" from Oracle Corp., are based on a model-view-controller ("MVC") design pattern that promotes loose coupling and easier application development and maintenance.

Oracle ADF includes libraries of standards-based Java Server Faces ("JSF") components with built-in Hypertext Markup Language 5 ("HTML5") and Asynchronous JavaScript and Extensible Markup Language ("Ajax") functionality. With these components, Web deployed UIs can be developed with a level of functionality and interactivity previously reserved for thick-client applications. The components offer data interaction, data visualization, and encapsulated browser side operations in a set of easy to use components that facilitate rich client application development. Oracle ADF further provides a data binding framework that simplifies binding UI to business services through simple drag and drop operations in an IDE. This is done while still keeping the independence of the business service from consuming interfaces. With the framework, the UI developer is insulated from the underlying implementation of the business service layer. This makes the process of building the UI truly decoupled from the implementation of the business service layer, thus better positioning the application for implementation in a service oriented architecture.

Cloud Infrastructure

Figure 1:
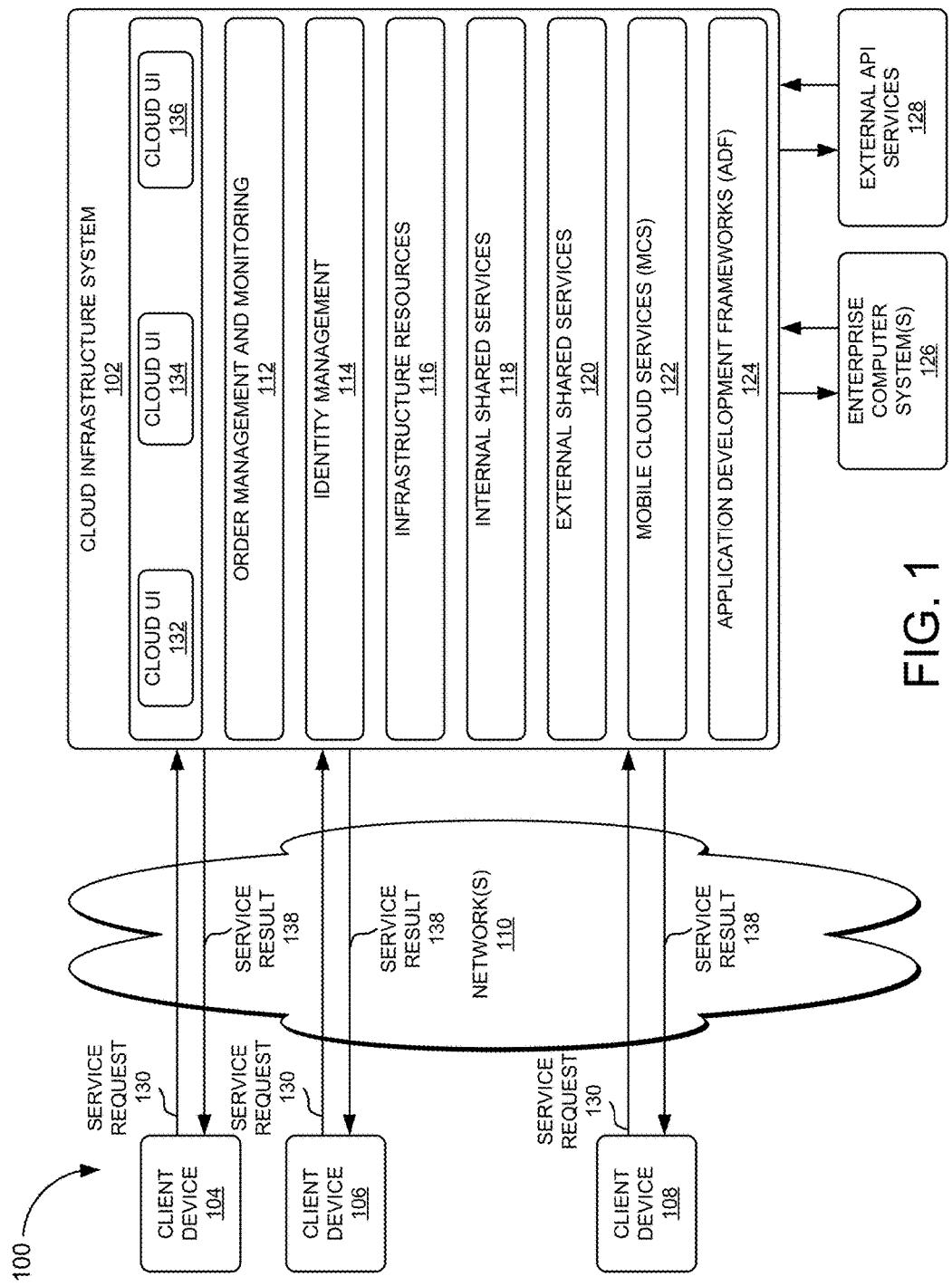
FIG. 1 is a simplified block diagram of components of a system environment by which services provided by the components of an embodiment system may be offered as mobile cloud services, in accordance with an embodiment.

FIG. 1 is a simplified block diagram of one or more components of a system environment 100 by which services provided by one or more components of an embodiment system may be offered as cloud services, in accordance with an embodiment of the present disclosure. In the illustrated embodiment, system environment 100 includes cloud infrastructure system 102 that provides cloud services to one or more client computing devices 104, 106, and 108. Client computing devices 104, 106, and 108 may be used by users to interact with cloud infrastructure system 102. Client computing devices 104, 106, and 108 may be configured to operate a client application such as a Web browser, a proprietary client application (e.g., "Oracle Forms"), or some other application, which may be used by a user of the client computing device to interact with cloud infrastructure system 102 to use services provided by cloud infrastructure system 102.

Cloud infrastructure system 102 may have other components than those depicted. Further, the embodiment shown in FIG. 1 is only one example of a cloud infrastructure system that may incorporate an embodiment of the invention. In some other embodiments, cloud infrastructure system 102 may have more or fewer components than shown in FIG. 1, may combine two or more components, or may have a different configuration or arrangement of components.

Client computing devices 104, 106, and 108 may be portable handheld devices (e.g., an iPhone®, cellular telephone, an iPad®, a computing tablet, a personal digital assistant ("PDA")), or wearable devices (e.g., a Google Glass® head mounted display), running software such as Microsoft Windows Mobile®, and/or a variety of mobile OSs such as iOS, Windows Phone, Android, BlackBerry 10, Palm OS, and the like, and being Internet, e-mail, short message service ("SMS"), Blackberry®, or other communication protocol enabled. Client computing devices 104, 106, and 108 can be general purpose personal computers ("PCs") including, for example, PCs and/or laptop computers running various versions of Microsoft Windows®, Apple Macintosh®, and/or Linux OSs. Client computing devices 104, 106, and 108 may be workstation computers running any of a variety of commercially-available UNIX® or UNIX-like OSs, including without limitation the variety of GNU/Linux OSs, such as for example, Google Chrome OS. Alternatively, or in addition, client computing devices 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary system environment 100 is shown with three client computing devices, any number of client computing devices may be supported. Other devices such as devices with sensors, etc., may interact with cloud infrastructure system 102.

Network(s) 110 may facilitate communications and exchange of data between clients 104, 106, and 108 and cloud infrastructure system 102. Network(s) 110 may be any type of network familiar to those skilled in the art that can support data communications using any of a variety of commercially-available protocols, including without limitation transmission control protocol/Internet protocol ("TCP/IP"), systems network architecture ("SNA"), Internet packet exchange ("IPX"), AppleTalk, etc. Merely by way of example, network(s) 110 can be a local area network ("LAN"), such as one based on Ethernet, Token-Ring, and/or the like. Network(s) 110 may be a wide-area network ("WAN") and the Internet. It may include a virtual network, including without limitation a virtual private network ("VPN"), an intranet, an extranet, a public switched telephone network ("PSTN"), an infra-red network, a wireless network (e.g., a network operating under any of the Institute of Electrical and Electronics ("IEEE") 802.11 suite of protocols, Bluetooth®, and/or any other wireless protocol); and/or any combination of these and/or other networks.

Cloud infrastructure system 102 may include one or more computers and/or servers. These computer systems or servers may be composed of one or more general purpose computers, specialized server computers (including, by way of example, PC servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 102 may be adapted to run one or more services or software applications described in the foregoing disclosure. For example, one or more computer systems or servers associated with cloud infrastructure system 102 may correspond to a server for performing processing described herein according to an embodiment of the present disclosure.

One or more computer systems or servers associated with cloud infrastructure system 102 may run an OS including any of those discussed above, as well as any commercially available server OS. One or more computer systems or servers associated with cloud infrastructure system 102 may also run any of a variety of additional server applications and/or mid-tier applications, including hypertext transport protocol ("HTTP") servers, file transfer protocol ("FTP") servers, common gateway interface ("CGI") servers, JAVA® servers, database servers, and the like.

In certain embodiments, services provided by cloud infrastructure system 102 may include a host of services that are made available to users of cloud infrastructure system 102 on demand, such as online data storage and backup solutions, Web-based e-mail services, hosted office suites and document collaboration services, database processing, managed technical support services, and the like. Services provided by cloud infrastructure system 102 can dynamically scale to meet the needs of its users. A specific instantiation of a service provided by cloud infrastructure system 102 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 102 may include protected computer network access to storage, a hosted database, a hosted Web server, a software application, or other service provided by a cloud vendor to a user, or as otherwise known in the art. For example, a service instance instantiated by cloud infrastructure 102 can include password-protected access to remote storage on the cloud through the Internet. As another example, a service instance instantiated by cloud infrastructure 102 can include a Web service-based hosted relational database and a script-language middleware engine for private use by a networked developer. As another example, a service instance instantiated by cloud infrastructure 102 can include access to an email software application hosted on a cloud vendor's Web site.

In certain embodiments, cloud infrastructure system 102 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 102 is "Oracle Public Cloud" from Oracle Corp.

Cloud infrastructure system 102 may provide the cloud services via different deployment models. For example, services may be provided under a public cloud model in which cloud infrastructure system 102 is owned by an organization selling cloud services (e.g., owned by Oracle Corp.) and the services are made available to the general public or different industry enterprises. As another example, services may be provided under a private cloud model in which cloud infrastructure system 102 is operated solely for a single organization and may provide services for one or more entities within the organization. The cloud services may also be provided under a community cloud model in which cloud infrastructure system 102 and the services provided by cloud infrastructure system 102 are shared by several organizations in a related community. The cloud services may also be provided under a hybrid cloud model, which is a combination of two or more different models.

In some embodiments, the services provided by cloud infrastructure system 102 may include one or more services provided under software as a service ("SaaS") category, platform as a service ("PaaS") category, infrastructure as a service ("IaaS") category, mobile backend as a service ("MBaas," also referred to as "BaaS") category, or other categories of services including hybrid services. In some embodiments, the services provided by cloud infrastructure system 102 may include, without limitation, application services, platform services, infrastructure services, backend services, etc. In some examples, application services may be provided by cloud infrastructure system 102 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 102 without the need for customers to purchase separate licenses and support. Examples of platform services include, without limitation, "Oracle Java Cloud Service" ("JCS") from Oracle Corp., "Oracle Database Cloud Service" ("DBCS") from Oracle Corp., and others.

By utilizing the services provided by the PaaS platform, customers can employ programming languages and tools supported by cloud infrastructure system 102 and also control the deployed services. In some embodiments, platform services provided by cloud infrastructure system 102 may include database cloud services, middleware cloud services (e.g., "Oracle Fusion Middleware" services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 102. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 102 may provide comprehensive management of cloud services (e.g., SaaS, PaaS, IaaS, and MBaaS services) in the cloud infrastructure system. In one embodiment, cloud management functionality may include capabilities for provisioning, managing, and tracking a customer's subscription received by cloud infrastructure system 102, and the like. In various embodiments, cloud infrastructure system 102 may be adapted to automatically provision, manage and track a customer's subscription to services offered by cloud infrastructure system 102. A customer, via a subscription order, may order one or more services provided by cloud infrastructure system 102. Cloud infrastructure system 102 then performs processing to provide the services in the customer's subscription order.

In one embodiment, cloud management functionality may be provided by one or more modules, such as order management and monitoring module 114. These modules may include or be provided using one or more computers and/or servers, which may be general purpose computers, specialized server computers, server farms, server clusters, or any other appropriate arrangement and/or combination.

In one example operation, a customer using client computing devices 104, 106, or 108, may interact with cloud infrastructure system 102 by requesting one or more services provided by cloud infrastructure system 102. The customer may issue service request 130 to cloud infrastructure system 102 using a variety of means. Service request 130 may include placing an order for a subscription for one or more services offered by cloud infrastructure system 102, accessing one or more services offered by cloud infrastructure system 102, or the like. In certain embodiments, the customer may access a cloud UI 132, 134, and/or 136, and place a subscription order via these UIs. The order information received by cloud infrastructure system 102 in response to the customer placing an order may include information identifying the customer and one or more services offered by the cloud infrastructure system 102 to which the customer intends to subscribe. After an order has been placed by the customer, the order information is received via cloud UIs, 132, 134, and/or 136.

In this example, order management and monitoring module 112 sends information received from a customer to an order database to have the order placed by the customer stored. The order database can be one of several databases operated by cloud infrastructure system 102 and operated in conjunction with other system elements. Order management and monitoring module 112 may forward information that includes all or part of the order information stored in the order database to an order management module. In some instances, the order management module may be configured to perform billing and accounting functions related to the order, such as verifying the order, and upon verification, booking the order.

Order management and monitoring module 112 may communicate all or part of the order information to an order orchestration module that utilizes the order information to orchestrate the provisioning of services and resources for the order placed by the customer. In some instances, the order orchestration module may orchestrate the provisioning of resources to support the subscribed services using the services of an order provisioning module.

In certain embodiments, the order orchestration module enables the management of business processes associated with each order and applies business logic to determine whether an order should proceed to provisioning. Upon receiving an order for a new subscription, the order orchestration module sends a request to the order provisioning module to allocate resources and configure those resources needed to fulfill the subscription order. The order provisioning module enables the allocation of resources for the services ordered by the customer. The order provisioning module provides a level of abstraction between the cloud services provided by cloud infrastructure system 102 and the physical implementation layer that is used to provision the resources for providing the requested services. The order orchestration module may thus be isolated from implementation details, such as whether or not services and resources are actually provisioned on the fly or pre-provisioned and only allocated/assigned upon request.

In certain embodiments, order management and monitoring module 112 manages and tracks a customer's subscription order. In some instances, order management and monitoring module 112 may receive information indicative of any provisioned services and/or resources associated with the customer. Order management and monitoring module 112 may be configured to collect usage statistics for the services in the subscription order, such as the amount of storage used, the amount of data transferred, the number of users, and the amount of system up time and system down time.

Once services and resources are provisioned in the above example, a service result 138 may be sent to customers on client computing devices 104, 106, and/or 108, informing the customer of the provided services and/or resources. In instances where service request 130 includes a request to access a service or have a service perform one or more operations, service result 138 may be send to customers on client computing devices 104, 106, and/or 108, providing the requested access or results of any operations, services performed, or data requested.

In certain embodiments, cloud infrastructure system 102 may include identity management module 114. Identity management module 114 may be configured to provide identity services, such as access management and authorization services in cloud infrastructure system 102. In some embodiments, identity management module 114 may control information about customers who wish to utilize the services provided by cloud infrastructure system 102. Such information may include information that authenticates the identities of such customers and information that describes which actions those customers are authorized to perform relative to various system resources (e.g., files, directories, applications, communication ports, memory segments, etc.) Identity management module 114 may also include the management of descriptive information about each customer and about how and by whom that descriptive information can be accessed and modified.

In certain embodiments, cloud infrastructure system 102 may also include infrastructure resources 116 for providing the resources used to provide various services to customers of cloud infrastructure system 102. In one embodiment, infrastructure resources 116 may include pre-integrated and optimized combinations of hardware, such as servers, storage, and networking resources, to execute the services provided by a PaaS platform and a SaaS platform.

In some embodiments, resources in cloud infrastructure system 102 may be shared by multiple users and dynamically re-allocated per demand. Additionally, resources may be allocated to users in different time zones. For example, cloud infrastructure system 102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 118 may be provided that are shared by different components or modules of cloud infrastructure system 102 and by the services provided by cloud infrastructure system 102. These internal shared services 118 may include, without limitation, a security and identity service, an integration service, an enterprise repository service, an enterprise manager service, a virus scanning and white list service, a high availability, backup, and recovery service, a service for enabling cloud support, an email service, a notification service, a file transfer service, and the like.

In certain embodiments, a number of external shared services 120 may be provided that are shared by different components or modules of cloud infrastructure system 102 and by the services provided by cloud infrastructure system 102. These external shared services 120 may include, without limitation, a security and identity service, an integration service, an enterprise repository service, an enterprise manager service, a virus scanning and white list service, a high availability, backup, and recovery service, a service for enabling cloud support, an email service, a notification service, a file transfer service, and the like.

In various embodiments, external shared services 120 may include one or more components that provide access, data transformation, automation, or the like, to one or more enterprise computer systems 126. Access to enterprise computer system(s) 126 may be shared by different components or modules of cloud infrastructure system 102 and by the services provided by cloud infrastructure system 102. In some embodiments, access to enterprise computer system(s) 126 may be shared by service instances provided by cloud infrastructure system 102 that are restricted to one or more subscribers.

In further embodiments, external shared services 120 may include external application programming interface ("API") services 128 that are shared by different components or modules of cloud infrastructure system 102 and by the services provided by cloud infrastructure system 102. These external API services 128 may include, without limitation, APIs provided by other third party services or entities.

Mobile Cloud Services

Various different mobile cloud services may be provided by mobile cloud services ("MCS") 122 in cloud infrastructure system 102. MCS 122 facilitates communication between a mobile computing device and enterprise computer systems (e.g., enterprise computer system(s) 126) according to some embodiments of the present invention. MCS 122 may include one or more memory storage devices ("local storage") used to store enterprise data and authentication information. Enterprise data may be received from enterprise computer system(s) 126 or from client computing devices 104, 106, or 108, or may include enterprise data converted by cloud infrastructure system 102, or combinations thereof. Authentication information may be received from identity management system 114 and/or generated by cloud infrastructure system 102. In some embodiments, authentication information may include information indicating security authentication of a user with regard to a request for a service.

Enterprise computer systems 126 may be physically located beyond a firewall of cloud infrastructure system 102 at a different geographic location (e.g., remote geographic location) than cloud infrastructure system 102. In some embodiments, enterprise computer systems 126 may include one or more different computers or servers. In some embodiments, enterprise computer systems 126 may be part of a single computer system.

In certain embodiments, enterprise computer systems 126 may communicate with cloud infrastructure system 102 using one or more different protocols. Each of enterprise computer systems 126 may communicate with cloud infrastructure system 102 using a different communication protocols. Enterprise computer systems 126 may support the same or different security protocols. In some embodiments, MSC 122 may include an agent system to handle communication with enterprise computer systems 126.

A protocol may include a communication protocol, such as "SPeeDY" ("SPDY"). A protocol may include an application protocol such as an HTTP-based protocol. In some embodiments, enterprise computer systems 126 may communicate with cloud infrastructure system 102 using a communication protocol such as Representational State Transfer ("REST") or Simple Object Access Protocol ("SOAP"). For example, REST protocol may support formats including uniform resource identifier ("URI") or uniform resource locator ("URL"). Enterprise Data formatted for communication using REST protocol may be easily converted to data formats such as JavaScript Object Notation ("JSON"), comma-separated values ("CSV"), and really simple syndication ("RSS"). Enterprise computer systems 126 and cloud infrastructure system 102 may communicate using other protocols such as remote procedure calls ("RPC") (e.g., Extensible Markup Language ("XML") RPC).

In some embodiments, MCS 122 may include an adaptor interface configured to support communication with one or more services provided by cloud infrastructure service 102, some of which may support different protocols or techniques for communications. In some embodiments, MCS 122 may include an adaptor interface configured to support communication with enterprise computer systems 126, some of which may support different protocols or techniques for communications. MCS 122 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 126.

In certain embodiments, client computing devices 104, 106, and 108, may each implement an application that can provide specific UIs to communicate with MCS 122. A specific UI may be configured to communicate using a specific communication protocol. In some embodiments, specific UIs may include callable interfaces, functions, routines, methods, and/or operations that may be invoked to communicate with MCS 122. Specific UIs may accept as input parameters for communicating with a service provided by cloud infrastructure service 102 or with enterprise computer systems 126 for enterprise data and/or to request a service. In some embodiments, communication through MCS 122 may be converted for communication using a custom communication protocol. In some embodiments, specific UIs may correspond to a custom client in an application.

MCS 122 may include one or more callable interfaces, e.g., an API. Callable interfaces associated with MCS 122 may enable an application on a mobile computing device to communicate requests to MCS 122. Callable interfaces associated with MCS 122 may support a common or standard interface, which may allow requests including their parameters to be received from apps according to a standardized protocol, architectural style, and/or format (e.g., a REST protocol). Callable interfaces associated with MCS 122 may be configurable by a user of any one of computing devices 104, 106, or 108. Callable interfaces associated with MCS 122 may receive requests for services according to a communication protocol. Device application developers may connect to MCS 122 for their custom applications. In some embodiments, a callable interface associated with MCS 122 may be configured by the same person that develops an application, such that the person can implement a custom application to communicate with MCS 122.

Callable interfaces associated with MCS 122 may further enable enterprise computer systems 126 to communicate with MCS 122 according to a standardized protocol or format. Similar to application developers, those who manage enterprise computer systems may implement code (e.g., an agent system) that is configured to communicate with MCS 122 via one or more callable interfaces. Callable interfaces associated with MCS 122 may be implemented based on a type of a computing device, a type of enterprise computer systems, an application, an agent system, a service, a protocol, or other criterion. In some embodiments, callable interfaces associated with MCS 122 may support requests for services including authentication, compression, encryption, pagination with cursors, client-based throttling, non-repudiation, logging, and metrics collection. In some embodiments, callable interfaces associated with MCS 122 may be implemented for custom business-related services, such as authentication, policy enforcement, caching of responses, throttling of calls to MCS 122, translation between asynchronous and synchronous patterns, logging of calls to underlying services, or combinations thereof. In some embodiments, callable interfaces associated with MCS 122 may enable users to load custom code for implementation by cloud infrastructure system 102. The custom code may implement one or more callable interfaces associated with MCS 122 for cloud infrastructure system 102, which can enable users to access custom services or other enterprise computer systems.

Protocol translators associated with MCS 122 may process a message to determine a communication protocol for a message and/or to convert a message to a communication protocol for a destination. Protocol translators associated with MCS 122 may convert a request received from client computing devices 104, 106, or 108. The request may be converted from a format of a communication protocol supported by client computing devices 104, 106, or 108, to a format of a communication protocol supported by a service provided by cloud infrastructure service 102 or enterprise computer systems 126. Protocol translators associated with MCS 122 may convert a response received from a service provided by cloud infrastructure service 102 or enterprise computer systems 126. A response may be converted from a format of a communication protocol supported by a service provided by cloud infrastructure service 102 or enterprise computer systems 126 to a format of a communication protocol supported by client computing devices 104, 106, or 108.

Security services associated with MCS 122 may manage security authentication for requests received from any of client computing devices 104, 106, or 108. Security services associated with MCS 122 may protect the integrity of customer processes and enterprise data. To prevent system or data from being compromised, security authentication may occur when a request is received from client computing devices 104, 106, or 108. Security authentication may be performed before a request is dispatched for processing by cloud infrastructure system 102. The security authentication determined for a user may enable a user associated with a mobile computing device to have authorization to request services via MCS 122. The security authentication may reduce efforts for a user to authenticate for different requests and/or services requested via MCS 122. Security services associated with MCS 122 may be implemented as one or more functional blocks or modules configured to perform various operations authenticating security of a request.

Authentication services associated with MCS 122 may manage security authentication for requests received from client computing devices 104, 106, or 108. Authentication services associated with MCS 122 may determine security authentication for a user associated with a computing device that sends a request to MCS 122. Security authentication may be determined based on a time period, which may be tied to operation of an application (e.g., launching an application), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 102 may store authentication information of users received from enterprise computer systems or authentication systems supporting enterprise computer systems. Cloud infrastructure system 102 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, cloud infrastructure system 102 may initiate communication with a requesting computing device to determine authentication.

In some embodiments, security authentication may be determined based on a role associated with a user requesting a service. The role may be associated with a user requesting access to MCS 122. In some embodiments, a user may request services as a subscriber or tenant of MCS 122 who may be granted access to resources and/or services provided by MCS 122. Authentication may correspond to a user's subscription to MCS 122, such that a user may be authorized to request services via MCS 122 as a subscriber. In some embodiments, the subscription may be limited to a particular set of resources provided by MCS 122. Security authentication may be based on the resources and/or services accessible to the user of MCS 122. In some embodiments, a request may be provisioned as a template during execution called a "runtime environment." The runtime environment may be associated with resources that are allocated for a request, a user, or a device.

In some embodiments, authentication services associated with MCS 122 may request an identity management system to determine security authentication for the user. The identity management system may be implemented by cloud infrastructure system 102 (e.g., as identity management 114) or by another computer system that is external to cloud infrastructure system 102. Identity management 114 may determine security authentication of the user based on the user's role or subscription for accessing MCS 122. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

Application Development Framework

Various different ADFs 124 may be provided in cloud infrastructure system 102. ADFs 124 provide the infrastructure code to implement agile applications that are based on a Service Oriented Architecture ("SOA"). ADFs 124 further provide a visual and declarative approach to development through one or more development tools (e.g., "Oracle JDeveloper 11g" development tool). One or more frameworks provided by ADFs 124 may implement an MVC design pattern. Such frameworks offer an integrated solution that covers all layers of the MVC architecture with solutions to such areas as object/relational mapping, data persistence, reusable controller layer, rich Web UI framework, data binding to UI, security, and customization. Extending beyond the core Web based MVC approach, such frameworks also integrate with the Oracle SOA and WebCenter Portal frameworks, thus simplify the creation of complete composite applications.

In certain embodiments, ADFs 124 make it easy to develop agile applications that expose data as services by coupling a service interface to built-in business services provided by cloud infrastructure system 102. This separation of business service implementation details is performed in ADFs 124 via metadata. Use of this metadata-driven architecture enables application developers to focus on the business logic and user experience, rather than the details of how services are accessed. In certain embodiments, ADFs 124 store implementation details of services in metadata in a model layer. This enables developers to exchange services without modifying the UI, making the application extremely agile. Additionally, the developer creating the UI does not need to bother with business service access details. Instead, developers can focus on developing the application interface and interaction logic. Creating the user experience can be as simple as dragging-and-dropping the desired business services onto a visual page designer and indicating what type of component should represent that data.

In various embodiments, developers interact with ADFs 124 to create modules forming enterprise applications. The enterprise applications can be executed within the context of cloud infrastructure system 102. In various embodiments, developers interact with ADFs 124 to create modules forming mobile applications. The mobile applications can be executed within the context of cloud infrastructure system 102. Features of the present invention described below may be implemented using any desired combination of programming languages and ADFs as will be apparent to one skilled in the relevant arts by reading the disclosure provided herein.

One or more frameworks provided by ADFs 124 may be embodied as "Oracle ADF" from Oracle Corp. in one example. Accordingly, a framework in ADFs 124 can be based on an MVC design pattern. An MVC application is separated into: 1) a model layer that handles interaction with data sources and runs the business logic, 2) a view layer that handles the application UI, and 3) a controller that manages the application flow and acts as the interface between the model and view layers. Separating applications into these three layers simplifies maintenance and reuse of components across applications. The independence of each layer from the others results in a loosely coupled SOA.

In various embodiments, ADFs 124 provide tools and resources allowing developers to create an application in the form of multiple layers, each layer containing code modules/files implementing a desired logic according to a pre-defined specification. Thus, in one embodiment, ADFs 124 enable the application to be developed as four layers: a view layer containing code modules/files that provide the UI of the application, a controller layer containing code modules that control the flow of the application, a model layer containing data/code modules that provide an abstraction layer for the underlying data, and a business services layer containing code modules that provide access to data from various sources and handle business logic.

In certain embodiments, ADFs 124 let developers choose the technology they prefer to use when implementing each of the layers. Enterprise JavaBean ("EJB"), Web Services, JavaBeans, JPA/EclipseLink/TopLink objects, and many others can all be used as Business Services for ADFs 124. View layers can include Web based interfaces implemented with JSF, Desktop Swing applications, and Microsoft Office front ends, as well as interfaces for mobile devices.

In one aspect, the view layer represents the UI of the application being developed. The view layer can include desktop, mobile, and browser-based views, each of which provides all or a portion of the UI and is accessible in a variety of manners corresponding to a view type. For example, Web pages may be sent by the application in response to receiving client requests containing corresponding URLs. The Web pages may then be displayed by a browser on a display unit (not shown) associated with a requesting client system, thereby enabling users of the requesting client system to interact with the enterprise application. ADFs 124 support multi-channel access to business services allowing reuse of business services and access from a Web client, a client-server swing desktop-based application, Microsoft Excel spreadsheets, mobile devices such as a smart-phone, or the like.

The code files/modules forming the view layer (such as Web pages) may be implemented using one or more of HTML, Java server pages ("JSP"), and JSF. Alternatively, the UI may be implemented using Java components such as Swing, and/or XML. As further noted, the UI may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFs 124. Some of the pre-defined modules may be used during development, for example, as templates for developing the Web pages, for including desired functionality in the developed code, etc. Other pre-defined modules (such as a URL rewriting module) may be deployed along with the developed application and may provide additional functionalities (mapping of requested URLs to internal names) to the user during execution of the enterprise application.

A controller layer contains code modules/files that control the flow of the application. Each controller object contains software instructions and/or data implemented according to a desired manner of presenting information in the view layer. The desired manner may include the specific Web pages to be displayed when links in another Web page are clicked/selected by the user, the page to be displayed when errors occur during execution, indicating the specific data to be stored/retrieved, etc.

In one aspect, the controller layer manages the application's flow and handles user input. For example, when a "Search" button is clicked on a page, the controller determines what action to perform (e.g., do a search) and where to navigate to (e.g., the results page). There are two controller options for Web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming the controller layer are often implemented as Java servlets receiving the client requests and sending desired Web pages as corresponding responses. Controller objects may also be implemented, for example, as Apache Jakarta Struts controllers or according to the JSF standard.

A model layer contains data/code modules that connect various business services to the objects that use them in the other layers, such as to the controller object discussed above or directly to desktop applications. Each abstract data object of the model layer provides a corresponding interface that can be used to access any type of business service, executing in an underlying business service layer. The data objects may abstract the business service implementation details of a service from a client and/or expose data control methods/attributes to view components, thus providing a separation of the view and data layers.

In one aspect, the model layer consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

In certain embodiments, ADFs 124 emphasize the use of the declarative programming paradigm throughout the development process to allow users to focus on the logic of application creation without having to get into implementation details. At a high level, the development process for a Fusion Web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using a unified modeling language ("UML") modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, a business services layer manages interaction with a data persistence layer. It provides such services as data persistence, object/relational mapping, transaction management, and business logic execution. The business services layer can be implemented in any of the following options: as simple Java classes, EJB, Web services, JPA objects, and Oracle ADF Business Components. In addition, data can be consumed directly from files (XML or CSV) as well as REST. Thus, each business service manages interaction with a corresponding data persistence layer, and also provides such services as object/relational mapping, transaction management, business logic execution, etc. The business services layer may be implemented using one or more of simple Java classes, Enterprise Java Beans, Web services, etc.

Business components represent a business service implemented using, for example, "Oracle ADF Business Components" from Oracle Corp., to provide interaction with databases, Web services, legacy systems, application servers, and the like. In one embodiment, business components of the business services layer contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplify the manipulation (e.g., update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Mobile Application Development Portal

Figure 2:
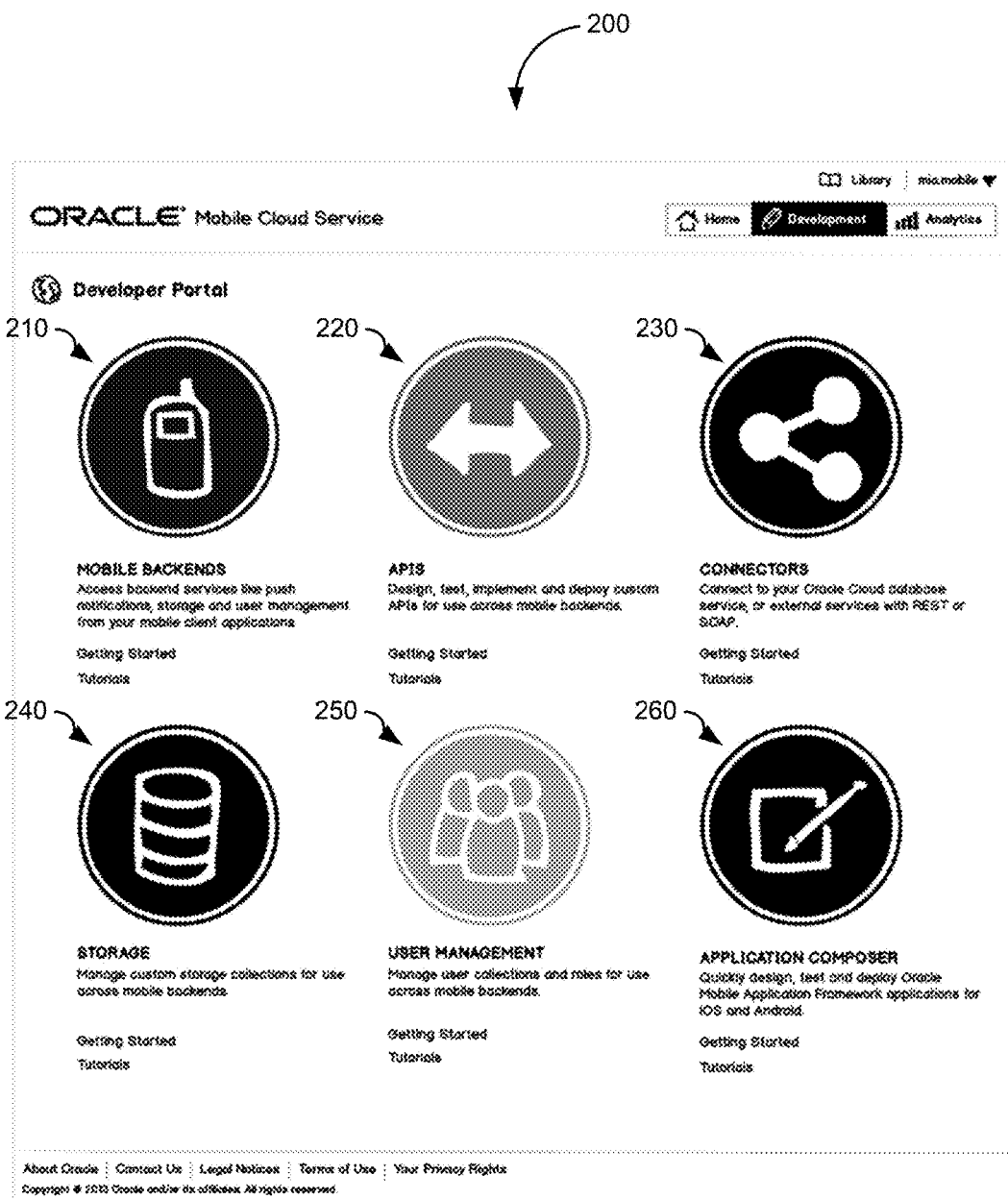
FIG. 2 illustrates a mobile application development portal that may be included in an application development framework for creating applications that use mobile cloud services of a cloud infrastructure system of the system environment of FIG. 1 in one embodiment.

FIG. 2 is an illustration of a mobile application development portal 200 that may be included in ADF 124 for creating applications that use MCS 122 of cloud infrastructure system 102 of system environment 100 of FIG. 1 in one embodiment. FIG. 2 is merely illustrative of an embodiment or implementation of mobile application development portal 200 and should not limit the scope of any invention as recited in the claims. One of ordinary skill in the art may recognize through this disclosure and the teachings presented herein other variations, modifications, and/or alternatives to those embodiments or implementations illustrated in the figures.

In this example, mobile application development portal 200 includes hardware and/or software elements that allow developers to create mobile applications through ADF 124 with access to underlying components of MCS 122. A mobile backend services module 210 provides developers with one or more tools, UIs, wizards, etc., to design, test, implement, deploy, and manage any number or type of backend services. Some examples of backend services include push notification services, storage services, user management services, or the like. A developer can specify how mobile applications access or utilize these backend services. Once backend services are created, the backend services can be automatically presented to a developer during application creation allowing the developer to select from a set of predetermined backend services for inclusion or use in a mobile application.

An API module 220 provides developers with one or more tools, UIs, wizards, etc., to design, test, implement, deploy, and manage APIs for use across mobile backend services. A developer can create one or more software intermediaries that make it possible for mobile applications to interact with backend services deployed using mobile backend services module 210. In one example, a developer can create an implementation of REST that exposes specific functionality while protecting the rest of a backend service. In another example, a developer can create an API that exposes functionality of a backend service according to predetermined criteria, such as user identity, mobile device type, data type, etc. Once APIs are created, they can be automatically presented to a developer during application creation allowing the developer to select from a set of predetermined APIs for inclusion or use in a mobile application.

A connectors module 230 provides developers with one or more tools, UIs, wizards, etc., to design, test, implement, deploy, and manage connections with other databases, applications, cloud-based applications and services, or external APIs. A developer can create one or more connections that make it possible for mobile applications to interact with other types of services, external applications or database, third-party APIs, or the like. A developer can specify that connectors access these services using a variety of techniques, such as REST or SOAP. Once connectors are created, the connectors can be automatically presented to a developer during application creation allowing the developer to select from a set of predetermined connectors for inclusion or use in a mobile application.

A storage module 240 provides developers with one or more tools, UIs, wizards, etc., to design, test, implement, deploy, and manage storage used across mobile backend services. A developer can create one or more storage collections that make it possible for mobile applications to retrieve and store data with mobile backend services. A user management module 250 provides developers with one or more tools, UIs, wizards, etc., to manage user access to mobile backend services. A developer can create one or more user collections, user roles, user groups, or the like that make it possible for mobile applications to comply with user access restrictions for mobile backend services.

An application composer module 260 provides developers with one or more tools, UIs, wizards, etc., to design, test, implement, deploy, and manage mobile applications. Mobile applications can be created for a variety of target platforms and devices, such as iOS, Android, Blackberry, or the like. In various embodiments, application composer module 260 provides a cloud-based rapid application development environment for building enterprise mobile applications. Application composer module 260 can package and deploy mobile applications as native apps. Application composer module 260 may be embodied as a multi-tenant application development environment hosted on "Oracle Public Cloud" from Oracle Corp. Application composer module 260 therefore can provide complete application lifecycle management in a cloud-based service.

In certain embodiments, application composer module 260 provides features applicable to a variety of user personas. For example, a business analyst may be a user who has good functional knowledge of a target backend system such as customer relationship management ("CRM"), human capital management ("HCM"), or the like. The business analyst can rapidly develop mobile applications using application composer module 260 through their understanding of business object relationships and their familiarity with general programming concepts. This type of user is typically comfortable using tools such as CRM Application Composer, WebCenter Layout Composer, SOA Business Process Composer, Sales Force Dot Com ("SFDC") Application Configuration tool, etc., enabling developers to efficiently create new mobile applications using application composer module 260.

In another example, an application developer can be a user that is comfortable with writing code using IDEs like JDeveloper and uses application development frameworks like ADF, OAFwk, Spring, J2EE etc. to extend and customize enterprise applications. This type of user can apply these principles to efficiently create new mobile applications using application composer module 260. In yet another example, an application administrator can be a user responsible for configuration, deployment, provisioning, patching and general maintenance of applications and application development environment. This type of user can again apply these principles to efficiently create new mobile applications using application composer module 260.

In certain embodiments, a customer of cloud infrastructure service 102 of FIG. 1 utilizes application composer module 260 to build a custom mobile application with on-premises eBusiness Suite ("EBS") services as a backend. A business analyst can expose mobile friendly REST APIs on the EBS backend using MCS 122. The business analyst can then build the mobile application using components of mobile application development portal 200.

In some embodiments, a partner may build extensions to a CRM product and seek to create a custom mobile application with the extensions and CRM services as backend. An application developer can extend the CRM with custom objects in JCS and uses MCS 122 to expose mobile friendly API mash-up for CRM and Custom objects. A business analyst can then build a mobile application using components of mobile application development portal 200 to incorporate the mash-up MCS API.

In further embodiments, a SIEBEL customer may build a custom mobile application using MCS API wrappers for SIEBEL backend and integration with LinkedIn. An application developer can build ADF Mobile LinkedIn features in JDeveloper and deploy the features using components of mobile application development portal 200. A business analyst can then build a mobile application using components of mobile application development portal 200 with the MCS API for SIEBEL and the LinkedIn features.

Mobile Application Composer

In certain embodiments, systems and methods are provided for building mobile applications using pre-defined templates. The pre-defined templates allow for using MCS 122 as backend services. A service definition can be presented to a developer during application development, thus allowing for rapid connection between UI design and backend services.

Figure 3:
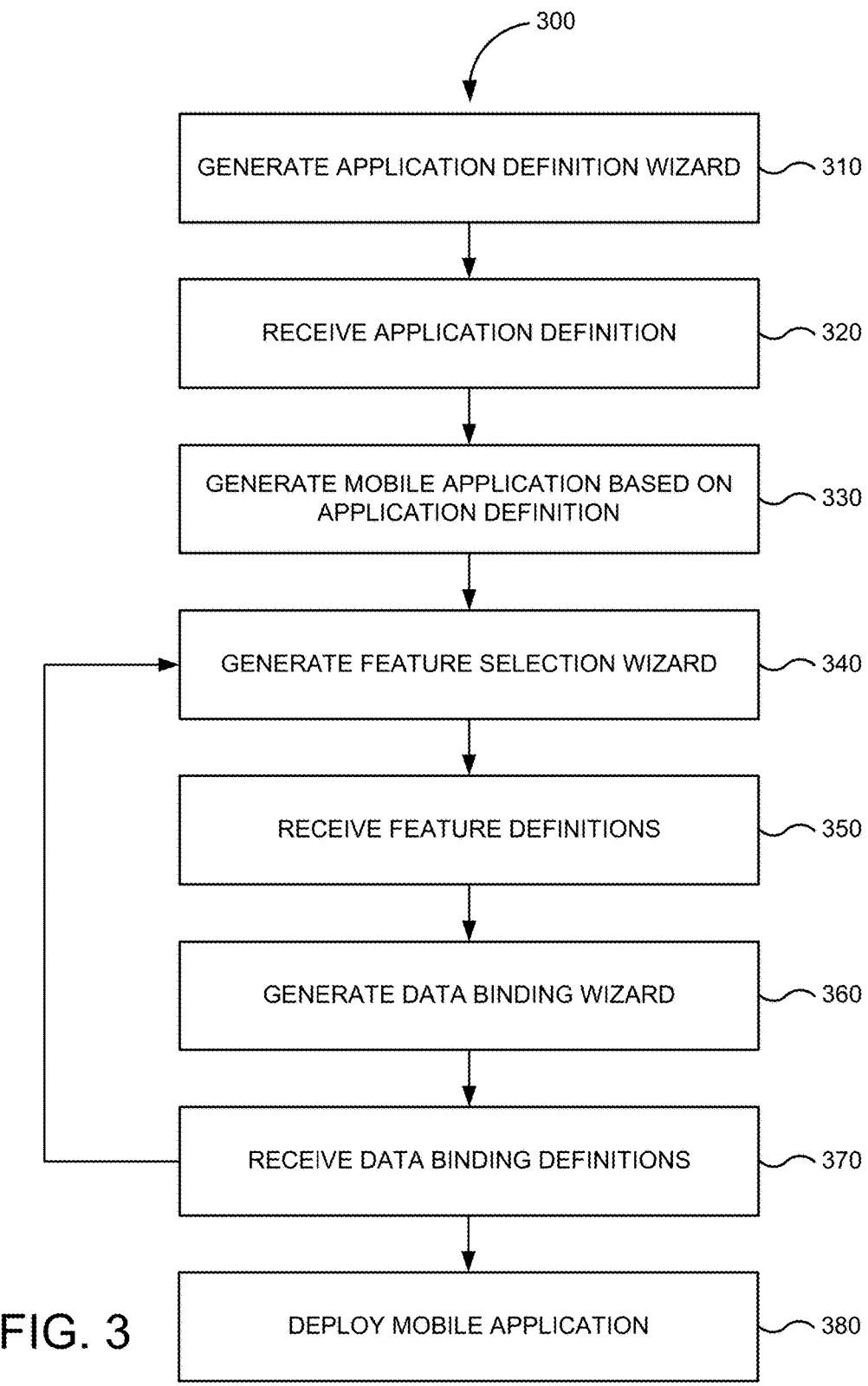
FIG. 3 is a flowchart of a method for creating a mobile application using a mobile application development portal in one embodiment.

FIG. 3 is a flowchart of functionality 300 for creating a mobile application using mobile application development portal 200 of FIG. 2 in one embodiment. Implementations of or processing depicted in FIG. 3 may be performed by software (e.g., instructions or code modules) when executed by a central processing unit ("CPU" or processor) of a logic machine, such as a computer system or information processing device, by hardware components of an electronic device or application-specific integrated circuits, or by combinations of software and hardware elements.

At 310, an application definition wizard is generated. An application definition wizard as used herein represents a set of one or more UIs that guide a user during the definition process of a mobile application that utilizes one or more pre-defined cloud-accessible services. The application definition wizard can implement one or more workflows each associated with a part of the application definition process. In one embodiment, the application definition wizard can prompt or otherwise guide a user to specify application defaults, such as application identifier prefixes, default icons, splash screens, default application/feature templates, setup enterprise provisioning profile/keystore, or the like.

Figure 4:
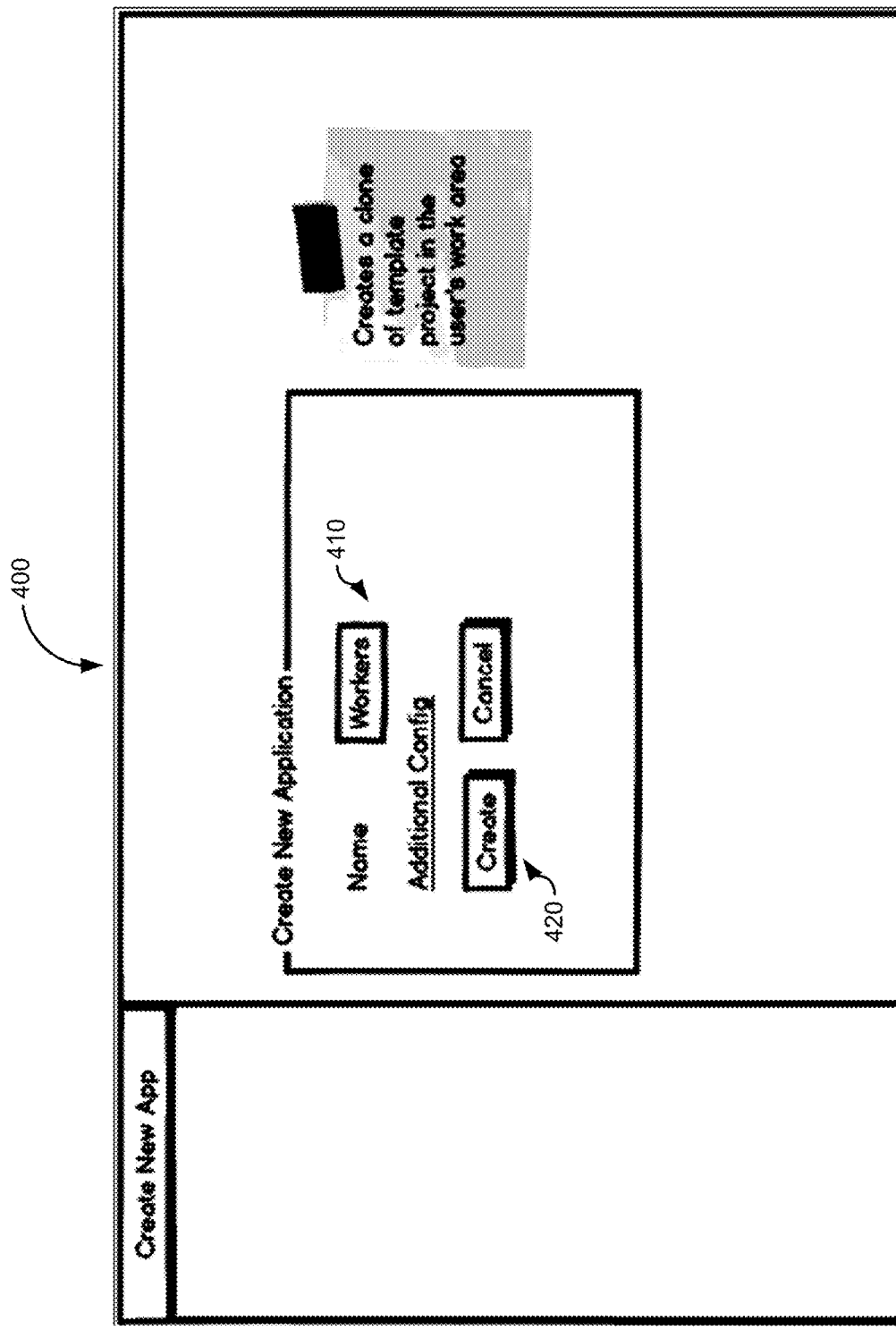
FIGS. 4-8 illustrate user interfaces that may be presented by an application definition wizard of a mobile application development portal in one embodiment.
Figure 5:
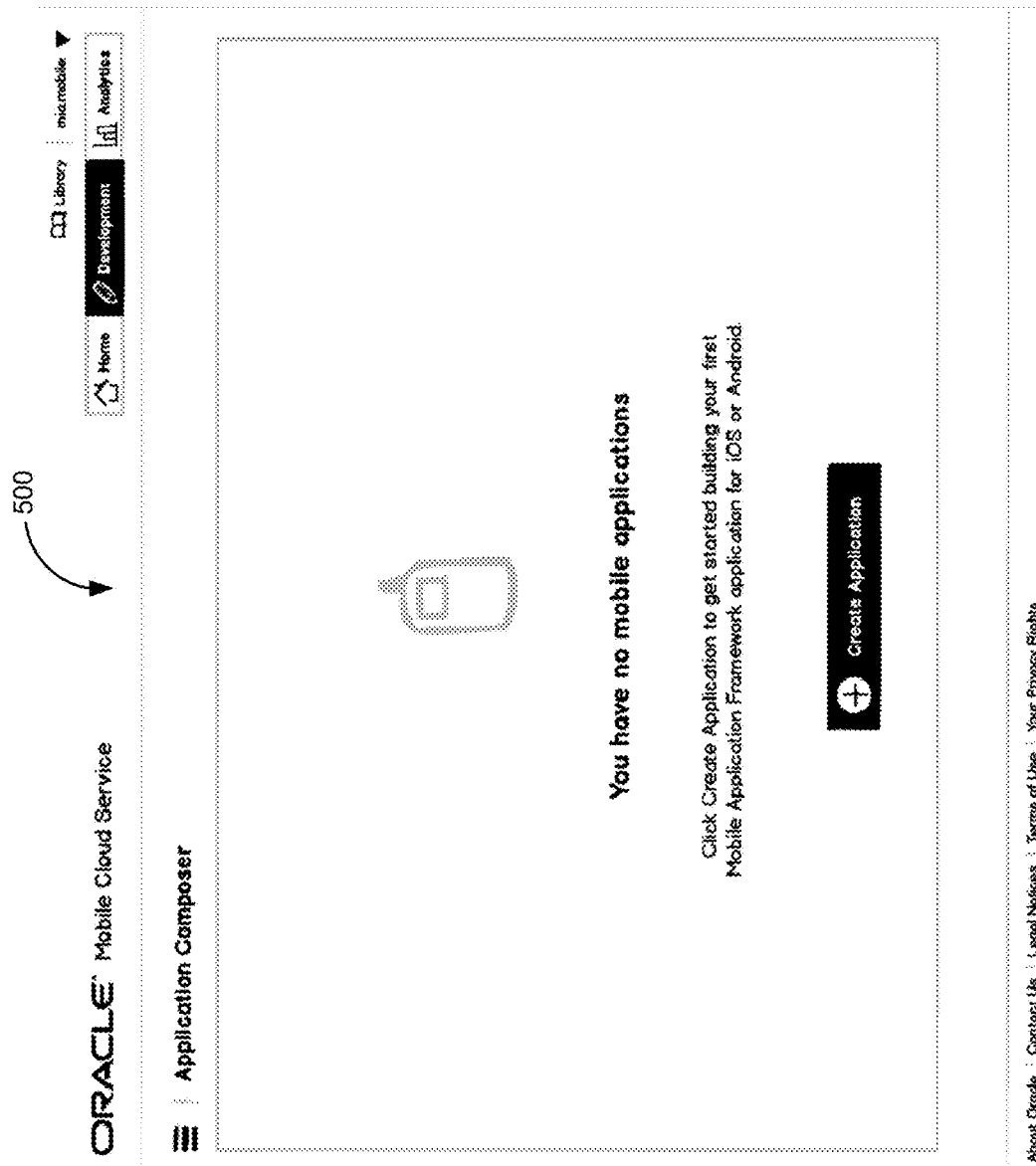
Figure 6:
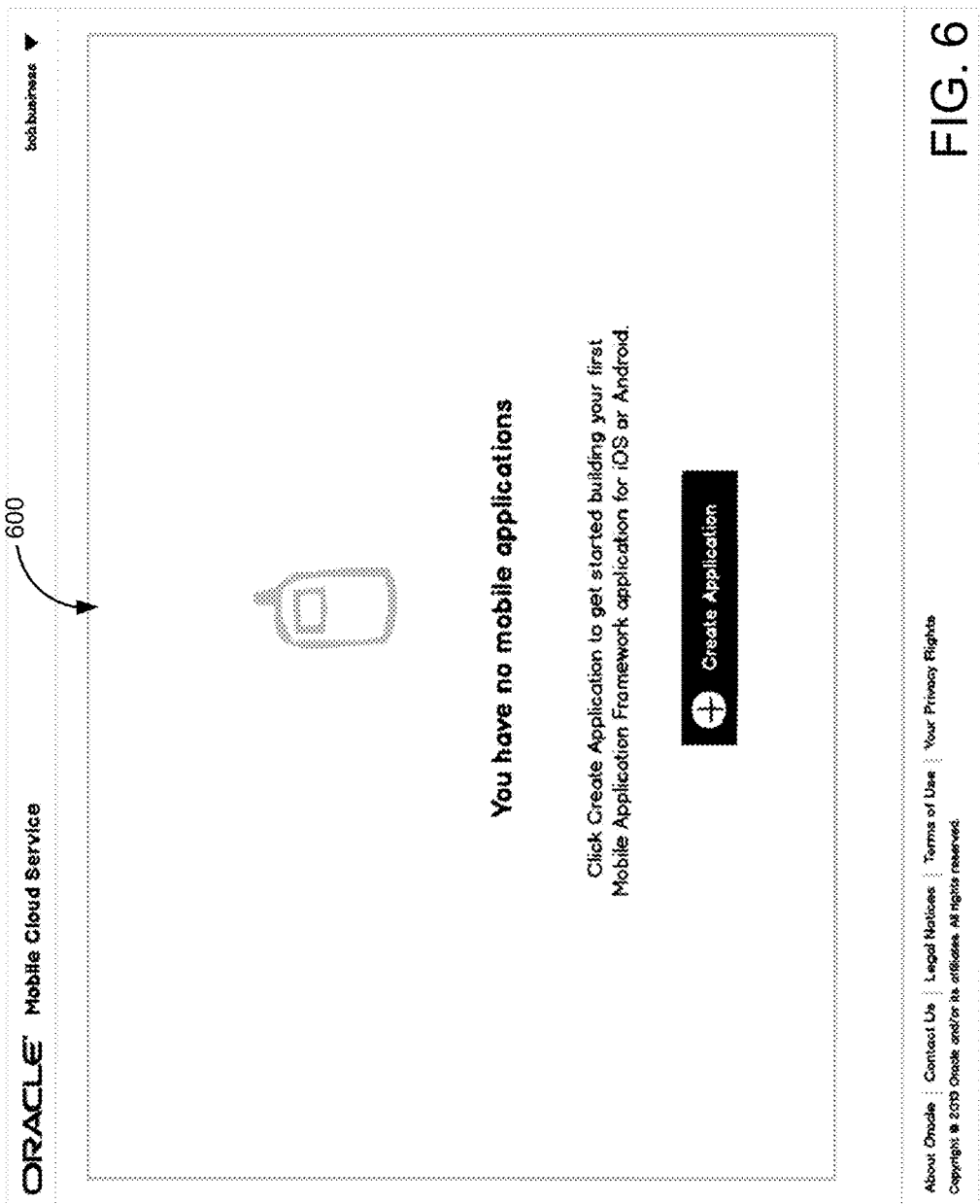
Figure 7:
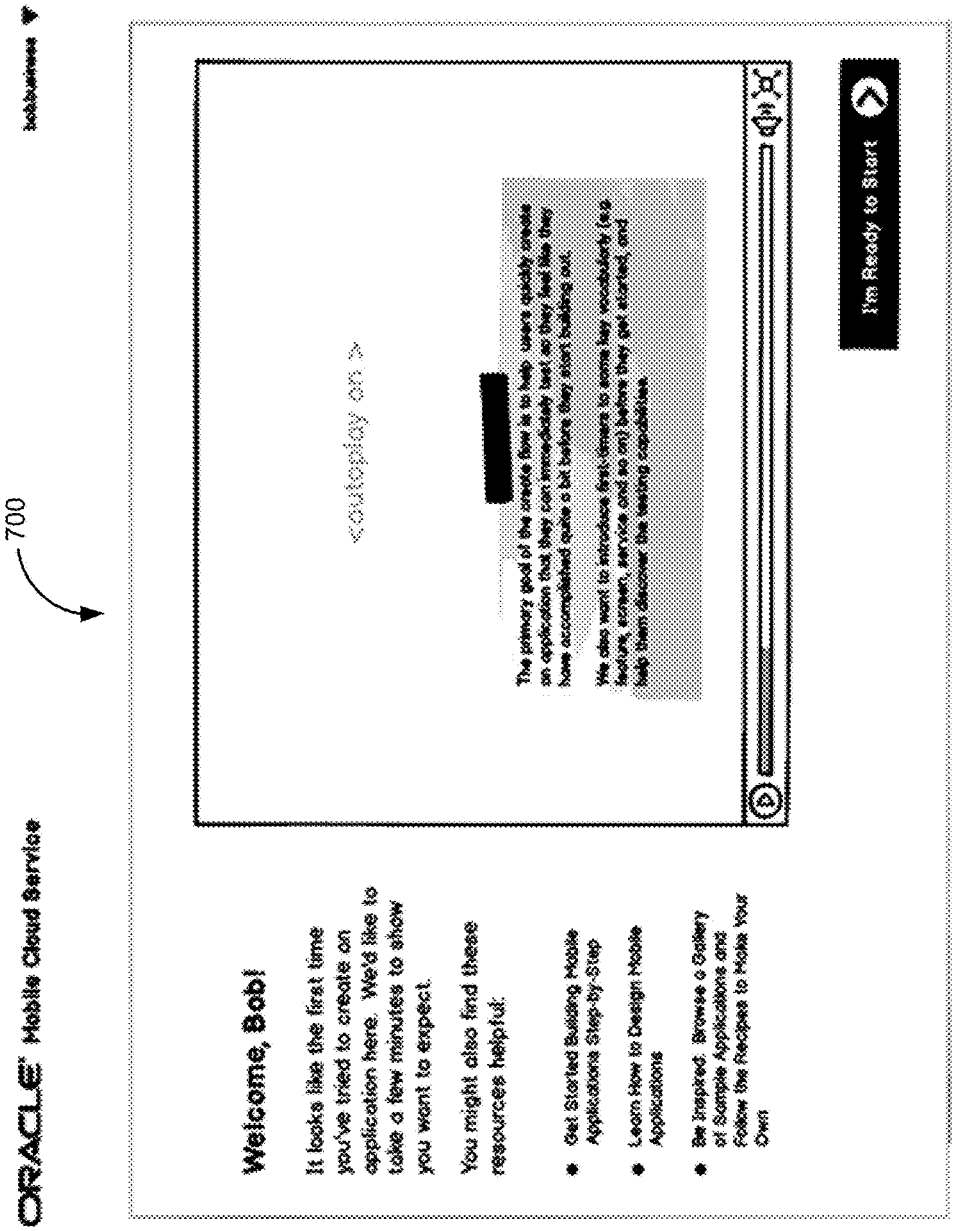

In certain embodiments, the application definition wizard can prompt or otherwise guide a user to specify an application name, a form factor (such as a phone or tablet device), a navigation type (e.g., none meaning a single feature or UI, as springboard, a navigation bar ("NavBar"), a Spring/Nav combo, or the like), and any application preferences. FIGS. 4-7 are illustrations of one or more UIs that may be presented by the application definition wizard. In FIG. 4, UI 400 includes UI element 410 where a developer specifies a name for a new mobile application. UI element 420 is associated with functionality that initiates the creation of the new mobile application. FIGS. 5 and 6 illustrate UIs 500 and 600 that provide a developer with a workspace that may include links to applications previously created by the developer as well as one or more options or UI elements to create a new application. FIG. 7 illustrates UI 700 that can provide a developer with a video tutorial or other help information to get the developer started with creating the new application.

Figure 8:
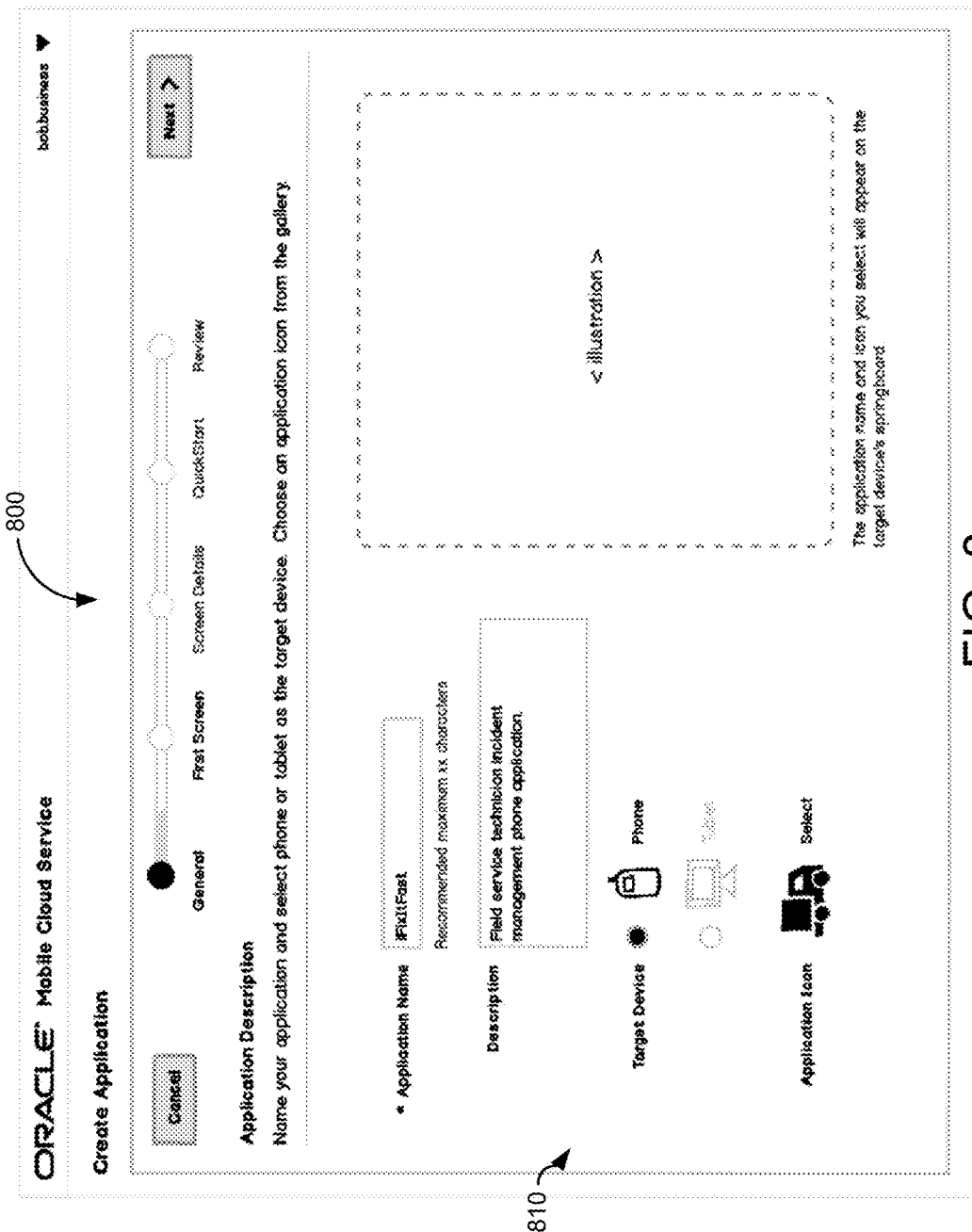

FIG. 8 illustrates UI 800 that provides a developer with a set of attributes 810 that define the new mobile application. As shown in FIG. 8, attributes 810 include an application name, a description, a target device type (e.g., phone, tablet, etc.), an icon. Other attributes may be presented and collected to form the application definition. FIG. 8 further illustrates a set of values specified for attributes 810 in one embodiment.

Figure 9:
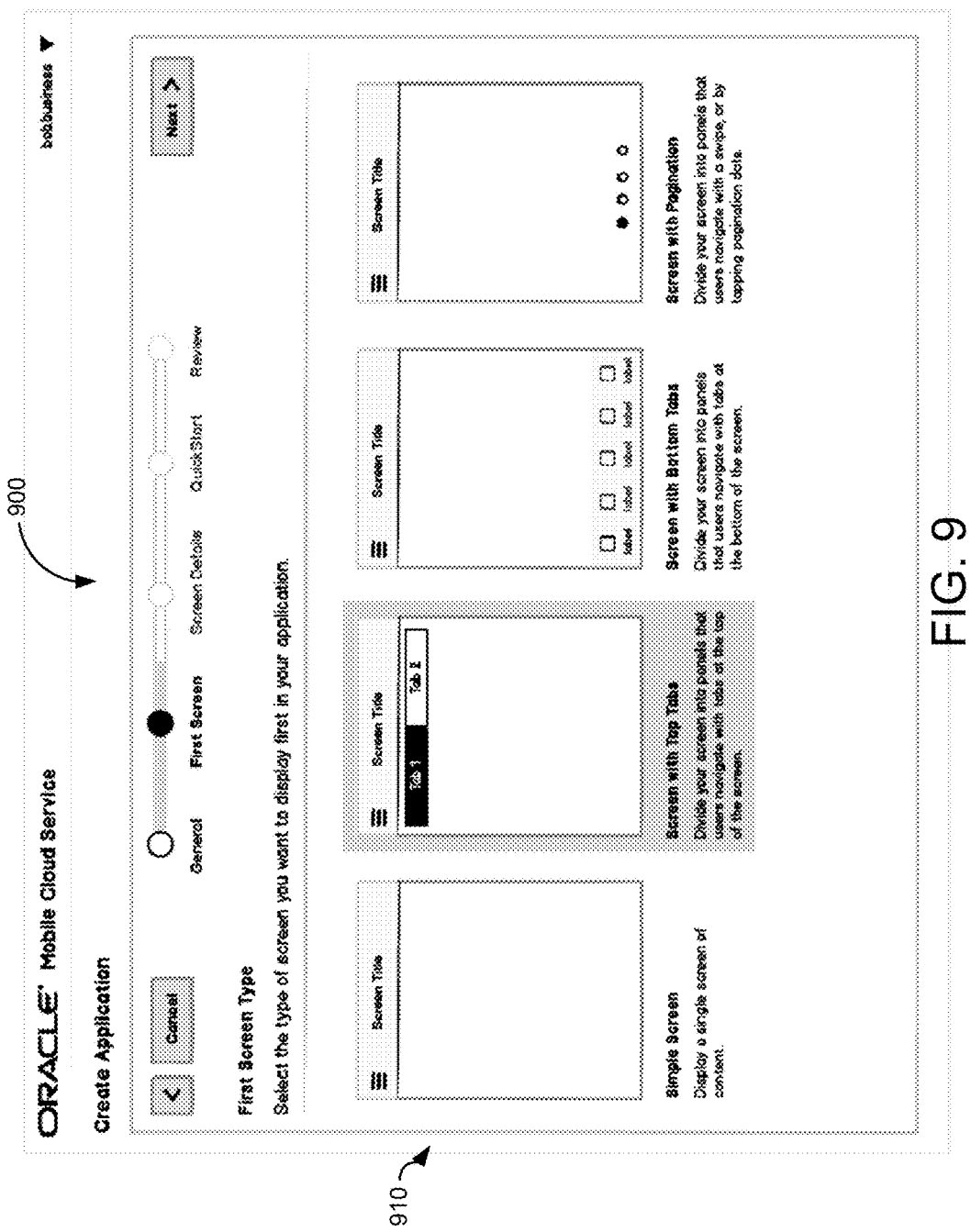
FIG. 9 illustrates a UI that provides a developer with a set of screen types that define the first screen of a new mobile application in one embodiment.

In certain embodiments, the application definition wizard can prompt or otherwise guide a developer to specify a type of first screen for the mobile application. In one aspect, a developer can be presented with a set of screen types, such as a simple screen, a screen with top tabs, a screen with bottom tabs, a screen with pagination, or the like. FIG. 9 illustrates UI 900 that provides a developer with a set of screen types 910 that define the first screen of the new mobile application. A default selection of a first screen may be set as a simple screen type. FIG. 9 illustrates that a developer has selected a screen with top tabs.

Figure 10:
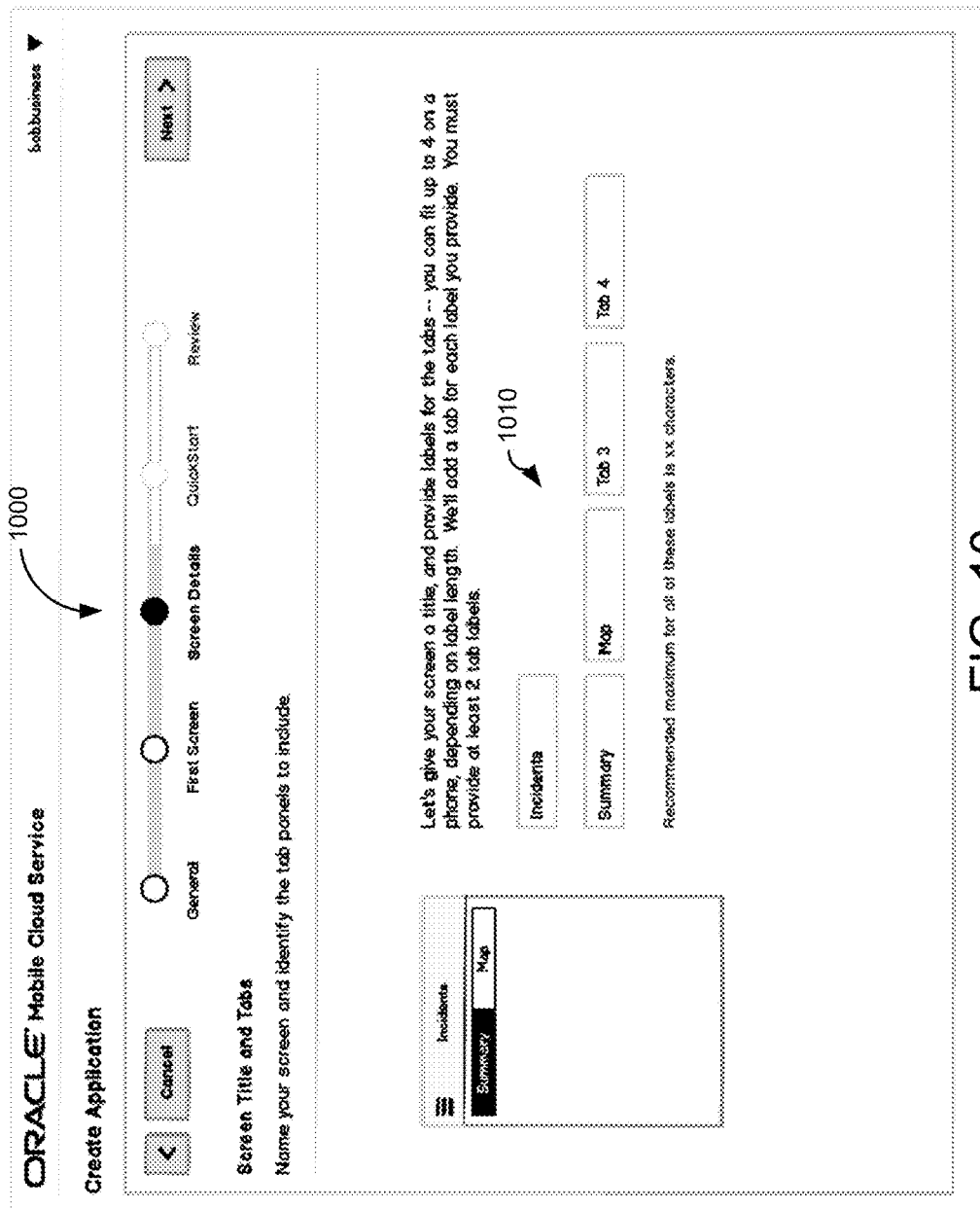
FIG. 10 illustrates a UI that provides a developer with a set of UI elements specific to a type of screen selected previously in one embodiment.

In certain embodiments, the application definition wizard can prompt or otherwise guide a developer to specify details of the first screen of the mobile application. In one aspect, a developer can be presented with a set of UI elements specific to the type of screen selected previously. FIG. 10 illustrates UI 1000 that provides a developer with a set of UI elements 1010 specific to the type of screen selected previously. FIG. 10 illustrates that based on the selection of the screen with top tabs, a developer is presented with UI elements 1010 to define the title of the screen and the names or labels of any tabs. FIG. 10 further illustrates that the developer has populated UI elements 1010 with desired information.

Figure 11:
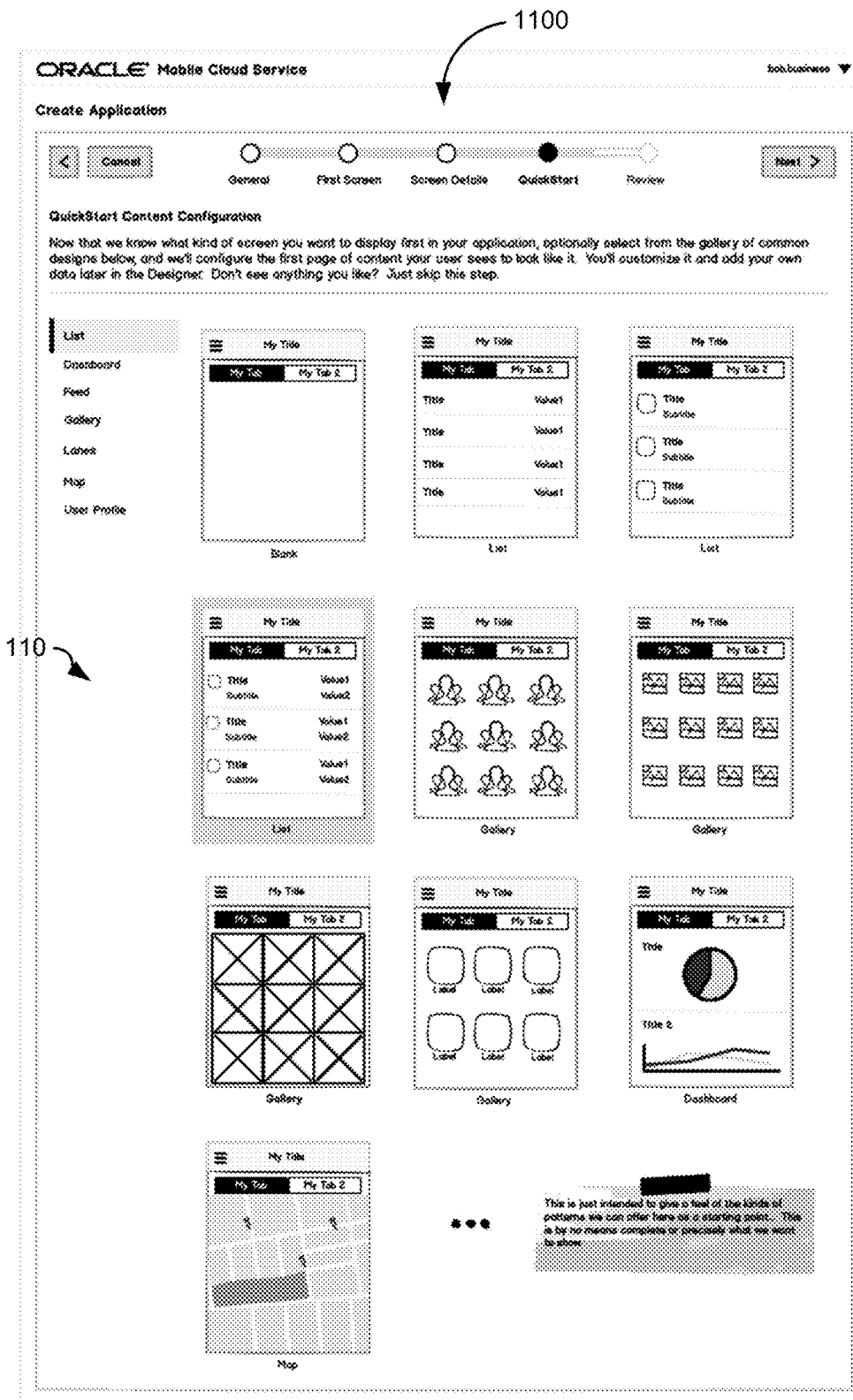
FIG. 11 illustrates a UI that provides a developer with a set of designs specific to a type of screen selected previously in one embodiment.

In certain embodiments, the application definition wizard can prompt or otherwise guide a developer to specify a design of the first screen of the mobile application. In one aspect, a developer can be presented with a set of screen designs specific to the type of screen selected previously. Some examples of designs can include a blank design having no screen items, a list-based design where screen items are arranged according to a predefined list layout, a gallery-based design where items are arranged according to a predefined gallery layout, a map-based design where screen items are arranged on a predefined map, or the like. FIG. 11 illustrates UI 1100 that provides a developer with a set of designs 1110 specific to the type of screen selected previously. A default design of the top tab first screen may be set as one having no additional elements (e.g., a blank canvas to be populated later by the developer). FIG. 11 illustrates that a developer has selected a list-based design.

In various embodiments, a set of templates can be presented to the developer. A template includes a set of cohesive UI components. Rather than requiring the developer to bind data to each individual UI elements, the developer can bind data to the template and then map how the data is presented using the template.

Figure 12:
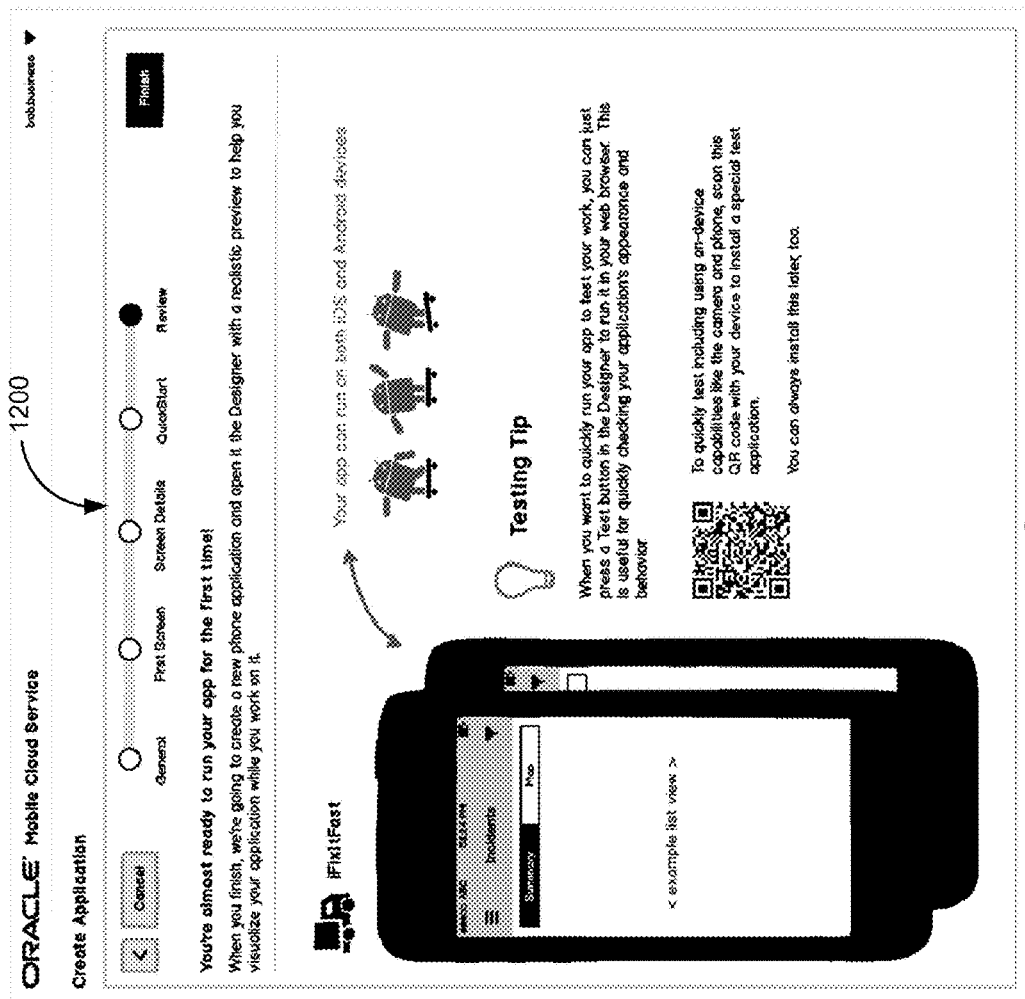
FIG. 12 illustrates a UI that provides a developer with options for finalizing details of a new application in one embodiment.

In certain embodiments, the application definition wizard can prompt or otherwise guide a developer to finalize details of the new application. FIG. 12 illustrates UI 1200 that provides a developer with one or more options for finalizing details of the new application. In certain embodiments, the developer may be presented with a QR code that installs a test application on the developer's device. This test application is different than the newly created application, but can be updated with the application information in order to test the application on the developer's device.

Referring again to FIG. 3, at 320, an application definition is received. As discussed herein, the application definition can include any information needed in order to create at least a minimally functional mobile application. At 330, a mobile application is generated based on the application definition. In one embodiment, the mobile application is represented in a simulator of the target device and can include a set of definitions that when interpreted, function as a compiled mobile application. In other embodiments, an updateable mobile application is compiled and deployed to a user's device. As development progresses on the mobile application, new features are deployed to the updateable mobile application on the user's device for testing.

At this point in the development process, the newly created mobile application can run in a simulator or on a developers device, however, the application has yet to be configured to provide any real data or provide any UIs other than the initial first screen.

At 340, a feature selection wizard is generated. A feature selection wizard as used herein represents a set of one or more UIs that guide a user during the development process of a mobile application that utilizes one or more pre-defined cloud-accessible services. The feature selection wizard can implement one or more workflows each associated with a part of the application development process. In one embodiment, the feature selection wizard can prompt or otherwise guide a user to specify features, UI modules, Business Object, or the like that can be used with the mobile application.

Figure 13:
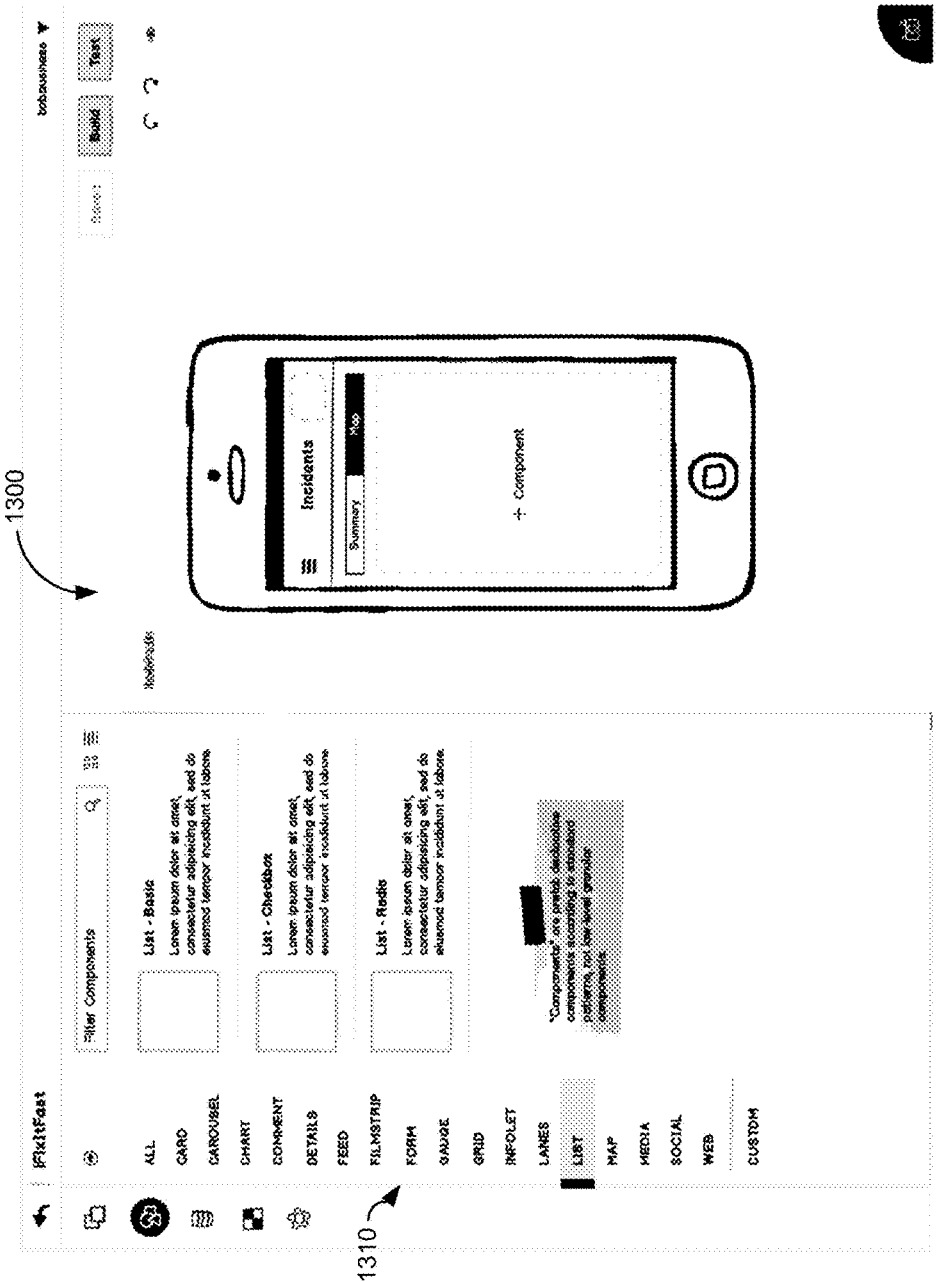
FIG. 13 illustrates a UI providing a catalog of usable components in one embodiment.
Figure 14:
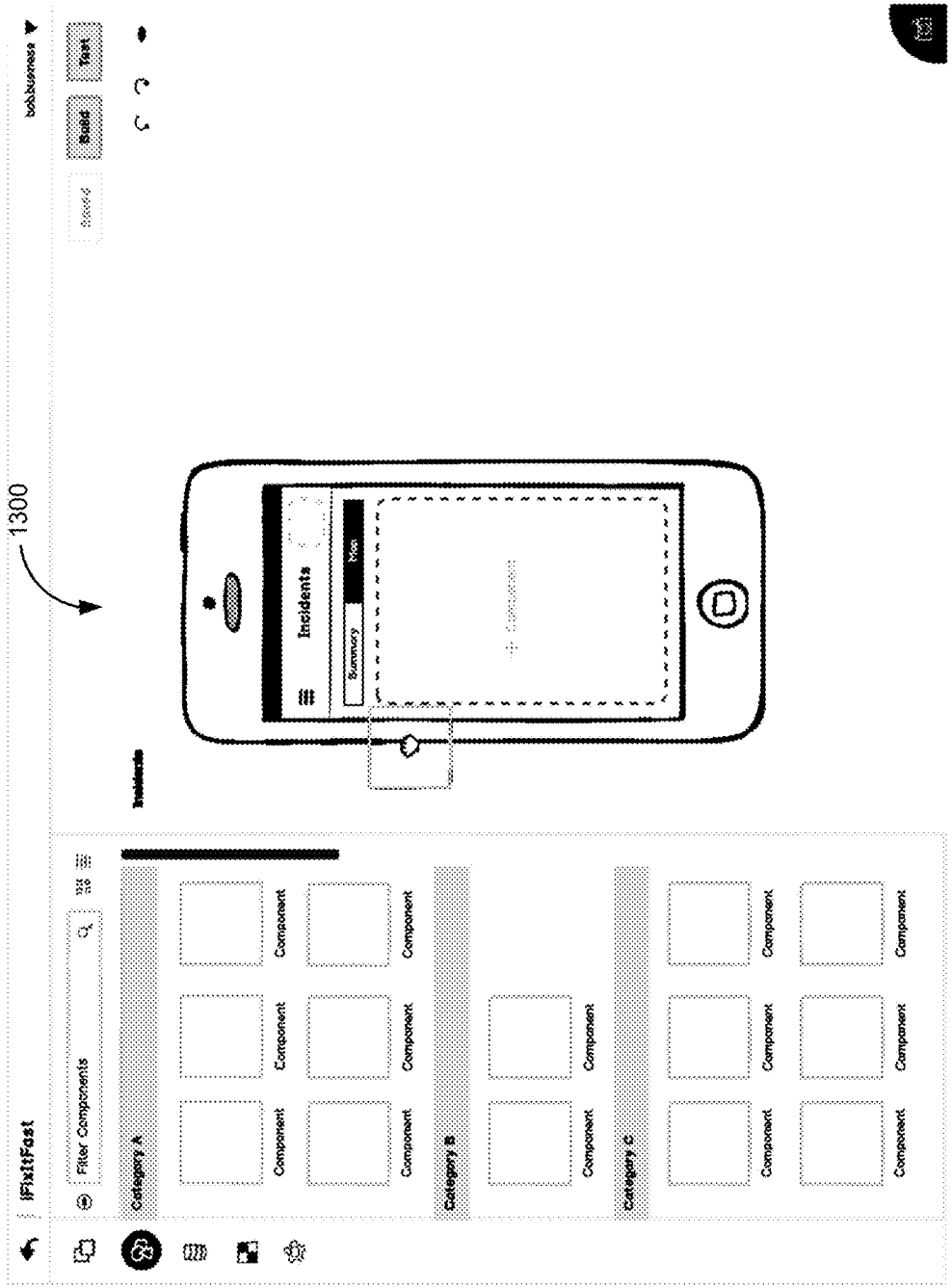
FIG. 14 illustrates a UI where a developer can add components to a screen using one or more gestures in one embodiment.
Figure 15:
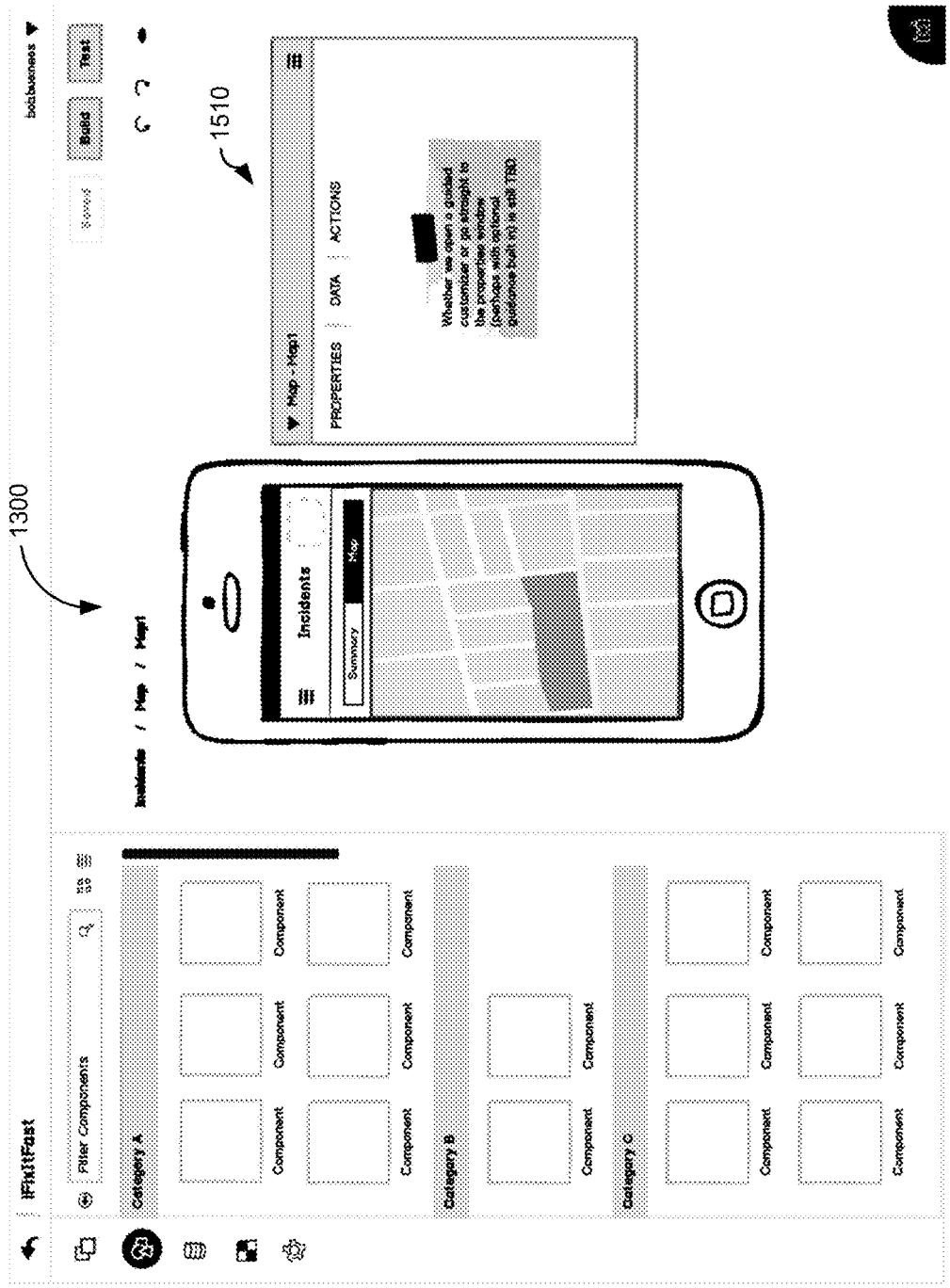
FIG. 15 illustrates a UI after a developer has added a map component to a screen in one embodiment.

In certain embodiments, the feature selection wizard can prompt or otherwise guide a user to specify components of the first screen of the mobile application. A component can be selected from a catalog of components. FIG. 13 is an illustration of UI 1300 providing a catalog of usable components in one embodiment. FIG. 14 is an illustration of UI 1300 where a developer can add components to a screen using one or more gestures in one embodiment. For example, a developer can add a component from the catalog using a drag and drop gesture. FIG. 15 is an illustration of UI 1300 after a developer has added a map component to a screen in one embodiment. In this example, guided customizer 1510 can be opened that allows the developer to configure the added component.

In certain embodiments, the feature selection wizard can prompt or otherwise guide a user to specify components of other screens of the mobile application. These other screens can form part of one or more UI modules. In certain embodiments, the feature selection wizard can prompt or otherwise guide a user to specify one or more UI modules of the mobile application. A UI module represents a processor, task, or flow that can be performed with respect to the mobile application. A UI module can be selected from a catalog of UI modules or a set of templates that provide cohesive collections of UI elements and page flows. Some examples of UI modules are approval workflows, worker tasks, data entry tasks, reports builders, or the like. A template provides a pre-set arrangement/binding of a set of UI elements so that a user only needs to configure those UI elements and bind the template instead of having to arrange and bind individual UI elements. In one embodiment, a user may contribute their own templates to the set of templates available to another user. The user can configure or otherwise specify a series of pages that represent the UI Module. For each page, the developer can be presented with a set of layout templates much like before. Each layout template might have several facets such as choosing a secondary template.

In some embodiments, the feature selection wizard can prompt or otherwise guide a user to specify additional features of the mobile application, such as business objects previously defined using, for example, mobile backend module 210, APIs module 220, or connectors module 230. The user can specify what resource of the backend service, API, or connector is to be used or otherwise associated with UI elements of each component, screen, UI module, or the like.

At 350, feature definitions are received, and at 360, a data binding wizard is generated. A data binding wizard as used herein represents a set of one or more UIs or UI elements of an existing UI that guide a user during the data binding process of a mobile application that utilizes one or more pre-defined cloud-accessible services. The data binding wizard can implement one or more workflows each associated with a part of the application development process. In one embodiment, the data binding wizard can prompt or otherwise guide a user to specify how features, screens, UI modules, etc., are bound to business objects, services, APIs, or the like that can be used with the mobile application.

Figure 16:
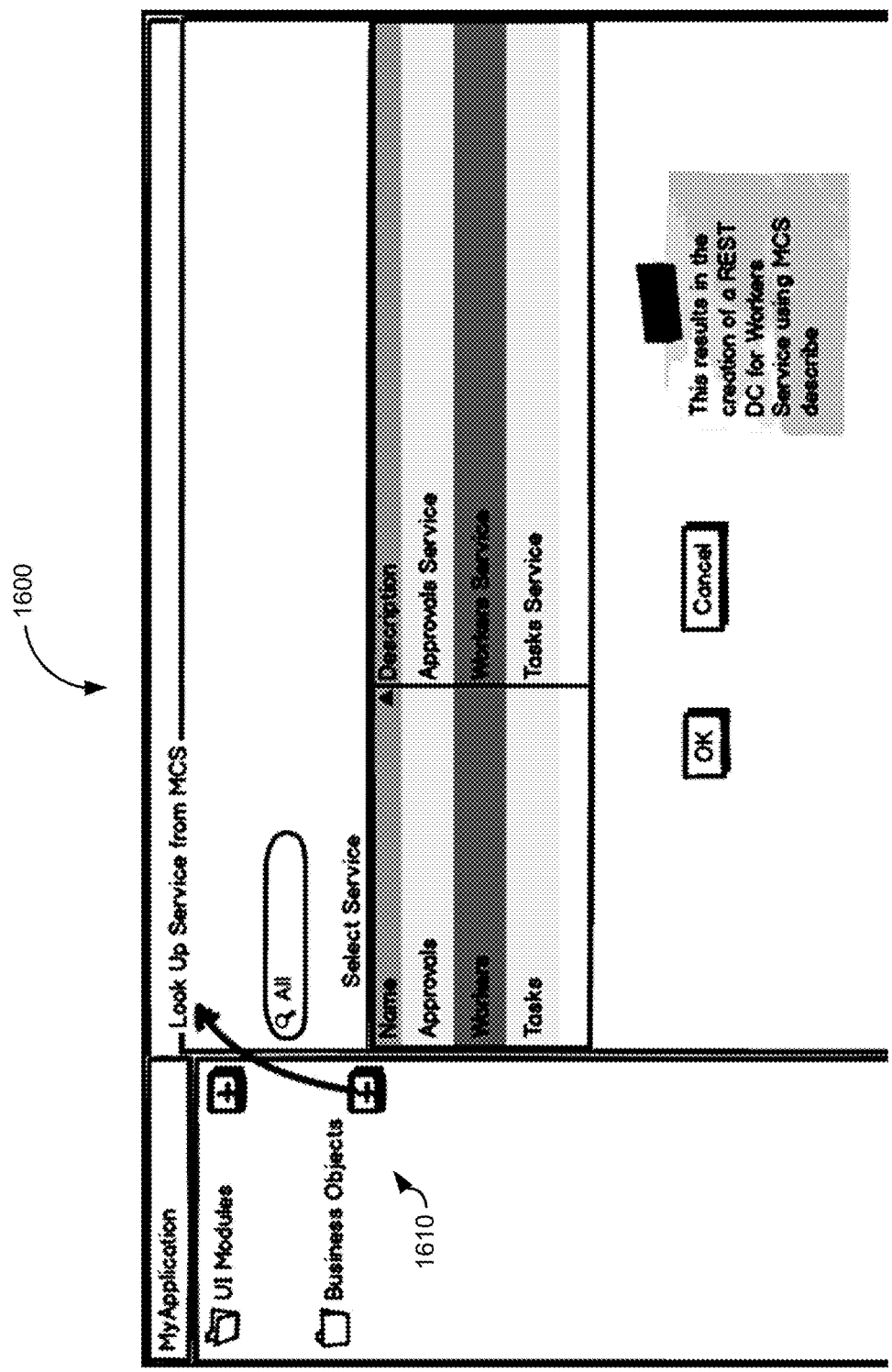
FIG. 16 illustrates a UI providing a catalog of services in one embodiment.
Figure 17:
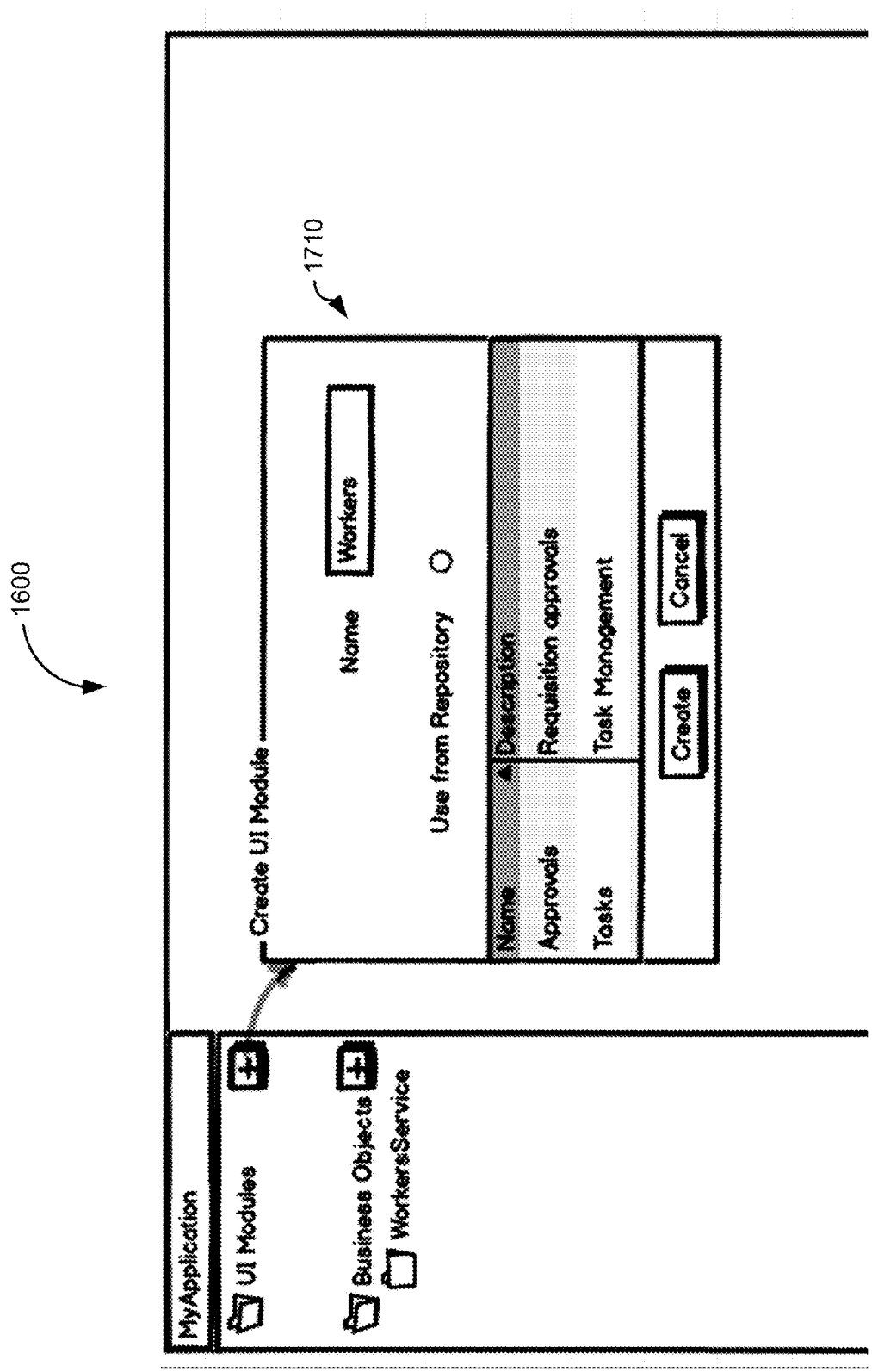
FIG. 17 illustrates a UI where a developer can create a UI module based on a selected business object in one embodiment.
Figure 18:
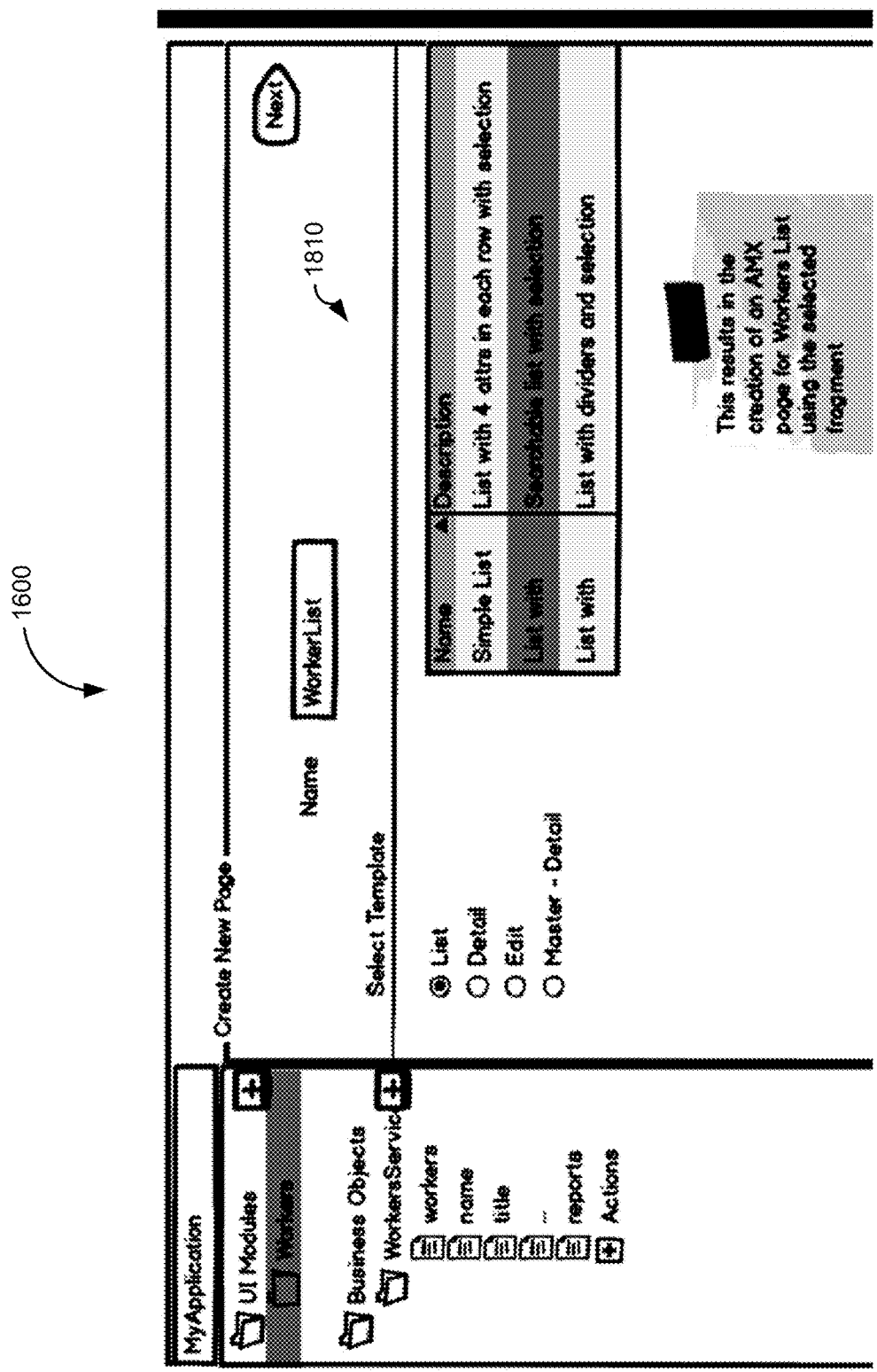
FIG. 18 illustrates a UI after a developer has added a UI module in one embodiment.
Figure 19:
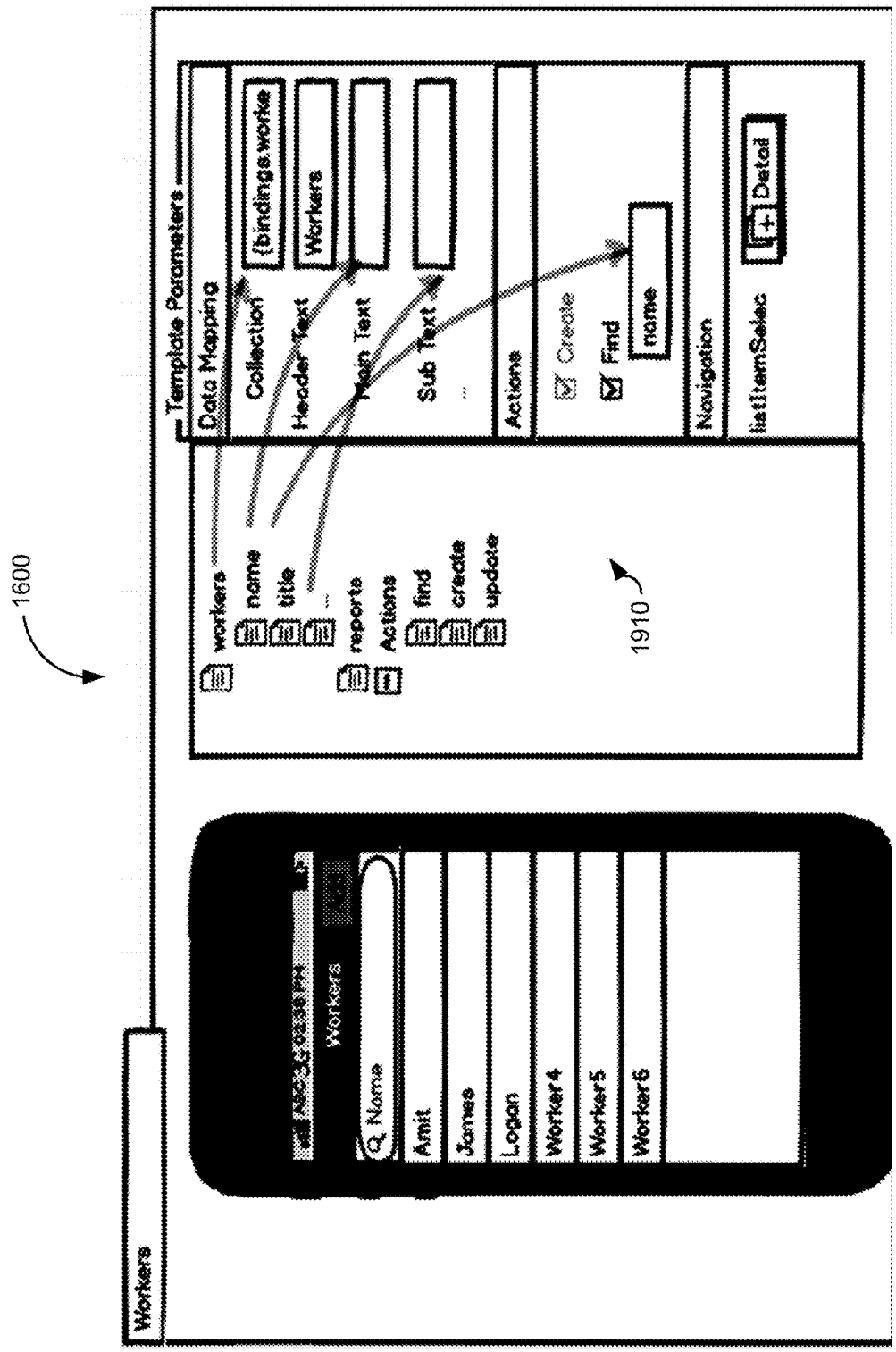
FIG. 19 illustrates a UI after performing data binding in one embodiment.

In certain embodiments, the data binding wizard can prompt or otherwise guide a user to specify a business object of the mobile application. A business object can be selected from a catalog or set of services, APIs, etc., that are available to the mobile application. FIG. 16 is an illustration of UI 1600 providing a catalog of services 1610 in one embodiment. FIG. 17 is an illustration of UI 1600 where a developer can create a UI module 1710 based on a selected business object in one embodiment. For example, a developer can add a Workers Service business object and create a Worker UI module. FIG. 18 is an illustration of UI 1600 after a developer has added a UI module in one embodiment. As discussed above, the developer can specify a template for one or more screens of pages of the UI module. Each template can drive what attributes of the selected business object are available for binding to elements of the UI. In this example, a guided customizer 1810 can be opened that allows the developer to select a template. FIG. 19 is an illustration of UI 1600 after performing data binding in one embodiment. Accordingly, a developer can be presented with a list of attributes of the selected business object and, using one or more gestures, bind the attributes to UI elements. Referring again to FIG. 3, at 370, data binding definitions are received.

In various embodiments, 340-370 can be performed in series or in parallel. 340-370 can be performed on individual elements of a mobile application or to a group of elements. As illustrated, a user can perform the process of feature definition and data binding repeatedly to create a mobile application.

Figure 20:
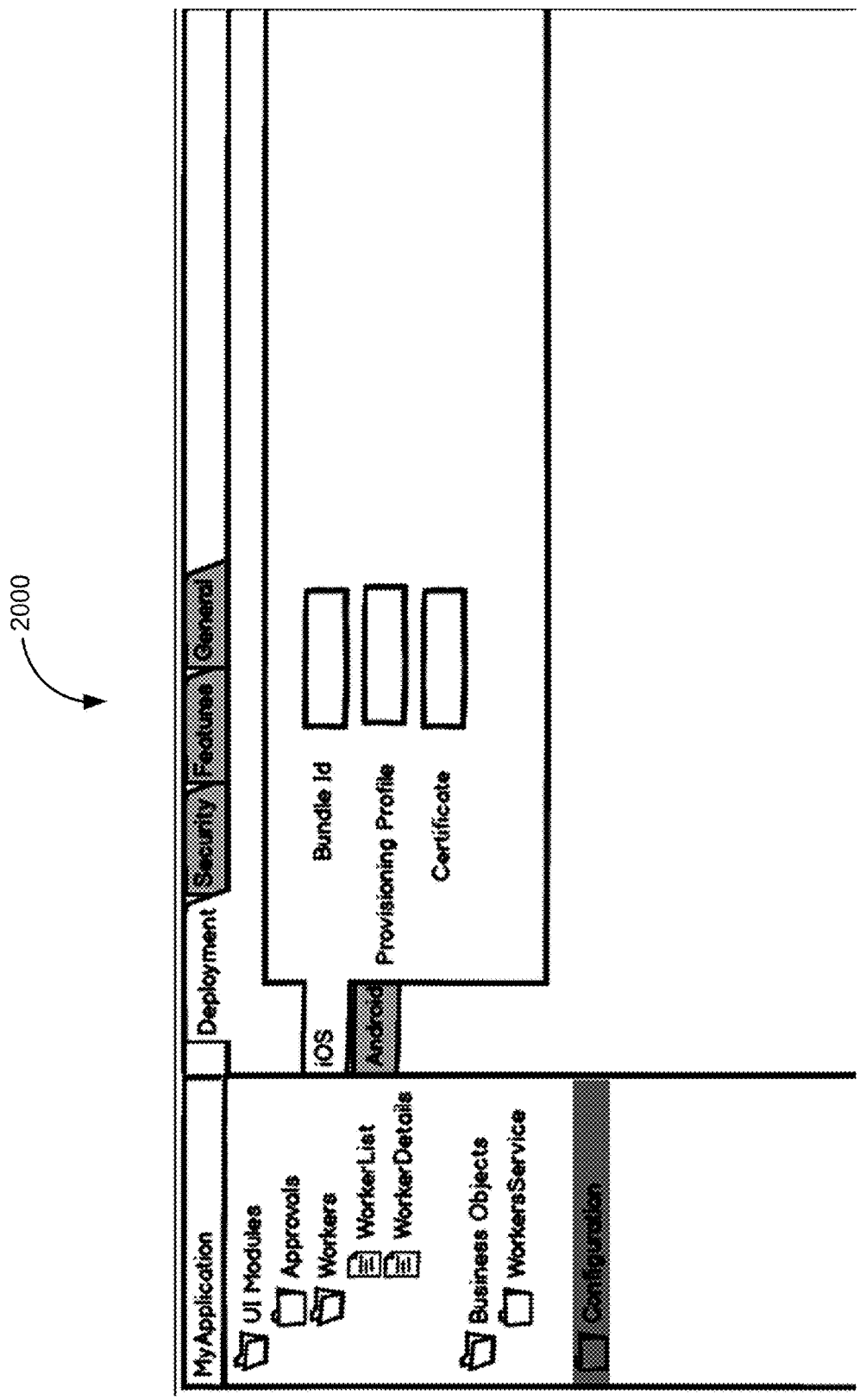
FIG. 20 illustrates a UI for configuring a mobile application for deployment in one embodiment.
Figure 21:
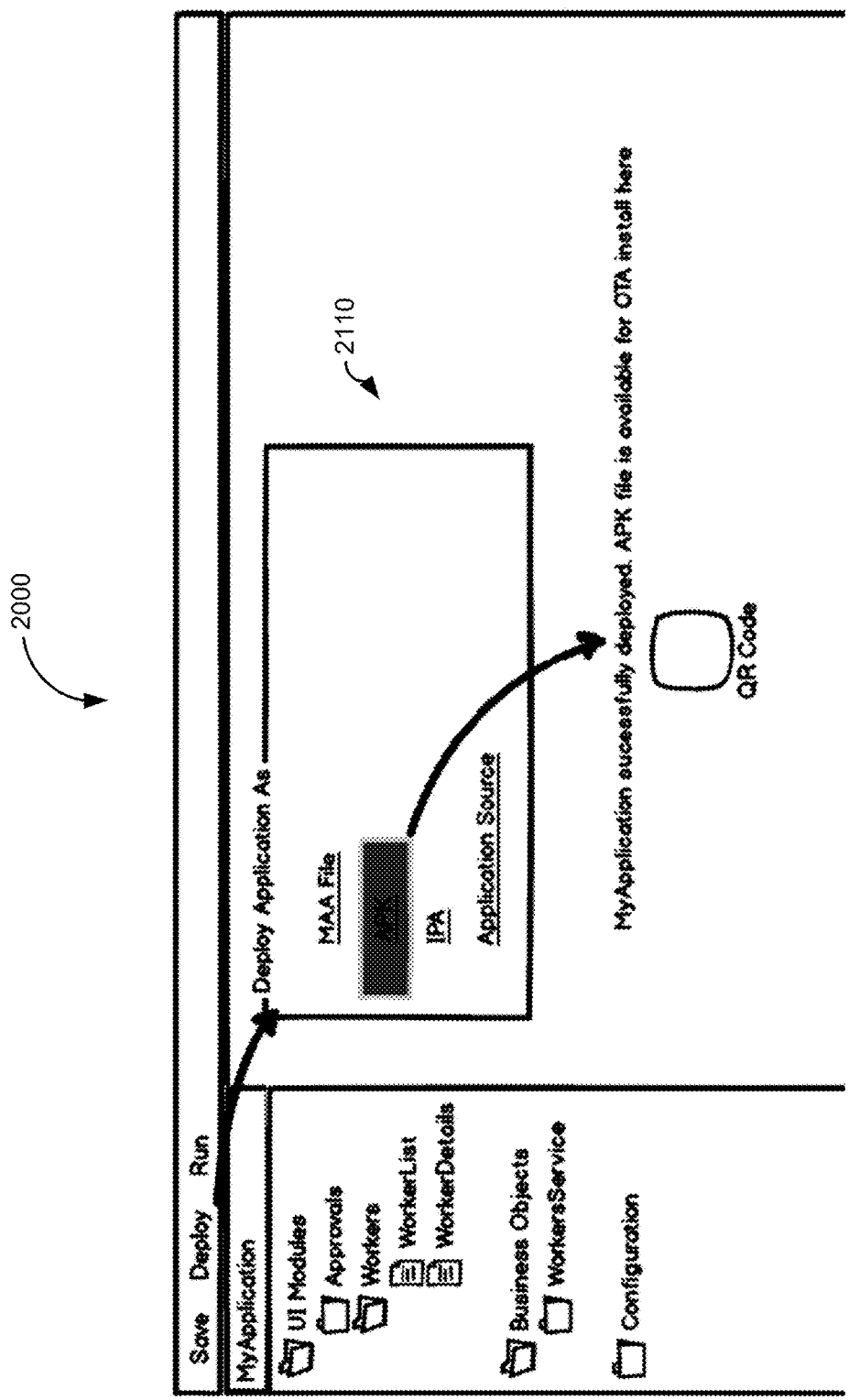
FIGS. 21-23 illustrate UIs after a mobile application is available for deployment in one embodiment.

At 380, the mobile application is deployed. The developer can test the application via a simulator, using a testing application deployed on a target device, or as a native application deployed on a target device. FIG. 20 is an illustration of UI 2000 for configuring a mobile application for deployment in one embodiment. In this example, a developer can select one or more mobile operating systems to which the mobile application may be deployed. FIG. 21 is an illustration of UI 2000 after a mobile application is available for deployment in one embodiment. In this example, deployment dialog 2110 provides a set of deployment options. In various embodiments, selection of a deployment option causes a QR code to be generated allowing a target device to receive and install the mobile application in its native format.

Figure 22:
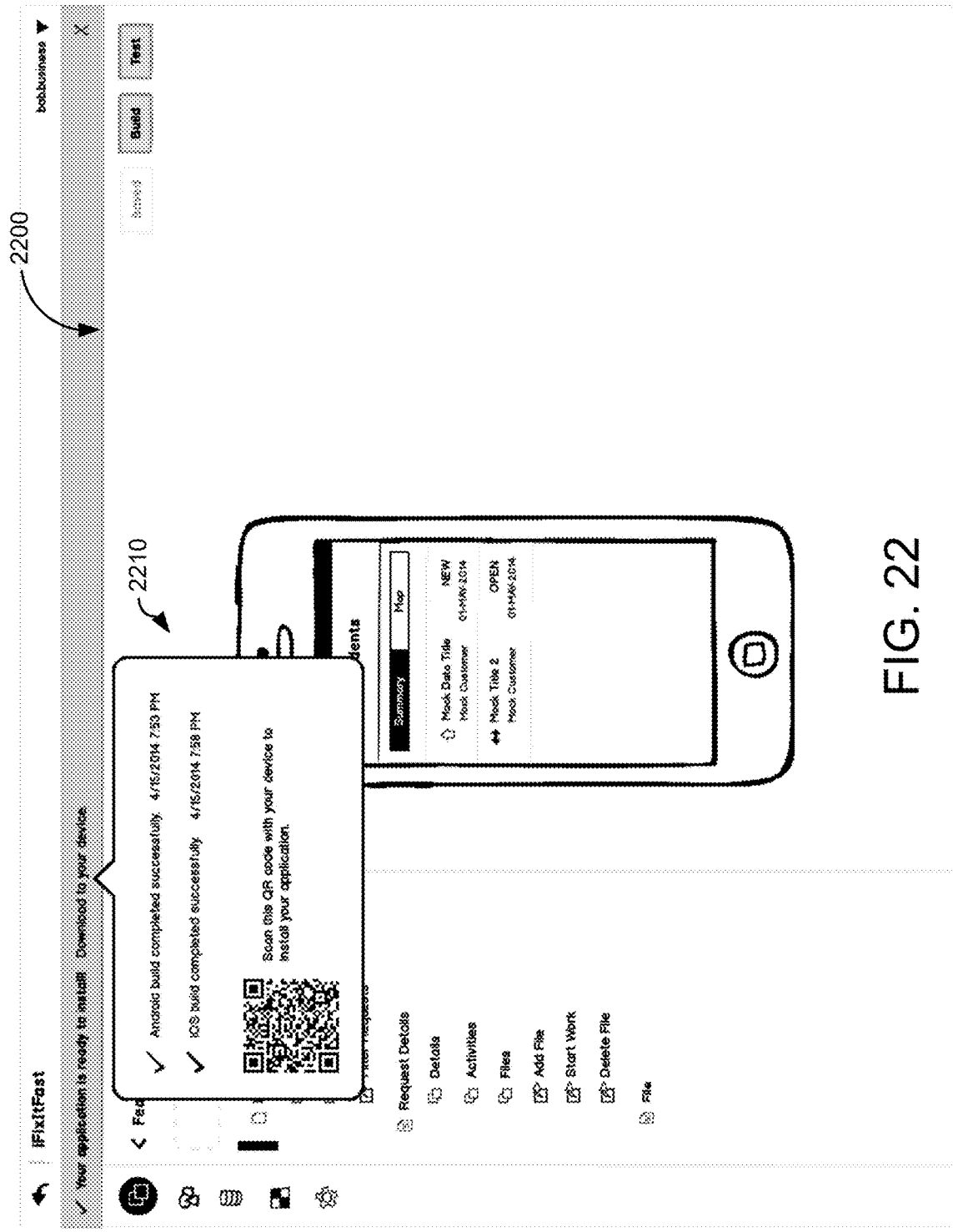
Figure 23:
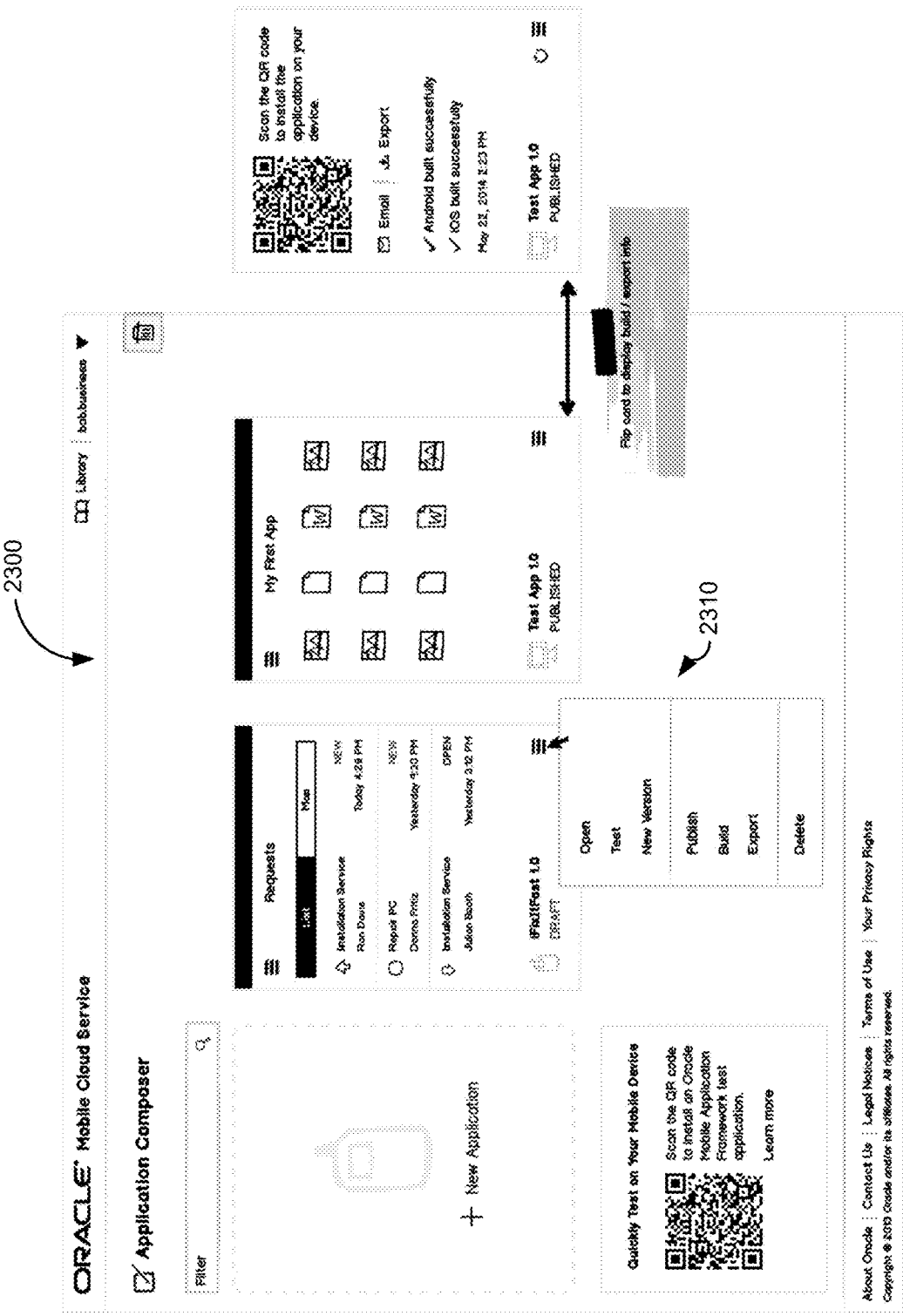

FIG. 22 is an illustration of UI 2200 after a mobile application is available for deployment in one embodiment. In this example, dialog 2210 includes a QR code generated to trigger installation of the mobile application in its native format on various devices. FIG. 23 is an illustration of UI 2300 depicting the newly deployed mobile application in a developer's workspace in one embodiment. In this example, dialog 2310 allows the developer to perform one or more actions with respect to the application project.

Data Bindings for Mobile Applications

Generally, mobile applications may have screens of UI components whose data are bound to backend services (usually over HTTP and served by backend/middleware servers). In order to build these applications, a developer needs to bind these individual components to specific parts of that data.

In some mobile application development systems, this is performed by writing code explicitly. Some other systems implement visual approaches for performing data binding. The "Data First" approach is where the user drags over the piece of data they want into a screen of their mobile application and this creates the bound UI component. The "UI First" approach is where the user creates the UI component first and then drags over the piece of data onto that component to bind it. These approaches then present the user with a UI to bind the component. However, in known systems, this UI is usually complex and the user needs to have intimate knowledge of how each particular UI component is bound.

In various embodiments, application composer module 260 provides a Web-based mobile application development tool where each UI component advertises which sections of the UI can be independently data bound to individual properties coming from data of backend services.

In one embodiment, a high fidelity UI preview of a mobile application running as it would on a device is rendered during the development of the application. If the components in this preview have been previously bound, the preview will contain either real or mock data and appear as if running on the device.

In one embodiment, when a user wishes to data bind a UI component, a special data binding mode is entered. When this occurs, the UI preview of the mobile application switches from a high fidelity preview to its data binding mode. The sections of the UI that can be data bound then transform to show relevant text describing the function of that particular section.

For example, a UI component may be configured to show a user picture as well as the user's first name underneath the photo. When the user is not data binding this UI component, the preview of the application will show either a representative (mock) or real photo as well as either a mock or real first name underneath it. When the user wishes to data bind this UI component, the user activates the data binding mode and the preview changes to show an empty slot where the picture was (which will now contain the text "User Profile Photo") and an empty slot where the first name was (which will now contain the text "First Name"). The user is then presented with a data binding interface which includes the possible pieces of data that the user can bind to (e.g., a Facebook feed may include all the user's profile information, including their picture) as well as visual slots (that are separate from the preview) that map to the slots in the preview (in the above case "User Profile Photo" and "First Name").

To data bind this component, the user drags the particular piece of data from the available list, and drops that into the slot they want that data to apply to. In the above example, the user sees that, for example, "firstname" is available as a piece of data. The user can drag that over to the "First Name" slot to bind that slot to their user's first name.

As the user hovers over these slots (where they drag the data to), the corresponding parts of the UI preview are highlighted to inform the user where in the UI this slot affects (the user may alternatively or additionally use the text in the informative preview). When the user is done data binding, the UI preview reverts back to its high fidelity mode where either the mock or real data is now shown to the user. Thus, when outside of data binding, the user will see the application as it would appear on the target device.

When in data binding mode, a user may be presented by slots to aid them. Some known systems present wizards or generic forms to the user to data bind a component. The known systems do not provide a visual preview. They also require the user to know the intricate details of how a component works and how it is technically bound to the data.

However, in some embodiments, each UI component is configured to present a standard list of slots that can be data bound. When the user adds data to these slots, it is the responsibility of the UI component to determine the intent and semantics of that data, and appropriately configure itself to be bound to those pieces of data. Thus, embodiments make it considerably easier to data bind components for mobile applications. Embodiments do not require the users to have intimate knowledge of how the UI components are technically bound, and the users do not need to examine or understand the underlying code. Accordingly, less technical users may bind significantly complicated UIs in a simplified manner.

In various embodiments, each UI component tooling provides the following functionalities:
  A list of data bindable areas in the component;
  One or more programmatic APIs for each area that can respond to data;
  Functionality to configure visual previews for each data binding area.

Each UI template may start off with expression language that binds the UI component to a preset "start" data or mock data. When the user enters a data binding mode to data bind the UI component, the UI component indicates the various data binding slots to the user and configures itself for data binding preview (e.g., by changing what the expression language points to from mock data to text that corresponds to the slots).

When the user drags over data to each slot, the UI component is informed and highlights the portion of its structure that is related to that particular slot. When the data is dropped, the UI component is given information about the context of that data (e.g., what API it came from, what property it was, where it is in the result set, and what type of data it is). The UI component is then responsible for configuring itself programmatically in response to that particular data.

For example, when data binding a form to a customer, the metadata for that customer defines the properties, the type of properties, and other information. An example of such metadata includes:
  firstName: string
  lastName: string
  address: <reference to an address API>
  phone: phone number
  email: email address
  birthday: date
  lastContactDate: date
  relatedCustomers: <reference to a list of customers>
Embodiments can use this metadata to determine the type of information as well as additional related information. For example, if the user drags over a date, embodiments can show a date input instead of a text box. If the user drags over "relatedCustomers," embodiments can display a list component that displays each of those customers.

When the user exits the data binding mode, the UI component fetches mock or real data from the services it is bound to and produces the high fidelity preview.

One embodiment provides "friendly" APIs for application development. In one embodiment, mobile friendly APIs have the following characteristics:
  They have a small number of properties to reduce the payload size;
  They are created specifically for a UI, not as a general API that can work with any UI. For example, for a list of customers in the aforementioned format, an API may only return a few of the properties since the embodiments would not need all of the properties displayed on the list;
  They are well described with metadata and human friendly names and descriptions.

Some alternative or additional mobile friendly API features are as follows:
  Offline support via the use of entity tags ("ETags") for informing the mobile client when the data has changed;
  Synchronization support to handle conflicts from multiple clients.

Typically, an API is designed for a specific mobile page or application. In one embodiment, in order to provide a corresponding mobile-friendly API, a piece of JavaScript code implements the API by talking to an existing "legacy, non-mobile friendly API," passing through or transforming data back and forth between the mobile friendly and non-mobile friendly API.

In one embodiment, the APIs make data types transparent to application development by using metadata. Generally, if data types are not made transparent, a tooling functionality may not be able to present convenient and friendly UIs to the application builder. For example, if an API comes back from a service as follows:

```
{
    name,
    rank,
    locBuilding,
    positionAware
}
``` the application builder may be able to guess what "name" and "rank" are, but may not know what "locBuilding" or "positionAware" refer to. However, by using metadata, one embodiment may provide this API to the application builder as follows:

```
{
    name: string "The customers first and last name",
    rank: one of ("senior admin", "junior admin", or "temp"),
    locBuilding: longitude/lattitude "Location of the building where they work",
}
```

Accordingly, the application builder can tell what each attribute is. The API may even omit some attributes (e.g., "positionAware") that are not important.

Cloud Based Editor

Building native mobile applications is not a trivial task. It usually requires significant knowledge of the mobile platform as well as specifics about APIs, UI composition, etc. Editors are intended to make these tasks easier, but often do not fully reduce the complexity.

Native mobile applications are typically built by desktop editors with deep knowledge of either native environments (i.e., Android or iOS) or frameworks (i.e., Cordova). Certain Web-based editors exist, but compose applications in Web-based formats (such as HTML) wrapped in lightweight native containers. These approaches still require users to have specific and extensive knowledge of the underlying platform. Simpler editors exist as well but duo to their simplicity cannot be used to build sophisticated data-driven applications.

In various embodiments, however, a declarative framework is provided that captures a user's intent. For instance, instead of writing application code to directly interface with a mobile camera, an intent could simply specify that the user wants to store a photo, and the source of that photo is the camera. A declarative framework can then abstract away the complexities of dealing with the mobile device. It can be interpreted by a runtime on the device that can translate those intents into actual device operations. The UI is also abstracted out in a similar fashion by producing a declarative component based architecture that can simplify the interface with the actual UI displayed to a user.

Accordingly, sophisticated yet intuitive design time editors can be provided that directly capture the user's intent and record these into the declarative framework. In addition, a Web-based editor can be utilized eliminating the need for users to install and configure device specific drivers or testing emulators on their desktop.

Since intents can be all declarative, the Web-based editor can take those intents and replicate a device UI and functionality straight into a Web browser. This gives the user a high fidelity preview of what their application would look like without leaving their Web browser. This contrasts with some known solutions that attempt to run the preview on a real device and transmit screenshots to a browser. Having natively (browser) rendered UI is significantly more performant.

In one embodiment, intents and instructions can then be packaged into a native mobile application and sent down to devices. The runtime can interpret the intents and present the device specific UI and functionality. Since the main instruction code is declarative, the user can preview the application directly on their device. Instead of requiring the user to download the entire application, declarative deltas can be downloaded or pushed to the user's device. The device's runtime can then reinterpret those instructions in real time.

Thus, mobile application can be built in a browser with a user friendly editor that allows users who are unfamiliar with mobile development an opportunity to build applications quickly and in an understandable fashion. The user can be presented with friendly intent driven choices, rather than cumbersome APIs, to quickly build up their application.

In various embodiments, an interpreted framework allows instructions to be used in any environment. Thus, a unified experience is provided on a mobile device or a Web browser. This not only allows accurate representations of the application to be presented in a highly performant manner, but the ability for users to interact with the previews is also provided (which is not possible for systems where screen shots are captured for example).

Providing a concise declarative framework further enhances the building and packaging of native applications. There is no code to compile, etc., making the build process considerably more performant than industry norms.

Finally, since new instructions can be pushed to the runtime on the device, application changes can quickly update and iterations performed on applications while they run. New parts of the application can be quickly introduced or updated for the user. This allows for a testing lifecycle that is incredibly fast and easy to use.

Figure 24:
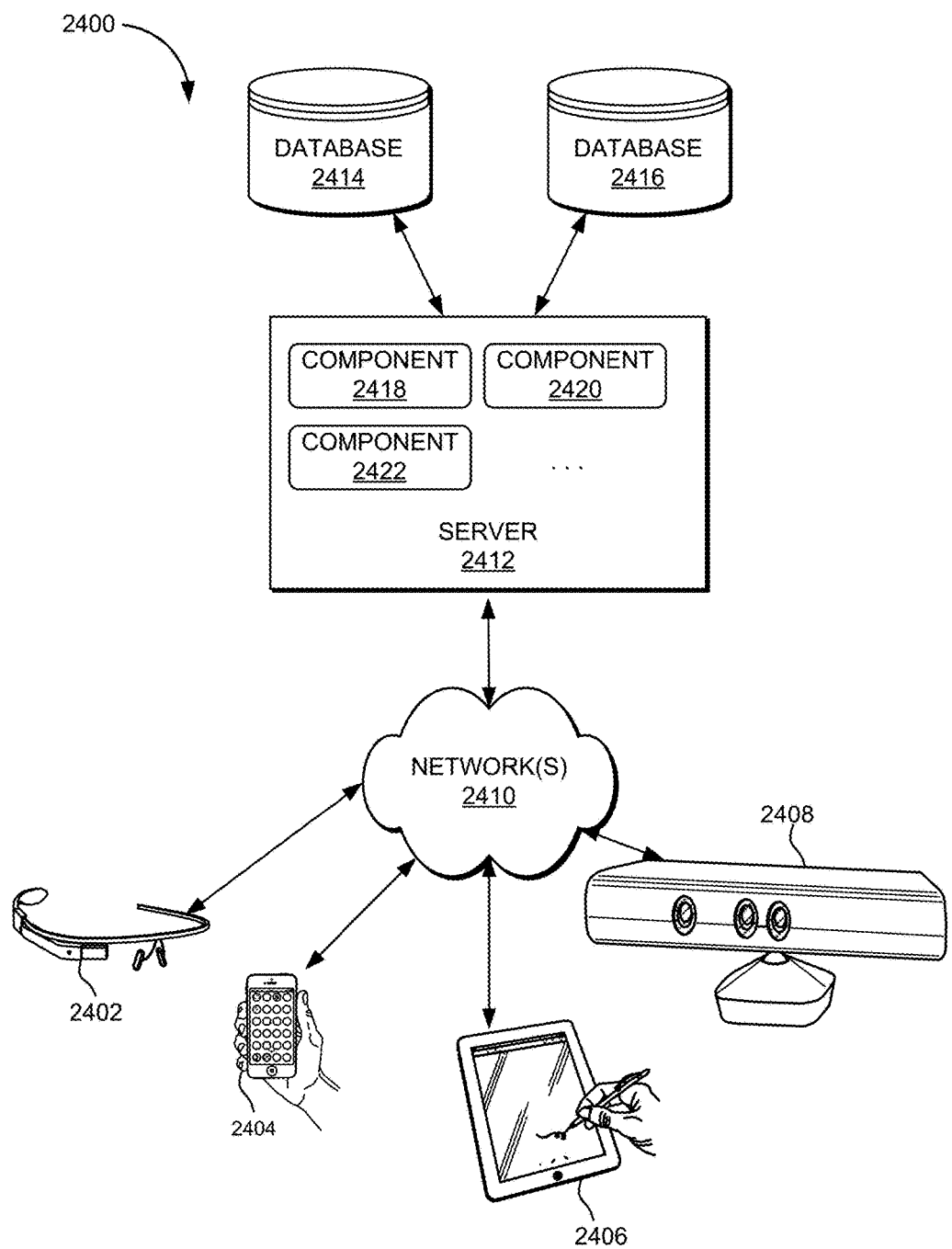
FIG. 24 is a simplified diagram of a distributed system for implementing an embodiment.

FIG. 24 depicts a simplified diagram of distributed system 2400 for implementing one of the embodiments. In the illustrated embodiment, distributed system 2400 includes one or more client computing devices 2402, 2404, 2406, and 2408, which are configured to execute and operate a client application such as a Web browser, proprietary client (e.g., Oracle Forms), or the like over one or more network(s) 2410. Server 2412 may be communicatively coupled with remote client computing devices 2402, 2404, 2406, and 2408 via network 2410.

In various embodiments, server 2412 may be adapted to run one or more services or software applications provided by one or more of the components of the system. In some embodiments, these services may be offered as Web-based or cloud services or under a Software as a Service ("SaaS") model or a Platform as a Serves ("PaaS") model to the users of client computing devices 2402, 2404, 2406, and/or 2408. Users operating client computing devices 2402, 2404, 2406, and/or 2408 may in turn utilize one or more client applications to interact with server 2412 to utilize the services provided by these components.

In the configuration depicted in FIG. 24, software components 2418, 2420, and 2422 of system 2400 are shown as being implemented on server 2412. In other embodiments, one or more of the components of system 2400 and/or the services provided by these components may also be implemented by one or more of the client computing devices 2402, 2404, 2406, and/or 2408. Users operating the client computing devices may then utilize one or more client applications to use the services provided by these components. These components may be implemented in hardware, firmware, software, or combinations thereof. It should be appreciated that various different system configurations are possible, which may be different from distributed system 2400. The embodiment shown in the figure is thus one example of a distributed system for implementing an embodiment system and is not intended to be limiting.

Client computing devices 2402, 2404, 2406, and/or 2408 may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, SMS, Blackberry®, or other communication protocol enabled. Client computing devices 2402, 2404, 2406, and/or 2408 can be general purpose PCs including, by way of example, PCs and/or laptop computers running various versions of Microsoft Windows®, Apple Macintosh®, and/or Linux operating systems. Client computing devices 2402, 2404, 2406, and/or 2408 can be workstation computers running any of a variety of commercially-available UNIX® or UNIX-like operating systems, including without limitation the variety of GNU/Linux operating systems, such as for example, Google Chrome OS. Alternatively, or in addition, client computing devices 2402, 2404, 2406, and 2408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2410.

Although exemplary distributed system 2400 is shown with four client computing devices, any number of client computing devices may be supported. Other devices, such as devices with sensors, etc., may interact with server 2412.

Network(s) 2410 in distributed system 2400 may be any type of network familiar to those skilled in the art that can support data communications using any of a variety of commercially-available protocols, including without limitation TCP/IP, SNA, IPX, AppleTalk, and the like. Merely by way of example, network(s) 2410 can be a LAN, such as one based on Ethernet, Token-Ring and/or the like. Network(s) 2410 can be a wide-area network and the Internet. It can include a virtual network, including without limitation a VPN, an intranet, an extranet, a PSTN, an infra-red network, a wireless network (e.g., a network operating under any of IEEE 802.11 suite of protocols, Bluetooth®, and/or any other wireless protocol); and/or any combination of these and/or other networks.

Server 2412 may be composed of one or more general purpose computers, specialized server computers (including, by way of example, PC servers, UNIX® servers, mid-range servers, mainframe computers, rack-mounted servers, etc.), server farms, server clusters, or any other appropriate arrangement and/or combination. In various embodiments, server 2412 may be adapted to run one or more services or software applications described in the foregoing disclosure. For example, server 2412 may correspond to a server for performing processing described above according to an embodiment of the present disclosure.

Server 2412 may run an operating system including any of those discussed above, as well as any commercially available server operating system. Server 2412 may also run any of a variety of additional server applications and/or mid-tier applications, including HTTP servers, FTP servers, CGI servers, JAVA® servers, database servers, and the like.

In some implementations, server 2412 may include one or more applications to analyze and consolidate data feeds and/or event updates received from users of client computing devices 2402, 2404, 2406, and 2408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2412 may also include one or more applications to display the data feeds and/or real-time events via one or more display devices of client computing devices 2402, 2404, 2406, and 2408.

Distributed system 2400 may also include one or more databases 2414 and 2416. Databases 2414 and 2416 may reside in a variety of locations. By way of example, one or more of databases 2414 and 2416 may reside on a non-transitory storage medium local to (and/or resident in) server 2412. Alternatively, databases 2414 and 2416 may be remote from server 2412 and in communication with server 2412 via a network-based or dedicated connection. In one set of embodiments, databases 2414 and 2416 may reside in a storage-area network ("SAN"). Similarly, any necessary files for performing the functions attributed to server 2412 may be stored locally on server 2412 and/or remotely, as appropriate. In one set of embodiments, databases 2414 and 2416 may include relational databases, such as databases provided by Oracle, that are adapted to store, update, and retrieve data in response to SQL-formatted commands.

Figure 25:
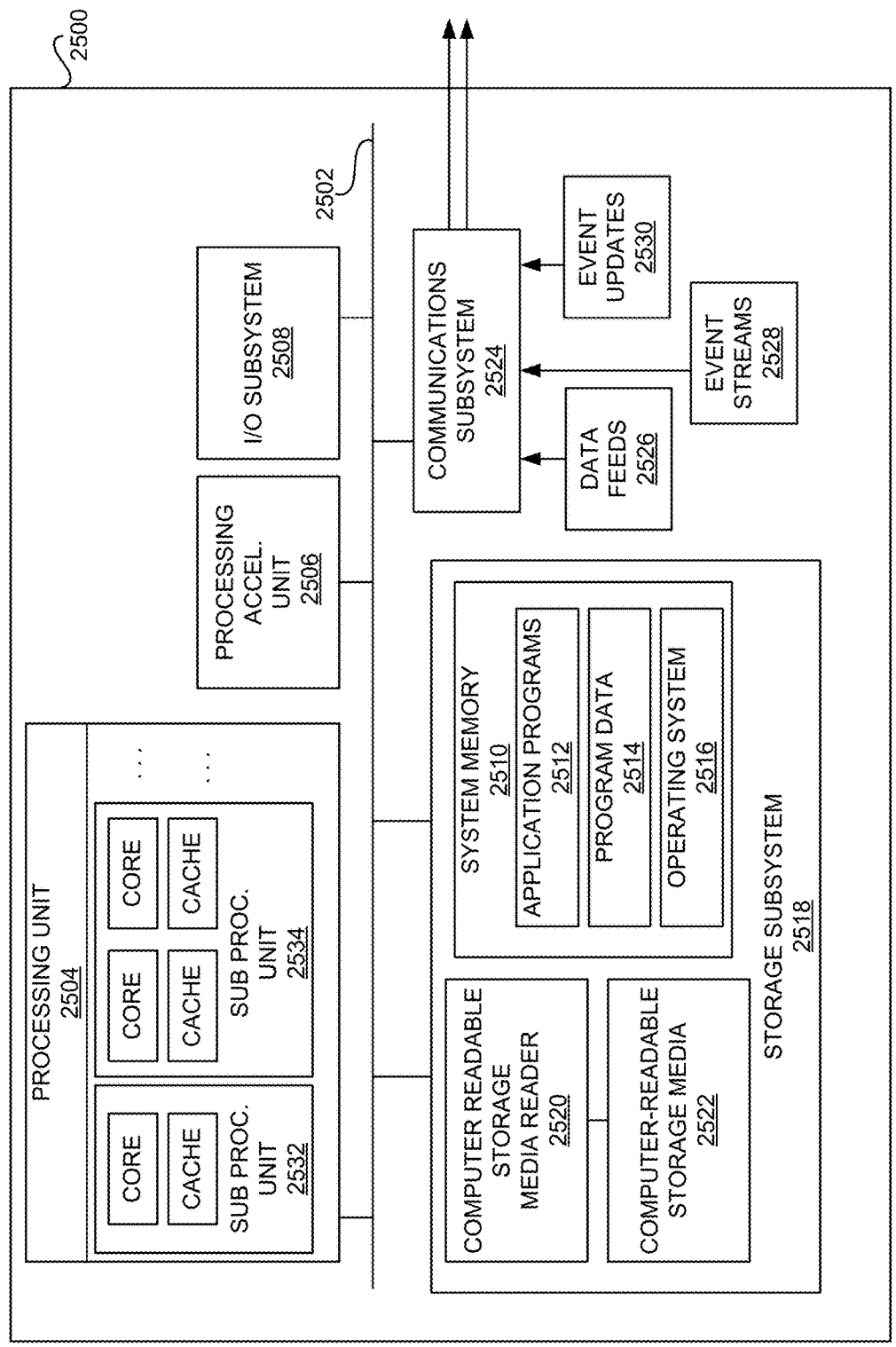
FIG. 25 is a block diagram of an example computer system in which various embodiments may be implemented.

FIG. 25 illustrates an exemplary computer system 2500, in which various embodiments of the present invention may be implemented. The system 2500 may be used to implement any of the computer systems described above. As shown in FIG. 25, computer system 2500 includes bus subsystem 2502 and processing unit 2504 that communicates with a number of peripheral subsystems via bus subsystem 2502. These peripheral subsystems may include processing acceleration unit 2506, I/O subsystem 2508, storage subsystem 2518, and communications subsystem 2524. Storage subsystem 2518 includes tangible computer-readable storage media 2522 and a system memory 2510.

Bus subsystem 2502 provides a mechanism for letting the various components and subsystems of computer system 2500 communicate with each other as intended. Although bus subsystem 2502 is shown schematically as a single bus, alternative embodiments of the bus subsystem may utilize multiple buses. Bus subsystem 2502 may be any of several types of bus structures including a memory bus or memory controller, a peripheral bus, and a local bus using any of a variety of bus architectures. For example, such architectures may include an Industry Standard Architecture ("ISA") bus, Micro Channel Architecture ("MCA") bus, Enhanced ISA ("EISA") bus, Video Electronics Standards Association ("VESA") local bus, and Peripheral Component Interconnect (PCI) bus, which can be implemented as a Mezzanine bus manufactured to the IEEE P1386.1 standard.

Processing unit 2504, which can be implemented as one or more integrated circuits (e.g., a conventional microprocessor or microcontroller), controls the operation of computer system 2500. One or more processors may be included in processing unit 2504. These processors may include single core or multicore processors. In certain embodiments, processing unit 2504 may be implemented as one or more independent processing units 2532 and/or 2534 with single or multicore processors included in each processing unit. In other embodiments, processing unit 2504 may also be implemented as a quad-core processing unit formed by integrating two dual-core processors into a single chip.

In various embodiments, processing unit 2504 can execute a variety of programs in response to program code and can maintain multiple concurrently executing programs or processes. At any given time, some or all of the program code to be executed can be resident in processor(s) 2504 and/or in storage subsystem 2518. Through suitable programming, processor(s) 2504 can provide various functionalities described above. Computer system 2500 may additionally include a processing acceleration unit 2506, which can include a digital signal processor ("DSP"), a special-purpose processor, and/or the like.

I/O subsystem 2508 may include UI input devices and UI output devices. UI input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. UI input devices may include, for example, motion sensing and/or gesture recognition devices such as the Microsoft Kinect® motion sensor that enables users to control and interact with an input device, such as the Microsoft Xbox® 360 game controller, through a natural UI using gestures and spoken commands. UI input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, UI input devices may include voice recognition sensing devices that enable users to interact with voice recognition systems (e.g., Siri® navigator), through voice commands.

UI input devices may also include, without limitation, three dimensional ("3D") mice, joysticks or pointing sticks, gamepads and graphic tablets, and audio/visual devices such as speakers, digital cameras, digital camcorders, portable media players, Webcams, image scanners, fingerprint scanners, barcode reader 3D scanners, 3D printers, laser rangefinders, and eye gaze tracking devices. Additionally, UI input devices may include, for example, medical imaging input devices such as computed tomography, magnetic resonance imaging, position emission tomography, medical ultrasonography devices. UI input devices may also include, for example, audio input devices such as MIDI keyboards, digital musical instruments and the like.

UI output devices may include a display subsystem, indicator lights, or non-visual displays such as audio output devices, etc. The display subsystem may be a cathode ray tube ("CRT"), a flat-panel device, such as that using a liquid crystal display ("LCD") or plasma display, a projection device, a touch screen, and the like. In general, use of the term "output device" is intended to include all possible types of devices and mechanisms for outputting information from computer system 2500 to a user or other computer. For example, UI output devices may include, without limitation, a variety of display devices that visually convey text, graphics and audio/video information such as monitors, printers, speakers, headphones, automotive navigation systems, plotters, voice output devices, and modems.

Computer system 2500 may comprise a storage subsystem 2518 that comprises software elements, shown as being currently located within a system memory 2510. System memory 2510 may store program instructions that are loadable and executable on processing unit 2504, as well as data generated during the execution of these programs.

Depending on the configuration and type of computer system 2500, system memory 2510 may be volatile (such as random access memory ("RAM")) and/or non-volatile (such as read-only memory ("ROM"), flash memory, etc.) The RAM typically contains data and/or program modules that are immediately accessible to and/or presently being operated and executed by processing unit 2504. In some implementations, system memory 2510 may include multiple different types of memory, such as static random access memory ("SRAM") or dynamic random access memory ("DRAM"). In some implementations, a basic input/output system ("BIOS"), containing the basic routines that help to transfer information between elements within computer system 2500, such as during start-up, may typically be stored in the ROM. By way of example, and not limitation, system memory 2510 also illustrates application programs 2512, which may include client applications, Web browsers, mid-tier applications, relational database management systems ("RDBMS"), etc., program data 2514, and an operating system 2516. By way of example, operating system 2516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2518 may also provide a tangible computer-readable storage medium for storing the basic programming and data constructs that provide the functionality of some embodiments. Software (programs, code modules, instructions) that when executed by a processor provide the functionality described above may be stored in storage subsystem 2518. These software modules or instructions may be executed by processing unit 2504. Storage subsystem 2518 may also provide a repository for storing data used in accordance with the present invention.

Storage subsystem 2500 may also include a computer-readable storage media reader 2520 that can further be connected to computer-readable storage media 2522. Together and, optionally, in combination with system memory 2510, computer-readable storage media 2522 may comprehensively represent remote, local, fixed, and/or removable storage devices plus storage media for temporarily and/or more permanently containing, storing, transmitting, and retrieving computer-readable information.

Computer-readable storage media 2522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM ("EEPROM"), flash memory or other memory technology, CD-ROM, digital versatile disk ("DVD"), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2500.

By way of example, computer-readable storage media 2522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2522 may include, but is not limited to, Zip® drives, flash memory cards, universal serial bus ("USB") flash drives, secure digital ("SD") cards, DVD disks, digital video tape, and the like. Computer-readable storage media 2522 may also include, solid-state drives ("SSD") based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM ("MRAM") SSDs, and hybrid SSDs that use a combination of DRAM and flash memory based SSDs. The disk drives and their associated computer-readable media may provide non-volatile storage of computer-readable instructions, data structures, program modules, and other data for computer system 2500.

Communications subsystem 2524 provides an interface to other computer systems and networks. Communications subsystem 2524 serves as an interface for receiving data from and transmitting data to other systems from computer system 2500. For example, communications subsystem 2524 may enable computer system 2500 to connect to one or more devices via the Internet. In some embodiments communications subsystem 2524 can include radio frequency ("RF") transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system ("GPS") receiver components, and/or other components. In some embodiments communications subsystem 2524 can provide wired network connectivity (e.g., Ethernet) in addition to or instead of a wireless interface.

In some embodiments, communications subsystem 2524 may also receive input communication in the form of structured and/or unstructured data feeds 2526, event streams 2528, event updates 2530, and the like on behalf of one or more users who may use computer system 2500.

By way of example, communications subsystem 2524 may be configured to receive data feeds 2526 in real-time from users of social networks and/or other communication services such as Twitter® feeds, Facebook® updates, Web feeds such as Rich Site Summary ("RSS") feeds, and/or real-time updates from one or more third party information sources.

Additionally, communications subsystem 2524 may also be configured to receive data in the form of continuous data streams, which may include event streams 2528 of real-time events and/or event updates 2530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2524 may also be configured to output the structured and/or unstructured data feeds 2526, event streams 2528, event updates 2530, and the like to one or more databases that may be in communication with one or more streaming data source computers coupled to computer system 2500.

Computer system 2500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

As disclosed, embodiments allow end users to intuitively data bind functional components to backend RESTful services through visual affordances. Accordingly, embodiments improve the user experience and improve the efficiency of a UI design process.

In some embodiments, an application may be deployed under a mobile application framework ("MAF") that provides built in security to control access to the application and ensure encryption of sensitive data, such as Oracle MAF from Oracle Corp. MAF is a hybrid mobile architecture that uses HTML5 and Cascading Style Sheets ("CSS") (to render the UI in the web view), Java (for the application business logic), and Apache Cordova (to access device features such as GPS activities and e-mail). Because MAF uses these cross-platform technologies, the same application can be built for both Android and iOS devices without having to use any platform-specific tools. After an application is deployed to a device, it behaves as applications created using such platform-specific tools as Objective C or the Android SDK. Further, MAF allows for building the same application for smartphones or for tablets, thereby allowing reuse of business logic in the same application and targeting various types of devices, screen sizes, and capabilities.

Figure 26:
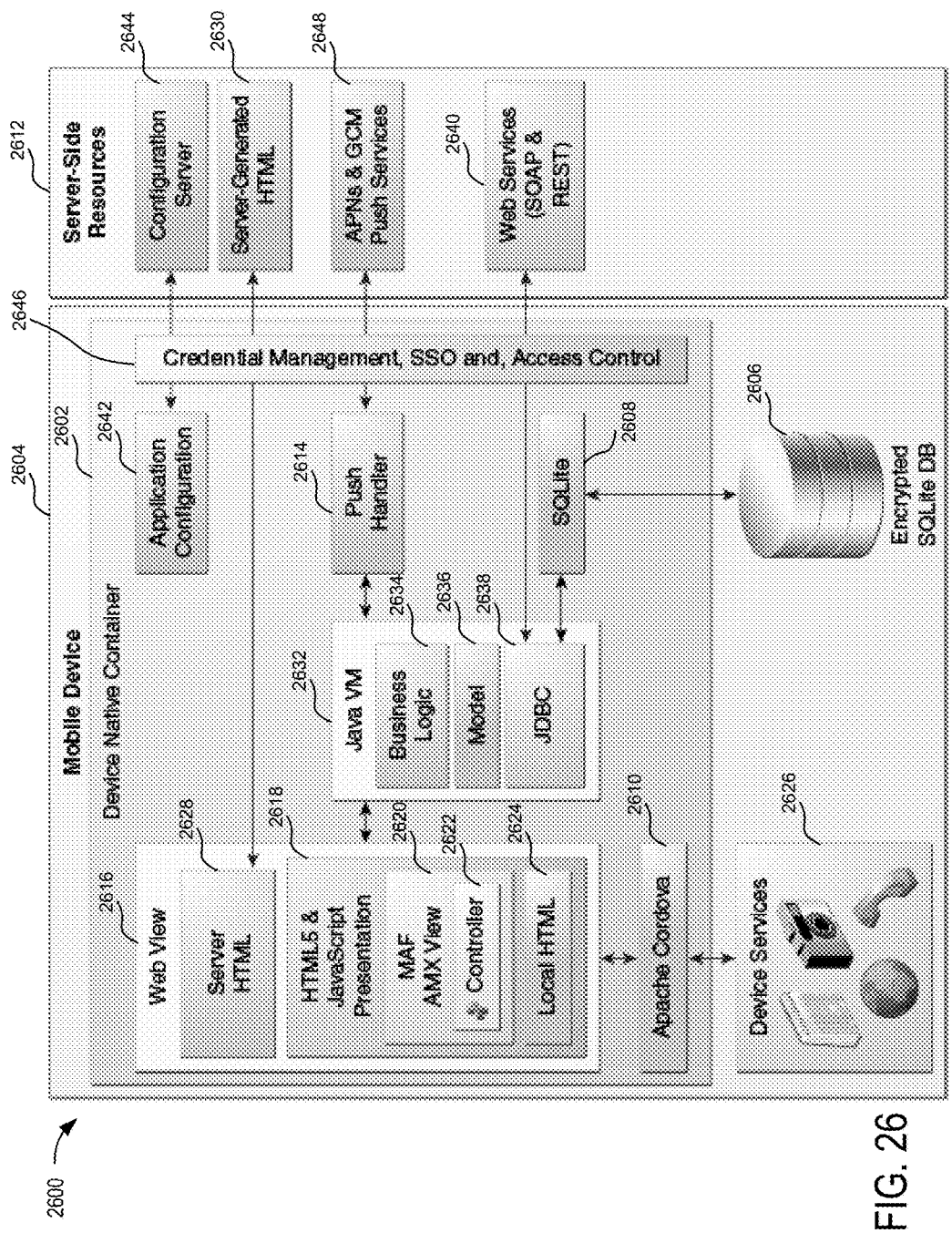
FIG. 26 is a block diagram of a mobile application framework runtime architecture in accordance with embodiments of the present invention.

FIG. 26 is a block diagram of a MAF runtime architecture 2600 according to an embodiment. Runtime architecture 2600 includes a "thin" device native container 2602 deployed to a mobile device 2604. Runtime architecture 2600 represents the MVC development approach which separates the presentation from the model layer and the controller logic. Device native container 2602 allows a MAF application to function as a native application on different platforms (e.g., iOS, Android, etc.) by interacting with a local SQLite database 2606 (via SQLite 2608), mobile device services 2626 (via Cordova APIs of Apache Cordova 2610), and server-side resources 2612 such as a Configuration Server 2644, Server-Generated HTML 2630, Push Services 2648, and Web Services 2640.

Device Services 2626 are services and features that are native to device 2604 such as camera, GPS, e-mail, etc. Configuration Server 2644 is a server based on Web Distributed Authoring and Versioning ("WebDav") and hosting configuration files used by the application configuration services. WebDav is defined in, e.g., Internet Engineering Task Force ("IETF") Request for Comments ("RFC") 4918. Configuration Server 2644 is delivered as a reference implementation. Any common WebDav services hosted on a Java 2 Platform, Enterprise Edition ("J2EE") server can be used for this purpose. Server-Generated HTML 2630 includes Web content hosted on remote servers and used for browser-based application features. Push Services 2648 may include, for example, Apple Push Notification Services ("APNs") and Google Cloud Messaging ("GCM") push services that are notification providers that send notification events to MAF applications. Web Services 2640 are, for example, remotely hosted SOAP-based web services.

Device native container 2602 includes Web View 2616 that uses a mobile device's web engine to display and process web-based content. In a MAF application, Web View 2616 delivers the UI by rendering the application markup as HTML 5. The UI may be created for a mobile application feature by implementing any of the following content types: MAF Application Mobile XML ("AMX") Views 2620, Controller 2622, local HTML 2624, or server HTML 2628, where MAF AMX Views 2620, Controller 2622, and local HTML 2624 provide HTML5 and JavaScript presentation 2618. Application features implemented from various content types can coexist within the same mobile application and can also interact with one another.

Applications whose contents are implemented as MAF AMX views 2620 reside on device 2604 and provide the most authentic device-native user experience, similar to an application authored in the language specific to the device's platform. MAF provides a set of code editors that enable a user to declaratively create a UI from components that are tailored to the form factors of mobile devices. These components can be used to create the page layout (e.g., list view) as well as input components (e.g., input fields). When a user develops MAF AMX views 2620, they can leverage data controls which enable the user to declaratively create data-bound UI components and access a Web service and the services of a mobile device (e.g., camera, GPS, or e-mail). At runtime, a JavaScript engine in Web View 2616 renders MAF AMX view definitions into HTML5 and JavaScript.

For applications whose contents are implemented as Controller 2622, Controller 2622 governs the flow between pages in the mobile application. Controller 2622 enables a user to break an application's flow into smaller reusable task flows and include non-visual components such as method calls and decision points. In the embodiment of FIG. 26, Controller 2622 is included in MAF AMX Views 2620 and is called by MAF AMX Views 2620 to, e.g., transition a page and/or activate actions. However, in alternative embodiments, Controller 2622 may be implemented as a peer of MAF AMX Views 2620.

For applications whose contents are implemented as local HTML 2624, HTML pages run on the device as part of the MAF application. Local HTML files can access device-native features and services through Apache Cordova 2610 and JavaScript APIs.

For applications whose contents are implemented as server HTML 2628, the UI is delivered from server-generated Web pages (Server-Generated HTML 2630) that can open within the application feature's Web View 2616. Within the context of MAF, this content type is referred to as remote URL. The resources for these browser-based applications do not reside on the device 2604. Instead, the UI, page flow logic, and business logic are delivered from a remote server.

When one of these remotely hosted Web applications is allowed to open within Web View 2616, it can use Cordova JavaScript APIs to access any designated device-native feature or service such as the camera or GPS capabilities. When implementing an application using the remote URL content, a user can leverage an existing browser-based application that has been optimized for mobile use, or use one that has been written specifically for a specific type of mobile device. For applications that can run within the browsers on either desktops or tablets, the user can implement the remote URL content using applications created through rich client-based components such as those provided by "Oracle ADF Faces" from Oracle Corp. For applications specifically targeted to mobile phones, the remote URL content can be delivered from Web pages created using MAF. Not only can applications authored with MAF render on a variety of smartphones, but they can gracefully degrade to the reduced capabilities available on feature phones through UIs constructed with Apache Trinidad JSF components and dynamically selected style sheets. Because the content is served remotely, the application is available only as long as the server connection remains active.

Device native container 2602 further includes Apache Cordova 2610 that provides JavaScript APIs that integrate the device's native features and services into a mobile application. Although a user can access these APIs programmatically from Java code (or using JavaScript when implementing a MAF mobile application as local HTML 2624), the user can add device integration declaratively when creating MAF AMX pages because MAF packages these APIs as data controls.

Device native container 2602 further includes a Java Virtual Machine ("JVM") 2632. Java provides a Java runtime environment for a MAF application. JVM 2632 is implemented in device-native code, and is embedded (or compiled) into each instance of the MAF application as part of the native application binary. JVM 2632 is based on the Java Platform, Micro Edition ("Java ME") Connected Device Configuration ("CDC") specification. In runtime architecture 2600, JVM 2632 includes business logic 2634, model 2636, and Java database connectivity ("JDBC") 2638. Java enables business logic 2634 in MAF applications. Managed Beans ("MBeans") are Java classes that can be created to extend the capabilities of MAF, such as providing additional business logic for processing data returned from the server. MBeans are executed by the embedded Java support, and conform to the Java ME CDC specifications. Model 2636 includes the binding layer that connects the business logic components with the UI. In addition, the binding layer provides the execution logic to invoke web services 2640 such as remotely hosted SOAP-based web services. These services are accessed through the Java layer (JVM 2632). Application features authored in MAF AMX access SOAP-based data services through data controls. JDBC 2638 is an API that enables the model layer to access the data in encrypted SQLite database 2606 through Create, Read, Update, and Delete ("CRUD") operations.

Device native container 2602 further includes Application Configuration 2642 which refers to services that allow application configurations to be downloaded and refreshed, such as URL endpoints for a web service or a remote URL connection of a configuration server 2644. Application configuration services download the configuration information from a server-side WebDav-based service.

Device native container 2602 further includes module 2646 that provides Credential Management, Single Sign-on ("SSO"), and Access Control. MAF handles user authentication and credential management through the "Oracle Access Management Mobile and Social" ("OAMMS") identity manager ("IDM") SDKs. MAF applications perform offline authentication, meaning that when users log in to the application while connected, MAF maintains the username and password locally on device 2604, allowing users to continue access to the application even if the connection to the authentication server becomes unavailable. MAF encrypts the locally stored user information as well as the data stored in local SQLite database 2606. After authenticating against the login server, a user can access all of the application features secured by that connection. MAF also supports the concept of access control by restricting access to application features (or specific functions of application features) by applying user roles and privileges. For remotely served Web content, MAF uses whitelists to ensure that only the intended URIs can open within the application feature's web view 2616 (and access the device features).

Device native container 2602 also enables push notifications via a Push Handler 2614 that communicates with push services 2648 included in server side resources 2612 and enables MAF applications to receive events from notification servers such as the iOS or Android notification servers. The Java layer (JVM 2632) handles the notification processing.

In runtime architecture 2600, device native container 2602 interacts with encrypted SQLite Database 2606 that is an embedded SQLite database that protects locally stored data and is called by the model layer using JDBC 2638. The MAF application generates this lightweight, cross-platform relational database 2606. Because database 2606 is encrypted, it secures data if the device is lost or stolen. Only users who enter the correct user name and password can access the data in this database.

Figure 27:
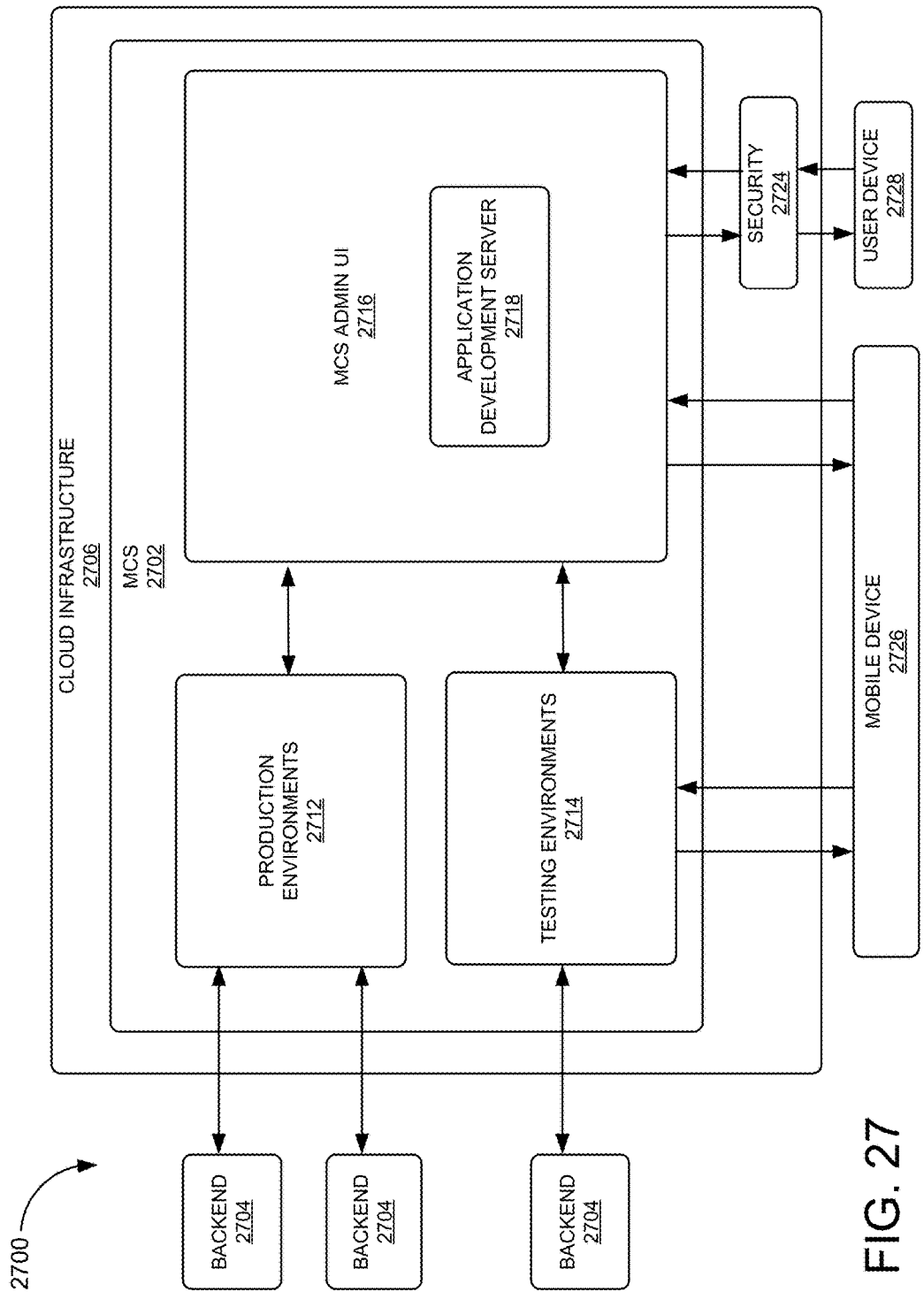
FIG. 27 is a block diagram of a system for developing mobile applications in a mobile cloud infrastructure in accordance with embodiments of the present invention.

FIG. 27 is a block diagram of a system 2700 for developing mobile applications in a mobile cloud infrastructure in accordance with embodiments of the present invention. In system 2700, a user may use a user device 2728 to develop and build applications in a cloud infrastructure 2706 via a Web based tool. In one embodiment, the applications may be downloaded on a mobile device 2726 over the air, thus obviating the need for an App store. The native applications talk to backends 2704 created in MCS 2702. In one embodiment, MAF runtime architecture 2600 of FIG. 26 may be used to deliver an application to mobile device 2726. In one embodiment, a declarative syntax of an application is deployed on mobile device 2726 over the air, and the declarative syntax is interpreted on mobile device 2726 by MAF runtime architecture 2600 of FIG. 26.

Cloud infrastructure 2706 includes MCS 2702 that provides an admin UI 2716 through which application development may be performed. MCS 2702 further includes production environments 2712 and testing environments 2714 in which a mobile application may be developed and tested, respectively. These environments provide production/testing functionality by talking to corresponding backends 2704 via connectors. An application is first developed in testing environments 2714. Once published, the application moves to production environments 2712.

In one embodiment, a mobile application is developed by using user device 2728 to communicate with MCS admin UI 2716 (also referred to as portal) through a security layer 2724. MCS admin UI 2716 includes an application development server 2718 that can be interfaced via MCS admin UI 2716. An application that is developed in MCS admin UI 2716 can be run on a browser of user device 2728 or on mobile device 2726 by communicating with production environments 2712 and/or testing environments 2714. In one embodiment, when an application is deployed on mobile device 2726, mobile device 2726 communicates with testing environments 2714. However, if the application is updated on mobile device 2726, such updates are performed through MCS admin UI 2716.

An application that is developed in system 2700 may be built as a light application or a heavy application. A heavy application is a full application such as apps that are downloaded from an App store. A light application is an application that is deployed as an added feature to an already deployed full application (i.e., a hosting application) such as an Oracle app. The hosting application acts as a container that holds the light applications. Both heavy and light applications can be further containerized by a security container.

Figure 28:
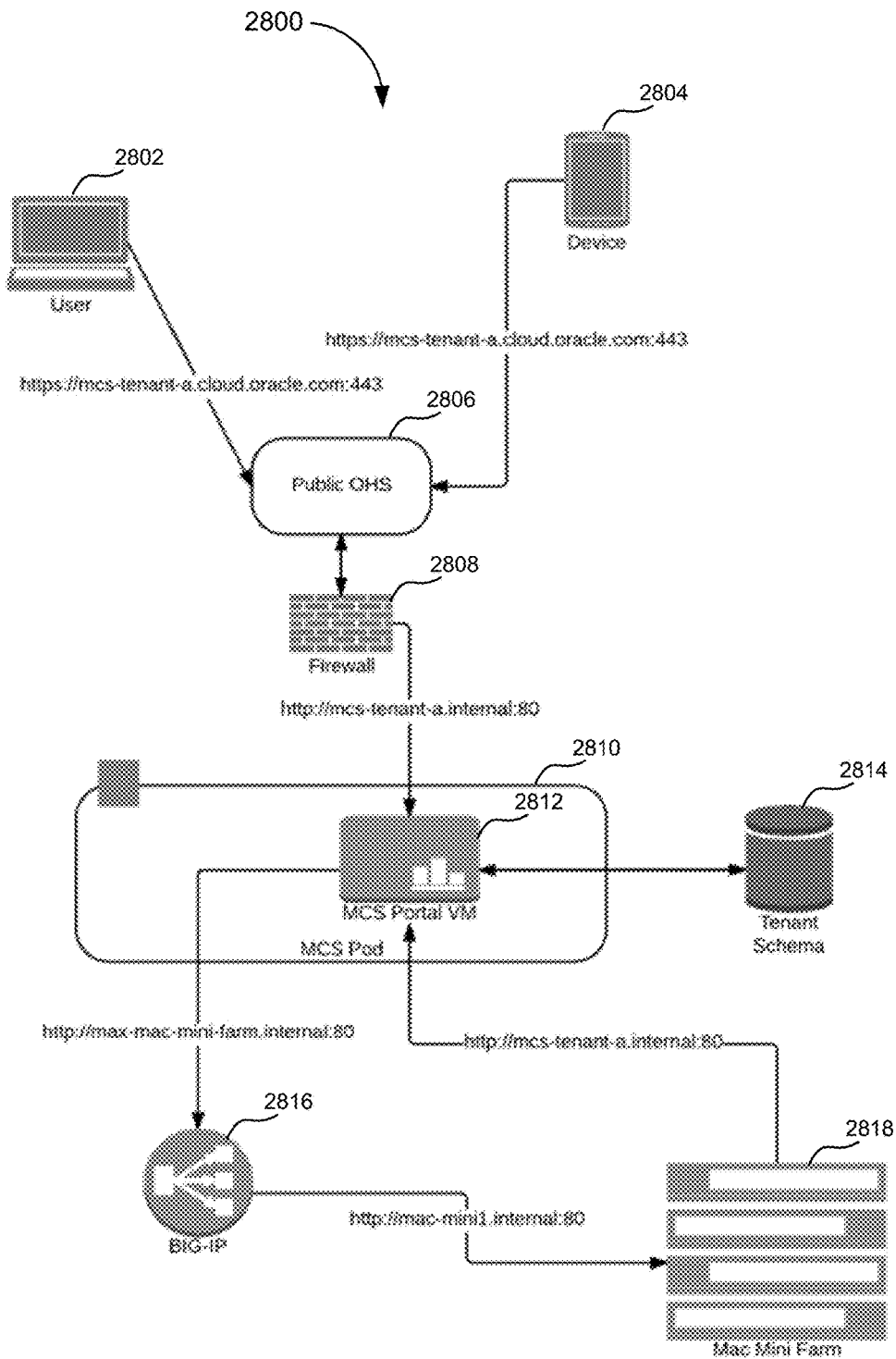
FIG. 28 is a block diagram of network components in a system for building mobile applications in accordance with embodiments of the present invention.

FIG. 28 is a block diagram of network components in a system 2800 for building mobile applications in accordance with embodiments of the present invention. In system 2800, a first device 2802 interacts with an MCS website (denoted as "https://mcs-tenant-a.cloud.oracle.com" in the example embodiment of FIG. 28) to initiate build requests, and a second device 2804 communicates with the MCS website to perform an over the air install of native applications. Generally, the over the air install includes downloading a file such as a property list file (a "p-list" file with extension ".plist") that describes the application and the location from which to download the corresponding application archive file (a file with ".ipa" extension and storing the application), and then downloading the application archive file from that location.

First device 2802 and second device 2804 interact with the MCS website by communicating with an MCS Portal VM 2812 of a server 2810 through a public Oracle HTTP Server ("OHS") 2806. Public OHS 2806 is a public facing HTTP server that directs traffic to MCS Portal VM 2812 located behind a firewall 2808. Public OHS 2806 implements a WebGate that is a web server plugin for Oracle Access Manager ("OAM") to intercept HTTP requests and forward them to the corresponding Access Server for authentication and authorization. Accordingly, public OHS 2806 authenticates the user of first device 2802, passes along user credentials to MCS Portal VM 2812, and terminates the SSL connection with first device 2802. In the example embodiment of FIG. 28, first device 2802 and second device 2804 access public OHS 2806 at "https://mcs-tenant-a.cloud.oracle.com" with port 443 used for https.

MCS Portal VM 2812 is a standard WebLogic Server ("WLS") application whose data is backed by a single tenant schema in schema service 2814 and its corresponding application development client is written using the Oracle Jumpstart Enterprise Toolkit ("JET") framework. WebLogic Server is a Java EE application server developed by Oracle Corp. A database schema is a container of objects (e.g., tables, views, stored procedures, etc.) to logically group them.

MCS Portal VM 2812 is a single tenant and its security is provided via Oracle Web Services Manager ("OWSM," described herein with reference to FIG. 7). Accordingly, MCS Portal VM 2812 runs WLS in a trusted zone. MCS Portal VM 2812 handles requests by first device 2802 and has a connection to a schema service 2814. MCS Portal VM 2812 is also connected to a build server farm 2818 via a load balancer 2816. In the embodiment of FIG. 28, MCS Portal VM 2812 uses open port 80 (or equivalent) for http communication to/from Public OHS 2806, to load balancer 2816, and from individual servers in server farm 2818.

Schema service 2814 interacts with the MCS Portal VM 2812 and stores application data, enterprise signing certificates, and provisioning profiles for the tenant. Load balancer 2816 routes farm tasks to servers in server farm 2818. The routing may initially be performed in a round-robin fashion. In the embodiment of FIG. 28, load balancer 2816 is a BIG-IP appliance from F5 Corp. which uses open port 80 (or equivalent) and provides redundancy. Server farm 2818 includes a number of servers (e.g., 20 servers) that handle build jobs. It is connected to a filer (not shown) for storing application binaries (e.g., 5 TB). In one embodiment, connections of server farm 2818 are handled via a local Tomcat instance running locally on a server, and build tools and processes are handled by native OSX calls.

Building an Application

In one embodiment, once a user of first device 2802 has created an application and wishes to produce a native binary, the user initiates a build POST request at the MCS website (e.g., at "https://mcs-tenant-a.cloud.oracle.com/max/build") via a UI of first device 2802. POST is a request method supported by the HTTP protocol for requesting a web server to accept and store the data enclosed in the body of the request message. The payload of the build POST request includes the application identifier ("ID") for the application. Public OHS 2806 receives the request, terminates the SSL, authenticates and authorizes the user against OAM (assuming the user is logged in), places the user identity into HTTP headers of the request, and forwards the request past firewall 2808 to the WLS server of MCS Portal VM 2812 (e.g., the WLS server running at "http://mcs-tenant-a.internal/max/build").

MCS Portal VM 2812 receives the request, authorizes the user for privileges against the requested application, and sends a query to the tenant schema service 2814 for application data, tenant enterprise certificate, encrypted certificate password, and tenant provisioning profile. Once schema service 2814 returns the requested items, MCS Portal VM 2812 creates a new entry in a table of build jobs (stored at schema service 2814) to record the build attempt and capture the primary key of the corresponding new build record. MCS Portal VM 2812 also creates a new POST request against build server farm 2818 behind load balancer 2816 (e.g., at "http://max-mini-farm.internal/build/initiate"), passing in the corresponding parameters (application data, signing certificate and password, and provisioning profile) into the body of the request as well as a callback URL for job completion, where the callback URL encodes the primary key of the corresponding build record in the table of build jobs. The following functionality provides an example of a build POST request payload that includes the corresponding parameters:

applicationData: (app data)
sign ingCertificate: (cert) *
signingPassword: (password) *
provisioningProfile: (profile)
callbackUrl: http://mcs-tenant-a.internal:3000/maxbuild/complete?jobId=(BuildJobId)**

In this example, the certificate and the password are created by the user of first device 2802 exclusively for building mobile application according to this embodiment (i.e., the certificate and the password are not shared with services other than building mobile application according to this embodiment), and port 3000 is not publicly accessible.

Load balancer 2816 maintains a list of healthy servers in server farm 2818. In one embodiment, this is done via a health check that performs sanity checks at certain time intervals (e.g., every few minutes). Upon receiving a build job request, load balancer 2816 selects a server from the healthy server pool in the list and routes the build job request to that server (e.g., routes the job to "http://mac-mini1.internal/build/initiate"). In one embodiment, selecting the server is according to a round robin process for build jobs that are of equal complexity.

In one embodiment, a Tomcat web server is running on the selected server in server farm 2818. The Tomcat web server receives the build job request and starts an external process that runs on an asynchronous servlet to prevent the input/output from blocking the request thread pool. When the process completes, the Tomcat web server creates a POST request to the callback URL in the request payload. The following functionality provides an example payload for this new request:

result: (success if successful, etc)
binaryKey: (jobId)

MCS Portal VM 2812 receives the new request and updates the corresponding record in the table of build jobs with the binary key from the payload if the event has been successful. It also informs the client (i.e., first device 2802) that the build job was completed (e.g., via polling on Oracle Business Intelligence Enterprise Edition ("OBIEE") 11g push or asynchronous servlet with OBIEE 12c planned) and produces a QR code with an encoded link for downloading the application (e.g., "https://mcs-tenant-a.cloud.oracle.com/max/native-application/(binaryKey)").

Installing an Application

In one embodiment, once a user of second device 2804 scans the QR code on second device 2804, an "over the air" install is initiated. Scanning the QR code opens the URL encoded in the QR code (e.g., "https://mcs-tenant-a.cloud.oracle.com/max/native-application/(binaryKey)"). Public OHS 2806 receives the request, terminates the SSL, authenticates and authorizes the user against OAM (assuming the user is logged in), places the user identity into the HTTP headers of the request, and forwards the request past firewall 2808 to the WLS server of MCS Portal VM 2812 (e.g., running at "http://mcs-tenant-a.internal/max/build").

MCS Portal VM 2812 receives the request, authorizes the user for privileges against the requested application, determines user-agent (in this context, the OS framework of the device, e.g., iOS vs Android) of the requesting device (second device 2804), identifies the platform of second device 2804 (e.g., iOS), and forwards the request to a corresponding URL (e.g., "https://mcs-tenant-a.cloud.oracle.com/max/native-application/plist/(binaryKey)") by directing to Public OHS 2806, which will in turn forward the request to MCS Portal VM 2812 to authorize (as performed during the build process described herein to ensure that the user is allowed to download the application). MCS Portal VM 2812 receives the forwarded request and generates a property list file (e.g., an iOS "p-list" file) that includes application information for a corresponding platform (e.g., iPhone) as well as a link to the binary (e.g., "https://mcs-tenant-a.cloud.oracle.com/max/native-application/ios/(binaryKey)").

Second device 2804 then prompts the user if they want to install the application. Assuming yes, second device 2804 follows the link to the binary (e.g., "https://mcs-tenant-a.cloud.oracle.com/max/native-application/ios/(binary Key)") by directing to Public OHS 2806 which will in turn forward the request to MCS Portal VM 2812 to authorize (as performed during the build process described herein to ensure that the user is allowed to download the application). MCS Portal VM 2812 receives the request and generates a new build job request to build server farm 2818 (e.g., at "http://max-mini-farm.internal/download/ios/(binaryKey)") behind load balancer 2816. Load balancer 2816 selects a server in build server farm 2818 (e.g., via a round robin process) from a healthy server pool and routes the build job request to that server (e.g., to "http://mac-mini1.internal/download/ios/(binaryKey)"). An application server (e.g., a Tomcat) on the selected server receives the request, determines if corresponding content exists, and streams the binary from the network (e.g., from "Filer/filer_mnt/generated_binaries/(binaryKey)/result.ipa"). Load balancer 2816 returns the streamed response back to MCS Portal VM 2812, which receives the response and copies it into its request's output stream to second device 2804. Finally, second device 604 receives the binary and performs the install.

Download Link

In one embodiment, a user receives a download link from a service to download a resource. An example of such resource is the metadata that describes an application developed via a web-based framework. The download link may be received via any communication or networking means, e.g., email, text message, social networks, etc. If the user follows the download link from a desktop browser, they are presented with a QR code that they can scan with their mobile device. Alternatively, if the user is on a mobile device and follows the download link, they are presented with a button to download the content. After scanning the QR code or clicking the button (depending on how the user opened the link), the user is asked for login credentials. The resource is then downloaded and can be forwarded to an application on the user device.

In one embodiment, the link that is sent to the user includes a specific company service URL which is unprotected (i.e., no login is required to follow the company service URL) and includes an ID or locator of the resource the user wishes to download. An example of such URL is "max://?loginHost=server.oraclecloud.com&app=appId" where the "loginHost" parameter describes the server host to connect to. If the user follows the company service URL from a non-mobile device (e.g., a desktop computer), the user is presented with a screen that includes some information about the resource as well as a QR code. The user can then download the content by scanning the QR code using a scanning application on a mobile device. Alternatively or additionally, QR scanning functionality can be built into applications that are configured to receive the downloaded content.

The same company service URL is also provided to a user to follow from a mobile device, but the screen that is provided on the mobile device upon following the company service URL includes some information about the resource, and a download button instead of a QR code. Although the same URL is provided to users of mobile and non-mobile devices, embodiments detect if the user is using a mobile device or a non-mobile device and provide respective content accordingly.

In one embodiment, the link for the company service URL as configured to be opened on both mobile and non-mobile devices is encoded in a URI schema. A URI schema is a mechanism to trigger actions upon clicking on a link. In one embodiment, the URI schema allows native applications to intercept a request (e.g., the request corresponding to clicking on a link). The content encoded in this schema includes the login server address and the address of the downloadable content, where the downloadable content is protected by login functionality and cannot be accessed directly. Upon following a tokenized URL that implements the URI schema, the receiving application (the application that intercepts the request from the URI schema) identifies the login server from the encoded information in the URI schema, lets the user login, and then downloads/installs the new application.

In one embodiment, when an address entered in a web browser running on a mobile device includes embedded tokens indicating an application developed by a web-based framework (e.g., by Oracle MAF), its login information, application download location information, backends used by the application, etc., the corresponding URI schema is configured to ensure that these tokens are obtained by the OS of the mobile device and forwarded to an application on the device that is configured to receive the downloaded content.

An example of such URL is "max://?loginHost=server.oraclecloud.com&backendId=someBackendId&app=someAppId" which includes the embedded tokens of "loginHost= server.oraclecloud.com" (indicating login server information), "backendId=someBackendId" (indicating backend information), and "app=someAppId" (indicating application information). In this example, a mobile application can intercept URLs with "max" as their schema (e.g., the first part of the URL) and forward them to an application that is configured to handle these URL and extract the embedded tokens.

Figure 29:
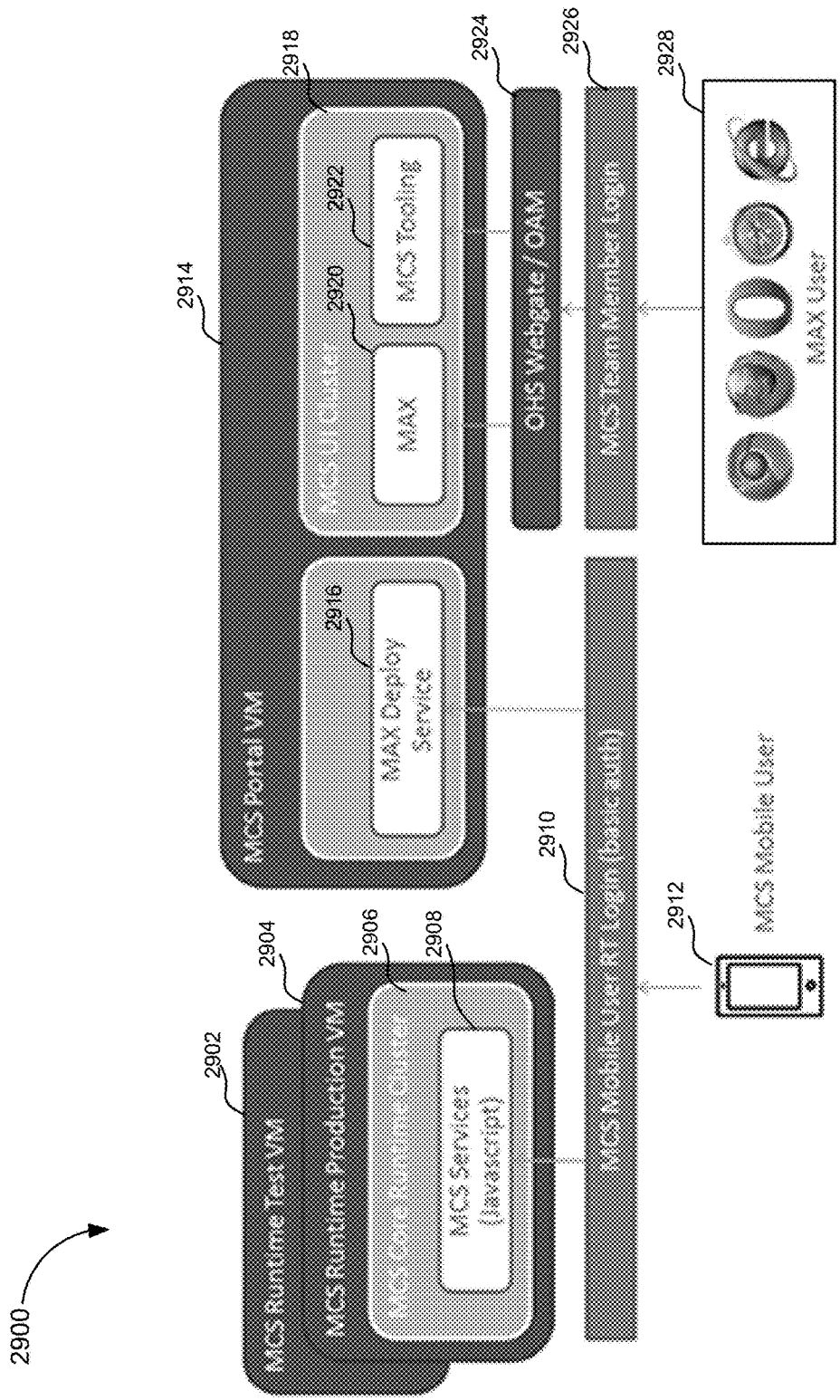
FIG. 29 is an example application network topology for web based application development in accordance with embodiments of the present invention.

FIG. 29 is an example application network topology 2900 for web-based application development in one embodiment. This embodiment provides native application development functionality that is applicable to use cases such as running "published" applications, sharing applications built in a web-based framework with other mobile users who may not have an account in the web-based framework, deploying applications for companies that do not wish to share enterprise keys (where keys are required for a full build service), etc. In this embodiment, a hosting application on a user device 2912 allows a user to download hosted applications (built in the web-based framework) as added features to the hosting application. The hosting application may be downloaded on user device 2912 from, e.g., AppStore, Google play, etc. The hosted applications are lightweight and do not require building native artifacts, thus providing an alternative to using a build server farm.

Application network topology 2900 implements MCS "team member" login functionality 2926 which provides cookie-based login for users 2928 that develop applications. After logging in, users 2928 may develop applications by communicating with an MCS portal virtual machine 2914 through OHS WebGate 2924 (the web-server plug-in for Oracle Access Manager ("OAM") to intercept HTTP requests and forward them to an access server for authentication and authorization).

An authentication cookie is an item in a dictionary of items each having a key (e.g., "username") and a value (e.g., an instance of a username such as "bob123"). When a browser sends a request to a website, automatic authentication can be performed by including authentication cookies in the request so the cookies can be checked by a host server. A cookie may be set by adding it to the response the server sends back to the requesting browser which then adds (saves) the cookie upon receiving the response. Thereafter the browser adds the cookies in the HTTP header of every request made to that server.

In one embodiment, MCS portal virtual machine 2914 includes an MCS UI cluster 2918 that in turn includes a UI server 2920 of the web-based framework and MCS tooling functionality 2922. In this embodiment, users 2928 can use MCS tooling functionality 2922 to select a cloud or other connector to a backend system of interest and then develop an application. The mobile backends that support the application may run on an MCS runtime test virtual machine 2902 in a runtime test environment or an MCS runtime production virtual machine 2904 in a runtime production environment. The runtime production virtual machine 2904 may include JavaScript MCS services 2908 accessible via an MCS core runtime cluster 2906.

Application network topology 2900 further implements MCS mobile user runtime login functionality 2910 which allows the hosting application on user device 2912 to log into MCS as a mobile user. The hosted applications can then use MCS mobile user basic access authentication (or "basic auth," a method for an HTTP user agent to provide a username and password when making a request). In one embodiment, the logins are stored indefinitely on mobile device 2912 and shared across the hosted applications.

In one embodiment, when an application is developed in application network topology 2900, UI server 2920 of the web-based framework hosts the HTML page that is generated for the developed application. The HTML page includes a QR code that points to one of the environments (e.g., test/production) which communicates with UI server 2920 to obtain and cache application data. Once this data is cached on one of the environments, it can be provided to users (e.g., mobile device 2912) by that environment without needing to obtain it again from UI server 2920. In one embodiment, the QR code will only show up on desktop browsers, and if a mobile user looks at the same page, they will instead see an "Install" button that when clicked will follow the same URL as encoded in the QR code. Accordingly, by allowing for obtaining application data from one of the environments instead of accessing UI server 2912, embodiments prevent the situation where a large number of users access UI server 2912. In one embodiment, a download service 2916 within MCS portal virtual machine 2914 serves and stores application data and allows for lightweight declarative metadata to be downloaded onto mobile device 2912. This metadata is the application metadata and can be run in the host application by having the host application interpret and execute the metadata. In one embodiment, an application download service can be used in a test environment for application testing and in a production environment for application production.

Accordingly, the information that is sent down to mobile device 2912 for installing a hosted application is declarative data that gets interpreted on mobile device 2912 during runtime, and binary files of the hosting application include the codes necessary for running the hosted application. The hosted applications also share the same login. For example, within a same hosting application, a hosted application for enterprise HR functionality and another hosted application attached to the CRM of the enterprise may share the same login. In one embodiment, once a new hosted application is downloaded, a corresponding icon is added to a springboard of the hosting application on mobile device 2912. The new hosted application can then be modified, upgraded, and/or uninstalled independently of other hosted applications within the hosting application.

Figure 30:
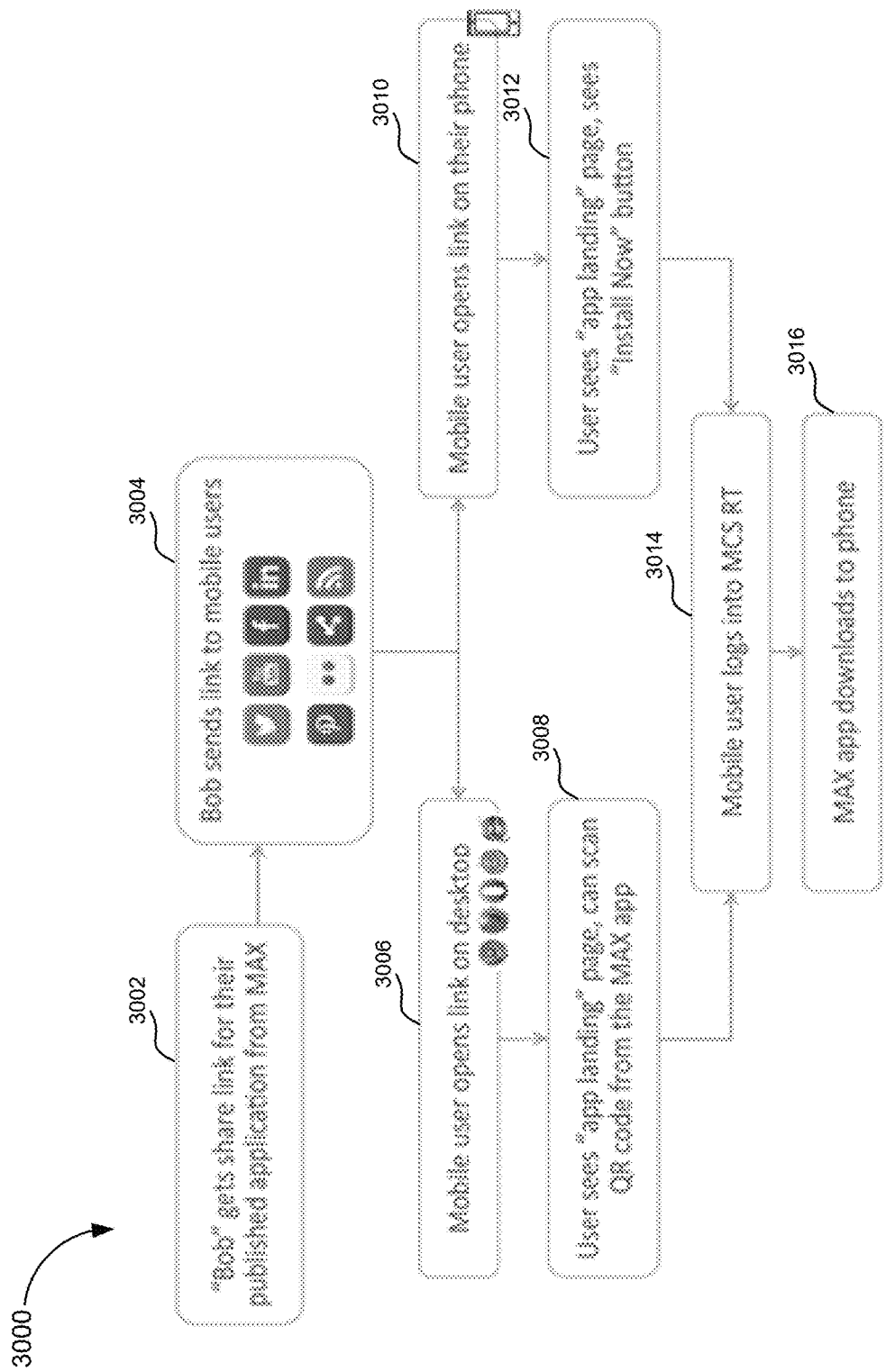
FIG. 30 is an example application sharing flow in accordance with embodiments of the present invention.

FIG. 30 is an example application sharing flow 3000 in one embodiment. At 3002 a user "Bob" that develops an application and wishes to publish it gets a "share" link from a web-based framework for the published application. The user may be provided with this share link in a screen that includes a list of several applications. Each application in the list may be presented as a "card" which can be flipped over to reveal a QR code for the application. The card may also include a share button, and upon clicking on the share button, a link is provided for sharing the application.

At 3004 the user sends the share link to prospective mobile users of the application. The share link may be shared with mobile users via any networking, communication, or sharing service such as social networks, email, instant message, etc. In one embodiment, the share link is not a link to the application but a link to an HTML page which includes information related to the application. This information may include, for example, screens/previews of the application, application information, instructions for using the application, a QR code for launching the application (if the link is reached via a non-mobile device), an "install" button for launching the application (if the link is reached by a mobile device), etc. Accordingly, users that receive the link may use it to download the application created in the web-based framework. This application is secured with MCS "mobile user" credentials. However, the users do not need to know the domain of the MCS server, since both login and application download links are included/encoded within the share link.

If a mobile user receives the share link and opens it on a non-mobile device (e.g., a desktop computer) at 3006, at 3008 the user sees an application landing page including a QR code that can be scanned by a mobile device. Upon scanning the QR code, at 3014 the information encoded in the share link is used to log in the mobile user into MCS runtime, and at 3016 the application is downloaded to the mobile device that scanned the QR code.

If a mobile user receives the share link and opens it on a mobile device (e.g., a mobile phone) at 3010, at 3012 the user sees an application landing page including a button for installing the application. Upon clicking the button on the mobile device, at 3014 the information encoded in the share link is used to log in the mobile user into MCS runtime, and at 3016 the application is downloaded to the mobile device.

Figure 31:
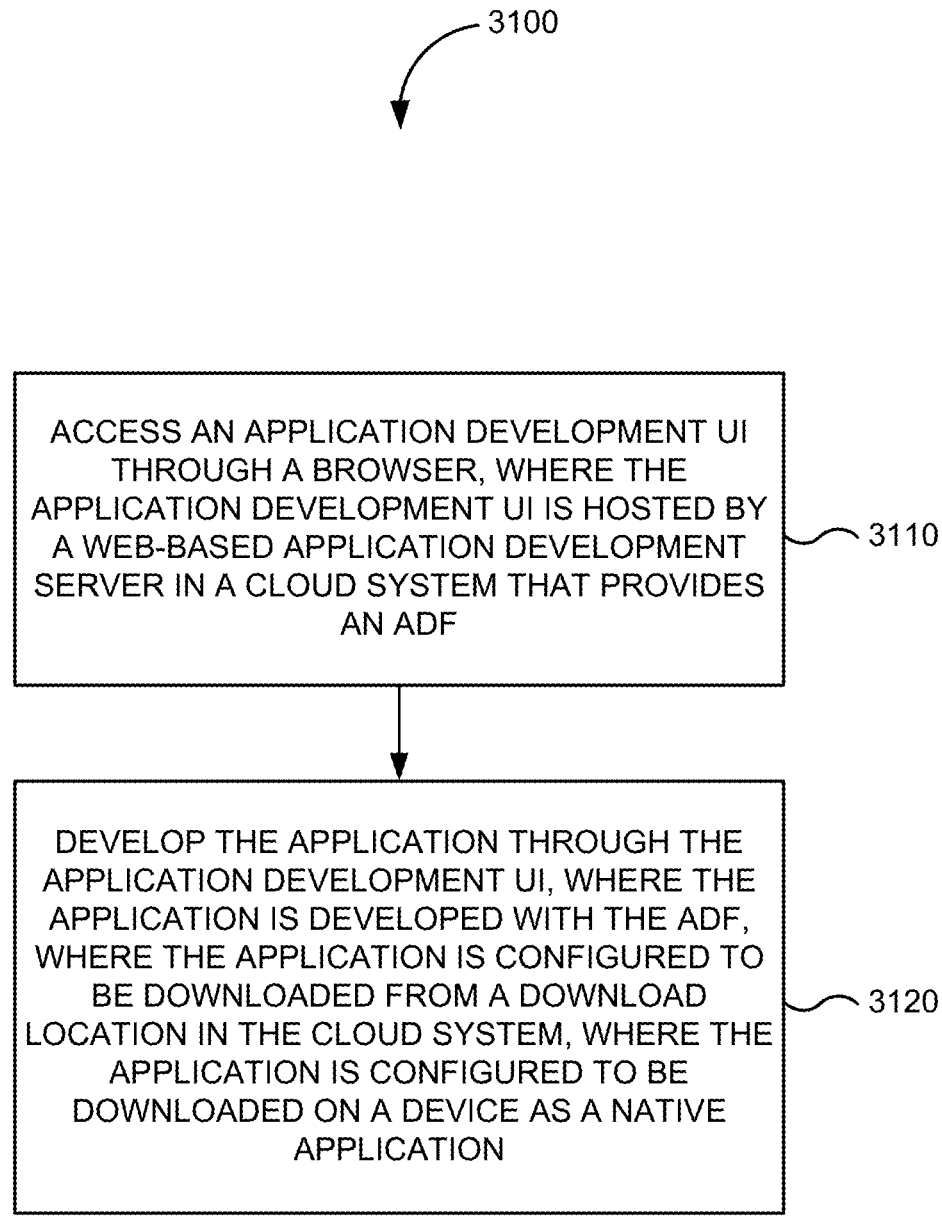
FIG. 31 is a flow diagram of application development functionality in accordance with embodiments of the present invention.

FIG. 31 is a flow diagram 3100 of application development functionality in accordance with embodiments of the present invention.

At 3110 an application development UI is accessed through a browser, where the application development UI is hosted by a web-based application development server in a cloud system that provides an ADF.

At 3120 an application is developed through the application development UI. The application is developed with the ADF and is configured to be downloaded from a download location in the cloud system. The application is configured to be downloaded on a device as a native application or a device resident application. A device resident application is an application that is packaged as a native library and installed on a device. It can optionally be published to a platform application store. Device resident applications are different than web applications which are accessed through a web browser (e.g., Safari, Chrome, etc.) on a device.

In one embodiment, the developing of the application through the application development UI includes receiving a first gesture made by a user of the ADF adding a visual representation of a UI component to a visual representation of a UI of the application being developed with the ADF, where the first gesture adds the UI component to the UI of the application.

The developing of the application through the application development UI further includes determining a set of attributes available at the UI component, and receiving a second gesture made by the user of the ADF linking an attribute available at the UI component to a visual representation of a data source or function, where the second gesture binds the data source or function to the UI component.

The developing of the application through the application development UI further includes modifying a predetermined expression of the visual representation of the UI component with a reference to the data source or function.

In one embodiment, the receiving of the second gesture includes receiving information indicative of the user dragging the visual representation of the data source or function from a catalog of services onto a visual representation of the UI component.

In one embodiment, the determining of the set of attributes available at the UI component includes accessing a REST or SOAP definition. For example, one embodiment accesses a REST metadata definition at the time of collecting the APIs available for the user to use. In one embodiment, the REST metadata is configured in a public format (e.g., RESTful API Modeling Language ("RAMC") or SWAGGER) and is thus easily readable by a tool such as those implemented in the embodiments.

In one embodiment, the determining of the set of attributes available at the UI component includes identifying a template associated with the UI component, and determining, based on the template, a set of UI elements that correspond to the set of attributes available at the UI component.

In one embodiment, the receiving of the second gesture made by the user of the ADF includes receiving information indicative of the user dragging a visual representation of a data point available at the data source from a visual representation of a set of data points available at the data source onto a visual representation of the set of attributes available at the UI component.

In one embodiment, the web-based application development server generates a URL that identifies the download location in the cloud system, and the URL is shared with one or more devices. The application is configured to be downloaded from the download location as identified by the URL. In one embodiment, the one or more devices include a non-mobile device, where following the URL on the non-mobile device opens a web page that includes download information for the application. In one embodiment, the web page includes a QR code that encodes the application, and the application is downloaded to a mobile device that scans the QR code.

In one embodiment, the one or more devices include a mobile device, and following the URL on the mobile device opens a web page that includes download information for the application. In one embodiment, the web page includes a download button for downloading the application, and clicking the download button downloads the application to the mobile device.

In one embodiment, the URL is a tokenized URL that includes tokens for at least one of an application link, application login information, application download information, and a mobile backend used by the application.

In one embodiment, the device includes a hosting application, and the application is installed as a feature of the hosting application. In one embodiment, installing the application is performed by downloading declarative metadata of the application to the device, and the declarative metadata of the application is interpreted at runtime.

In one embodiment, the application shares login information with other applications that are installed as features of the hosting application. In one embodiment, each application that is added as a feature of the hosting application is configured to be independently modified.

In one embodiment, the browser is opened on a non-desktop device (e.g., an iPad, a Chromebook, etc.), and the application is developed entirely through the browser. That is, no coding is performed by the device that is used to develop the application, and application development is run completely from the non-desktop device's web browser.

In one embodiment, the application is installed on the device as a device resident application. In one embodiment, an application store (e.g., an "app store") is not needed for downloading the device resident application, and the device resident application is transmitted directly from a server in the cloud (e.g., the web-based application development server) to the device.

As disclosed, embodiments provide a cloud based ADF that can be used through a browser to develop applications in a cloud system. Embodiments further allow for downloading the application as a native application on a mobile device from a download location in the cloud. Accordingly, embodiments greatly facilitate mobile application development.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to create an application, the create the application comprising:
   accessing an application development user interface (UI) through a browser, wherein the application development UI is hosted by a web-based application development server in a cloud system that provides an application development framework (ADF) as a declarative framework;
   capturing a user's intent in response to user interactions with the UI and recording the intent into the declarative framework;
   developing the application through the application development UI, wherein the application is developed with the ADF; and
   generating an identity of a download location for the application and providing the identity to a mobile device having a mobile operating system;
   wherein the application is configured to be downloaded from the download location in the cloud system,
   wherein the application is configured to be downloaded on the mobile device as a native application as a device resident application that is resident of the mobile operating system.

2. The computer readable medium of claim 1, wherein the developing of the application through the application development UI comprises:
   receiving a first gesture made by a user of the ADF adding a visual representation of a UI component to a visual representation of a UI of the application being developed with the ADF, wherein the first gesture adds the UI component to the UI of the application;
   determining a set of attributes available at the UI component;
   receiving a second gesture made by the user of the ADF linking an attribute available at the UI component to a visual representation of a data source or function, wherein the second gesture binds the data source or function to the UI component; and modifying a predetermined expression of the visual representation of the UI component with a reference to the data source or function.

3. The computer readable medium of claim 2, wherein the receiving of the second gesture comprises receiving information indicative of the user dragging the visual representation of the data source or function from a catalog of services onto a visual representation of the UI component.

4. The computer readable medium of claim 2, wherein the determining of the set of attributes available at the UI component comprises accessing a Representational State Transfer (REST) or Simple Object Access Protocol (SOAP) definition.

5. The computer readable medium of claim 2, wherein the determining of the set of attributes available at the UI component comprises:
   identifying a template associated with the UI component; and
   determining, based on the template, a set of UI elements that correspond to the set of attributes available at the UI component.

6. The computer readable medium of claim 2, wherein the receiving of the second gesture made by the user of the ADF comprises receiving information indicative of the user dragging a visual representation of a data point available at the data source from a visual representation of a set of data points available at the data source onto a visual representation of the set of attributes available at the UI component.

7. The computer readable medium of claim 1, wherein the identity of the download location comprises a Uniform Resource Locator (URL), wherein the URL is shared with a plurality of devices, wherein the application is configured to be downloaded from the download location as identified by the URL.

8. The computer readable medium of claim 7, wherein the plurality of devices include a non-mobile device, wherein following the URL on the non-mobile device opens a web page that includes download information for the application.

9. The computer readable medium of claim 8, wherein the web page includes a Quick Response (QR) code that encodes the application, wherein the application is downloaded to the mobile device that scans the QR code.

10. The computer readable medium of claim 7, wherein the plurality of devices include the mobile device, wherein following the URL on the mobile device opens a web page that includes download information for the application.

11. The computer readable medium of claim 10, wherein the web page includes a download button for downloading the application, wherein clicking the download button downloads the application to the mobile device.

12. The computer readable medium of claim 7, wherein the URL is a tokenized URL that includes tokens for at least one of an application link, application login information, application download information, and a mobile backend used by the application.

13. The computer readable medium of claim 1, wherein the mobile device includes a hosting application, wherein the application is installed as a feature of the hosting application.

14. The computer readable medium of claim 13, wherein installing the application is performed by downloading declarative metadata of the application to the mobile device, wherein the declarative metadata of the application is interpreted at runtime.

15. The computer readable medium of claim 13, wherein the application shares login information with other applications that are installed as features of the hosting application.

16. The computer readable medium of claim 13, wherein each application that is added as a feature of the hosting application is configured to be independently modified.

17. A method of creating an application, comprising:
   accessing an application development user interface (UI) through a browser, wherein the application development UI is hosted by a web-based application development server in a cloud system that provides an application development framework (ADF) as a declarative framework;
   capturing a user's intent in response to user interactions with the UI and recording the intent into the declarative framework;
   developing the application through the application development UI, wherein the application is developed with the ADF; and
   generating an identity of a download location for the application and providing the identity to a mobile device having a mobile operating system;
   wherein the application is configured to be downloaded from the download location in the cloud system,
   wherein the application is configured to be downloaded on the mobile device as a native application as a device resident application that is resident of the mobile operating system.

18. A system for creating an application, comprising:
   a processor coupled to a storage device that stores instructions,
   wherein the processor executes the instructions and implements modules comprising:
   an accessing module that accesses an application development user interface (UI) through a browser,
   wherein the application development UI is hosted by a web-based application development server in a cloud system that provides an application development framework (ADF) as a declarative framework and captures a user's intent in response to user interactions with the UI and records the intent into the declarative framework; and
   a developing module that generates an identity of a download location for the application and providing the identity to a mobile device having a mobile operating system and develops the application through the application development UI,
   wherein the application is developed with the ADF,
   wherein the application is configured to be downloaded from the download location in the cloud system,
   wherein the application is configured to be downloaded on the mobile device as a native application as a device resident application that is resident of the mobile operating system.

19. The method of claim 17, further comprising:
   receiving a first gesture made by a user of the ADF adding a visual representation of a UI component to a visual representation of a UI of the application being developed with the ADF, wherein the first gesture adds the UI component to the UI of the application;
   determining a set of attributes available at the UI component;
   receiving a second gesture made by the user of the ADF linking an attribute available at the UI component to a visual representation of a data source or function, wherein the second gesture binds the data source or function to the UI component; and
   modifying a predetermined expression of the visual representation of the UI component with a reference to the data source or function.

20. The system of claim 18, further comprising the accessing module:
- receiving a first gesture made by a user of the ADF adding a visual representation of a UI component to a visual representation of a UI of the application being developed with the ADF, wherein the first gesture adds the UI component to the UI of the application;
- determining a set of attributes available at the UI component;
- receiving a second gesture made by the user of the ADF linking an attribute available at the UI component to a visual representation of a data source or function, wherein the second gesture binds the data source or function to the UI component; and
- modifying a predetermined expression of the visual representation of the UI component with a reference to the data source or function.

\* \* \* \* \*

UNITED STATES PATENT AND TRADEMARK OFFICE
CERTIFICATE OF CORRECTION

| | |
|---|---|
| PATENT NO. | : 9,851,953 B2 |
| APPLICATION NO. | : 15/188120 |
| DATED | : December 26, 2017 |
| INVENTOR(S) | : Straub et al. |

It is certified that error appears in the above-identified patent and that said Letters Patent is hereby corrected as shown below:

In the Specification

In Column 37, Line 51, delete "sign ingCertificate:" and insert -- signingCertificate: --, therefor.

Signed and Sealed this
Seventeenth Day of July, 2018

Andrei Iancu
*Director of the United States Patent and Trademark Office*